United States Patent
Weinhofer

(10) Patent No.: US 7,146,242 B2
(45) Date of Patent: Dec. 5, 2006

(54) METHOD AND SYSTEM FOR GENERATING MULTI-DIMENSIONAL MOTION PROFILES

(75) Inventor: Juergen K. Weinhofer, Chagrin Falls, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 249 days.

(21) Appl. No.: 10/675,298

(22) Filed: Sep. 30, 2003

(65) Prior Publication Data

US 2005/0071021 A1 Mar. 31, 2005

(51) Int. Cl.
*G06F 19/00* (2006.01)

(52) U.S. Cl. .......................... 700/189; 700/61; 318/35

(58) Field of Classification Search ........ 700/184–189, 700/61, 63; 318/34–35, 567, 569
See application file for complete search history.

(56) References Cited

U.S. PATENT DOCUMENTS

| | | | |
|---|---|---|---|
| 4,308,584 A | 12/1981 | Arai | |
| 4,449,196 A | 5/1984 | Pritchard | |
| 4,786,847 A | 11/1988 | Daggett et al. | |
| 4,829,219 A | 5/1989 | Penkar | |
| 4,887,222 A | 12/1989 | Miyake et al. | |
| 4,890,241 A | 12/1989 | Hoffman et al. | |
| 5,248,922 A | 9/1993 | Meshkat | |
| 5,481,652 A | 1/1996 | Sasaki | |
| 5,521,374 A | 5/1996 | Cray et al. | |
| 5,581,672 A * | 12/1996 | Letcher, Jr. ................. | 345/420 |
| 5,625,267 A | 4/1997 | Gregory | |
| 5,923,132 A * | 7/1999 | Boyer .......................... | 318/34 |
| 5,955,856 A * | 9/1999 | Sato et al. ................... | 318/560 |
| 6,134,486 A | 10/2000 | Kanayama | |
| 6,297,610 B1 | 10/2001 | Bauer et al. | |
| 6,300,738 B1 | 10/2001 | Weinhofer | |
| 6,865,441 B1 | 3/2002 | Chandhoke | |
| 6,442,442 B1 | 8/2002 | Weinhofer | |
| 6,456,897 B1 | 9/2002 | Papiernik et al. | |
| 6,782,306 B1 * | 8/2004 | Yutkowitz ................... | 700/189 |
| 6,825,634 B1 | 11/2004 | Tatar et al. | |
| 6,839,663 B1 | 1/2005 | Temkin et al. | |
| 6,922,607 B1 | 7/2005 | Yamazaki et al. | |
| 2001/0052512 A1 | 12/2001 | Hunter et al. | |
| 2004/0157188 A1 | 8/2004 | Luth et al. | |

OTHER PUBLICATIONS

Bourke, P.; "Bézier curves"; 6-pg. document; (Original: Apr. 1989, Updated: Dec. 1996); [obtained from Internet http://astronomy.swin.edu.au/~pbourke/curves/bezier].

Dumestre, A.; "Pierre Bézier's Wonderful Curves"; 4-pg. document; [obtained from Internet http://www.1960pcug.org/~pcnews/1999/07/bezier_curves.html]; [believed to have been available prior to Sep. 30, 2003].

Meyer, D.; (WPI CS Department); "2-D Curve Generation"; 9-pg. document; [obtained from Internet http://www.cs.wpi.edu/~matt/courses/cs563/talks/curves.html]; [believed to have been available prior to Sep. 30, 2003].

(Continued)

*Primary Examiner*—Leo Picard
*Assistant Examiner*—Alexander J. Kosowski
(74) *Attorney, Agent, or Firm*—Foley & Lardner LLP; R. Scott Speroff

(57) ABSTRACT

A system comprises control logic and a programming interface. The programming interface is configured to permit a user to specify a plurality of weighting points in a multi-dimensional coordinate space. The control logic includes spline computation logic configured to generate a spline curve based on boundary conditions. The spline curve extends near the weighting points. The control logic is configured to generate control signals to control operation of a plurality of motion axes to drive movement of a controlled element along a path defined by the spline curve.

28 Claims, 25 Drawing Sheets

OTHER PUBLICATIONS

Kinch, R.J.; "Finding All Intersections of Two Bezier Curves"; 14-pg. document; [obtained from Internet http://truetex.com/bezint.html]; [believed to have been available prior to Sep. 30, 2003].

Allen-Bradley GML Commander Reference Manual, Cat. No. GMLC-5.2, Rockwell Automation, Table of Contents; Chapters 1-15; Nov. 1999, 401 pages.

* cited by examiner

| Coordinated Linear Move | | |
|---|---|---|
| Coordinate System | MyCoordSystem | [...] |
| Motion Control | MyMotionControl | |
| Move Type | MyMoveType | |
| MyXAxis | 0 | ← |
| Position | MyPosition | [...] |
| MyXAxis | 0.0 | |
| MyYAxis | 1.0 | |
| MyZAxis | 0.5 | |
| Speed | MySpeed | |
| | 10.0 | ← |
| Speed Units | Units per Sec | |
| Accel Rate | MyAccelRate | |
| | 100.0 | ← |
| Accel Units | Units per Sec2 | |
| Decel Rate | MyDecelRate | |
| | 100.0 | ← |
| Decel Units | Units per Sec2 | |
| Velocity Profile | Trapezoidal | |
| Termination Type | Actual Tolerance | |
| Merge | Disabled | |
| Merge Speed | Current | |
| < <Less | | |

500 — Move Type
502 — Termination Type

Outputs: (EN), (DN), (ER), (IP), (AC), (PC)

FIG. 23

| | | |
|---|---|---|
| | Coordinated Circular Move | —(EN)— |
| | Coordinate System    MyCoordSystem […] | —(DN)— |
| | Motion Control    MyMotionControl | —(ER)— |
| 504 — | Move Type    MyMoveType | —(IP)— |
| | 0 ← | |
| | Position    MyPosition […] | —(AC)— |
| | MyXAxis    0.0 | —(PC)— |
| | MyYAxis    1.0 | |
| | MyZAxis    0.5 | |
| 505 — | Circle Type    MyCircleType | |
| | 0 ← | |
| 506 — | Via/Center/Radius    MyViaPosition […] | |
| 507 — | Direction    MyDirection | |
| | 0 ← | |
| | Speed    MySpeed | |
| | 10.0 ← | |
| | Speed Units    Units per Sec | |
| | Accel Rate    MyAccelRate | |
| | 100.0 ← | |
| | Accel Units    Units per Sec2 | |
| | Decel Rate    MyDecelRate | |
| | 100.0 ← | |
| | Decel Units    Units per Sec2 | |
| | Velocity Profile    Trapezoidal | |
| | Termination Type    Actual Tolerance | |
| 508 — | Merge    Disabled | |
| | Merge Speed    Current | |
| | << Less | |

FIG. 24

METHOD AND SYSTEM FOR GENERATING MULTI-DIMENSIONAL MOTION PROFILES

BACKGROUND OF THE INVENTION

1. Field

This invention relates to a method and system apparatus for generating multi-dimensional motion profiles. In a particularly preferred embodiment, the invention relates to a method and apparatus for generating multi-dimensional motion profiles in a motion control system, such as in an industrial control system.

2. Description of Related Art

Motion control systems are known for controlling motors. Motors may be electric, hydraulic, or any other type of physical motor. For example, motion control systems have been used in industrial control systems for manufacturing, processing, packaging, testing, automation, measurement, robotic, material handling, assembling, cutting (metal, laser and others), grinding, welding, pick and place and other applications. In such systems, motion control systems are used to control motion of a controlled element, such as a tool (drill bit or other machine tool), a robotic arm (e.g., a pick-and-place mechanism at a tip of the robotic arm), actuator, sensor, or other device. Herein, the term "controlled element" refers broadly to any device, apparatus, and structure of interest or portion thereof whose position is controlled.

In some systems, the position of a controlled element is determined by the positions of multiple motors. In such systems, it would be desirable to be able to control the motors in a coordinated fashion. Particularly, it would be desirable to be able to generate multi-dimensional motion profiles for the controlled element, and to be able to control the motors in a coordinated fashion in accordance with the multi-dimensional motion profiles. Further, it would also be desirable to be able to perform coordinate transformations between Cartesian, cylindrical, and spherical coordinate systems as well as forward and inverse kinematic transformations. An ongoing need exists for systems and methods which are able to perform these functions.

It should be understood that the teachings herein may also be used to achieve other advantages in addition to or different than the above-mentioned advantages.

SUMMARY OF THE INVENTION

According to a first preferred embodiment, a system comprises control logic and a programming interface. The programming interface is configured to permit a user to specify a plurality of weighting points in a multi-dimensional coordinate space. The control logic includes spline computation logic configured to generate a spline curve based on boundary conditions. The spline curve extends near the weighting points. The control logic is configured to generate control signals to control operation of a plurality of motion axes to drive movement of a controlled element along a path defined by the spline curve.

According to another preferred embodiment, a control method for controls movement of a controlled element in a multi-dimensional coordinate system. The method comprises receiving a plurality of weighting points by way of a user instruction, generating a plurality of control points for a plurality of adjacent spline segments based on boundary conditions and the plurality of weighting points, generating a plurality of coefficient vectors for the plurality of spline segments based on the plurality of control points, generating a first plurality of position reference values based on the plurality of coefficient vectors and using the first plurality of position reference values to control a first motion axis, and generating a second plurality of position reference values based on the plurality of coefficient vectors and using the second plurality of position reference values to control a second motion axis. The first motion axis operates in a first dimension of the multi-dimensional coordinate system and the second motion axis operates in a second dimension of the multi-dimensional coordinate system.

According to another preferred embodiment, a system comprises motion control logic configured to control a first motion axis and a second motion axis in accordance with a user program. The motion control logic provides a plurality of instructions configured for use in the user program. The plurality of instructions include an instruction that permits a move to be specified by specifying weighting points for a spline path to be followed by the controlled element in a multi-dimensional coordinate system that includes the first motion axis and the second motion axis.

BRIEF DESCRIPTION OF THE DRAWINGS

FIG. 23 is an instruction faceplate for a linear coordinated move instruction according to an exemplary embodiment;

FIG. 24 is an instruction faceplate for a circular coordinated move instruction according to an exemplary embodiment;

DETAILED DESCRIPTION OF THE PREFERRED EMBODIMENTS

Various preferred embodiments of the invention will now be described. Although the invention is described by way of example in the context of an industrial control system, it will be appreciated that the invention may be employed in other types of systems as well.

I. Preferred System Architecture

A. Hardware Configuration

Figure 1A:
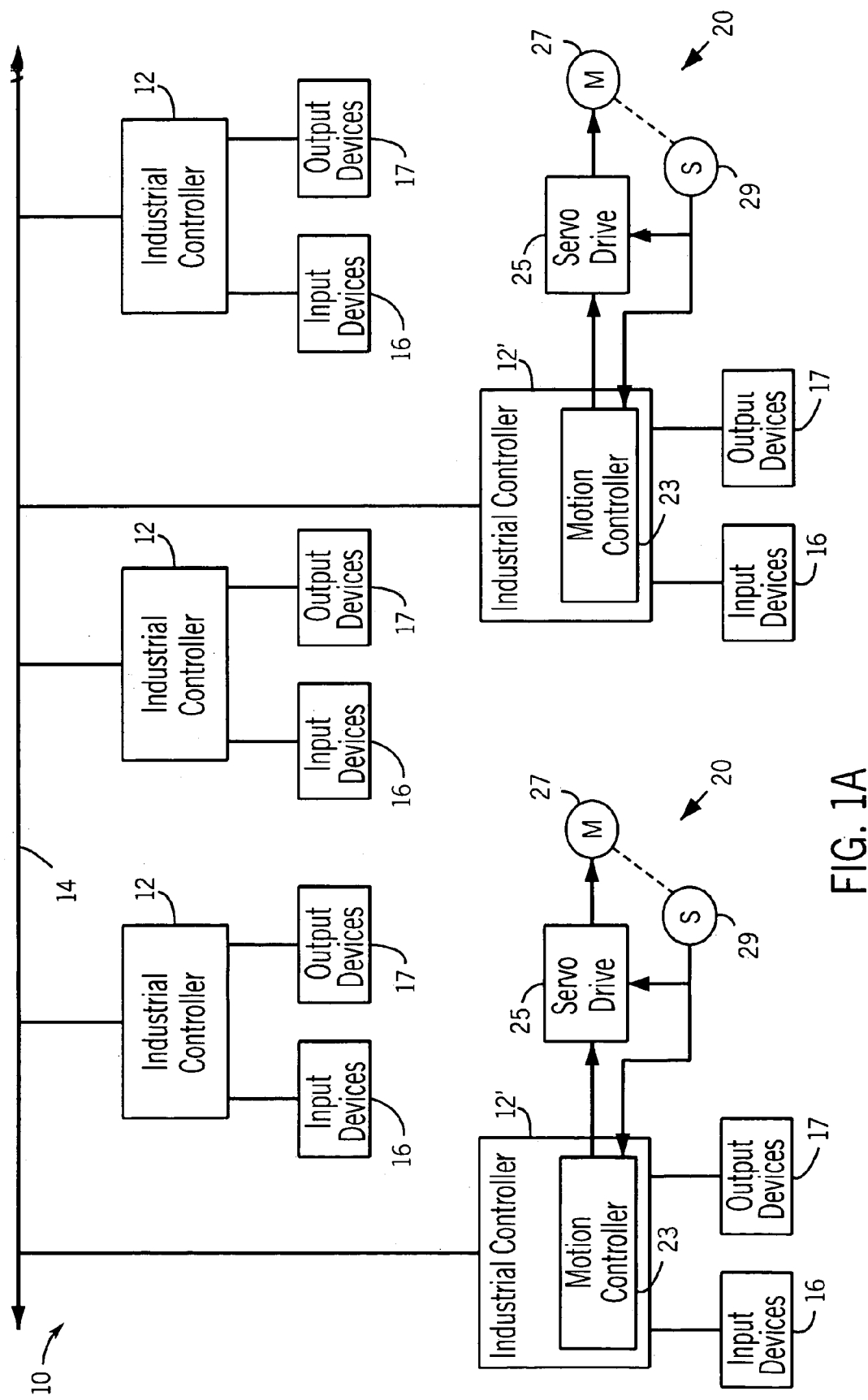
FIG. 1A is an overview of a control system that incorporates a reference value generation system and method according to an exemplary embodiment.
Figure 1B:
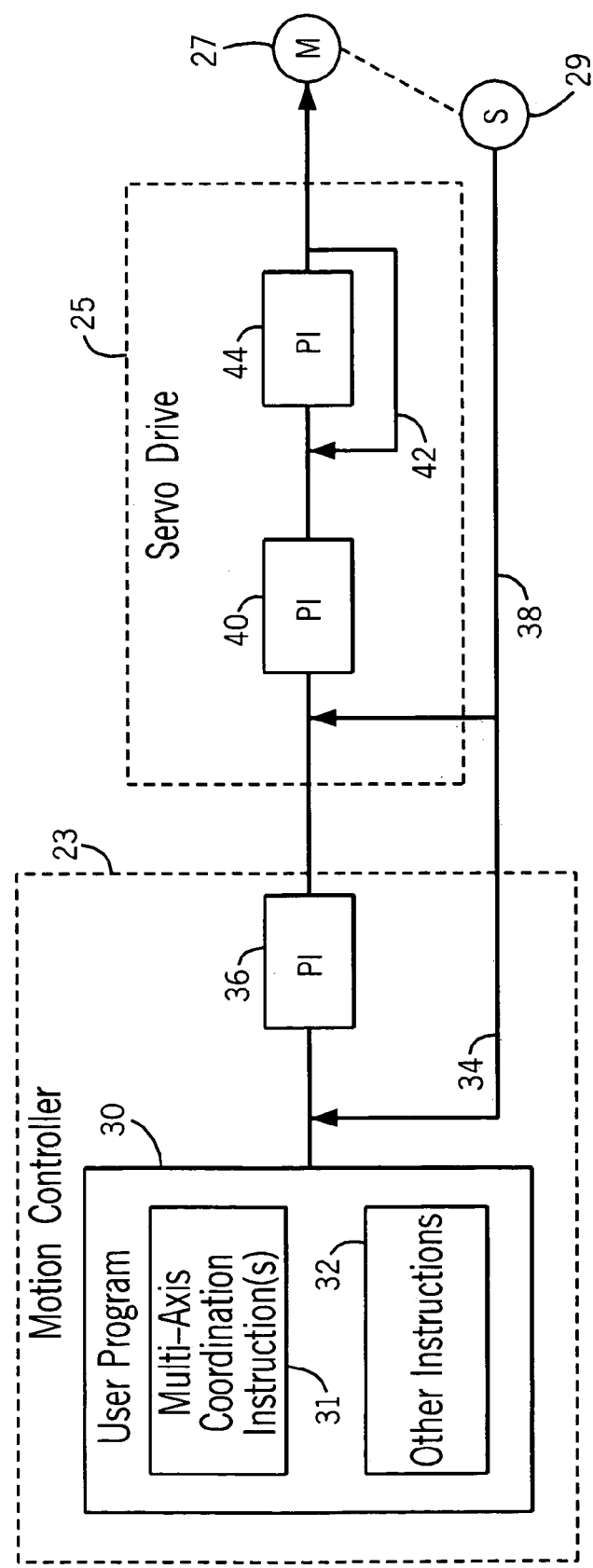
FIG. 1B is a schematic view of a motion controller, servo drive and motor of FIG. 1A shown in greater detail.

Referring now to FIGS. 1A–1B, FIG. 1A shows an overview of a control system 10 in which a multi-dimensional motion profile is generated in accordance with a preferred embodiment. Although the control system 10 is shown to be an industrial control system, it will be appreciated that the methods and systems described herein may also be applied in other contexts.

The control system 10 comprises a plurality of industrial controllers 12 that are interconnected by way of a communication network 14. The control system 10 also includes a plurality of input devices 16 and a plurality of output devices 17. The output devices 17 are controlled by the controllers 12 in response to input status information from the input devices 16. In one embodiment, the industrial controllers 12 are programmable logic controller (PLC) systems. Other hardware configurations may also be used.

The control system 10 operates based on execution of a user program that is tailored to the industrial control system and the particular manufacturing, processing, packaging, automation, testing, measurement, robotic and/or other application(s) for which it is used. In the illustrated embodiment, the control system 10 includes multiple industrial controllers 12, and the user program may comprise one or more subprograms that are executed by the industrial controllers 12. In a simpler industrial control system, such as in the case of a stand-alone motion control system, the user program may be contained in a single motion controller.

At least some of the controllers 12' include an output device 17 which is a motion control system 20. The controllers 12' include a motion controller 23 which is connected by way of a servo drive 25 to a motor 27. A feedback sensor 29, which may be integrated with the motor 27 or provided separately, is also provided for position/velocity feedback. The feedback sensor 29 may, for example, be an encoder or a resolver. The motion controller 23 may be provided as a separate physical module, as program logic included in the controller 12', or in a variety of other configurations. Likewise, as previously noted, the motion controller 23 may also be integrated with the servo drive 25 and/or integrated with the motor 27. Other configurations are also possible.

The interconnection of the motion controller 23, the servo drive 25, the motor 27 and sensor 29 for an exemplary hardware configuration is shown in greater detail in FIG. 1B. As shown therein, the system 10 also includes a user program 30, which may be executed by the industrial controller 12' and/or by the motion controller 23. The user program 30 includes one or more multi-axis coordination instructions 31, described in greater below, as well as other instructions 32.

In combination, the motion controller 23 and the servo drive 25 implement a position control loop 34, a velocity control loop 38, and a torque or current control loop 42. The position control loop 34, which is shown to include a PI (proportional-integral) gain element 36, operates to minimize the difference between a commanded position of the rotor shaft (provided by the user program) and the actual position of the rotor shaft (provided by the sensor 29). The velocity control loop 38, which is nested within the position control loop and is shown to include a PI gain element 40, operates to minimize the difference between a commanded rotor shaft velocity (provided by the position control loop 34) and the actual velocity of the rotor shaft (determined based on feedback information provided by the sensor 29). The torque/current control loop 42 is nested within the velocity control loop 38. (Because torque/current magnitudes are proportional, the same control loop can be viewed as either a torque control loop or a current control loop.) The torque/current control loop 42, which is shown to include a PI gain element 44, operates to minimize the difference between a commanded torque/current (received from the velocity control loop) and the actual torque/current (measured using current sensors, not shown). In combination, therefore, the control loops 34, 36 and 38 are capable of accepting a position command and in response generating current to drive the motor and thereby to control the motor to obtain the commanded position. The location of the position, velocity and current loops is not important. Additionally, other loop configurations are also possible, which may contain any combination of feed forward loops, open loops, closed loops, or nested loops etc.

In operation, to move from one position to another, a series of intermediate position reference values are generated for or by the motion controller 23. Thus, if the motor is to move to a new position $X_{end}$, then a series of incremental position reference values $X_{ref(1)} \ldots X_{ref(n)}$ are generated that extend from an initial position $X_0$ to the new position $X_{end}$. The incremental position reference values are generated by logic commonly referred to as an "interpolator." An example of an interpolator is disclosed in U.S. Pat. No. 6,300,738, entitled "Method and Apparatus for Generating Reference Values for a Motion Control Loop in an Industrial Control System," hereby incorporated by reference. In practice, the position reference values may be provided in the form of delta position information (change in position since the last update) rather than absolute position information. The position reference values may be updated each millisecond, for example.

The incremental position reference values are provided as position commands to the position feedback control loop 34 with a new position reference value being provided every few milliseconds or so. In this way, as new position references are generated, the motor "chases after" or follows the position references until the position $X_{end}$ is reached.

Typically, the interpolator generates the incremental position reference values responsive to encountering an instruction in a user program in which the motor 27 is instructed to move from a current position to a new position, with the new position being specified as a parameter of the instruction. Such an instruction may be a single dimensional instruction, in which the move instruction commands only a single motor to move to a new position. Herein, such an instruction is referred to simply as a "move" instruction.

In the system 10, multi-axis coordination instructions 31 are preferably also provided. For example, as described in greater detail below, a coordinated move instruction 200 (FIG. 18) is preferably also provided that allows an operator to program multi-dimensional moves and allows the motion of multiple motors to be coordinated responsive to the user-programmed multi-dimensional move/path profile. This permits a single instruction to be used to program movement of a controlled element to move from a current position to a new position, wherein the movement to the new position involves the action of more than one motor 27. Likewise, a coordinate transformation instruction 300 (FIG. 19) allows a user to specify a move in one coordinate system and have the move implemented in another coordinate system. The multi-axis coordination instructions 31 are described in greater detail below.

B. Programming Interface

A variety of different programming interfaces may be used to control the control system 10 of FIGS. 1A–1B. Such programming interfaces may be based on standard sequential programming languages programming languages (e.g., C, C++, Visual Basic, etc), programming languages used for industrial controls (e.g. ladder diagram, structured text, function block, sequential function chart, flow charts, GML etc) or motion control programming (e.g., computer numeric control or CNC-type languages, such as RS274D), other sequential programming languages, and so on.

Figure 2:
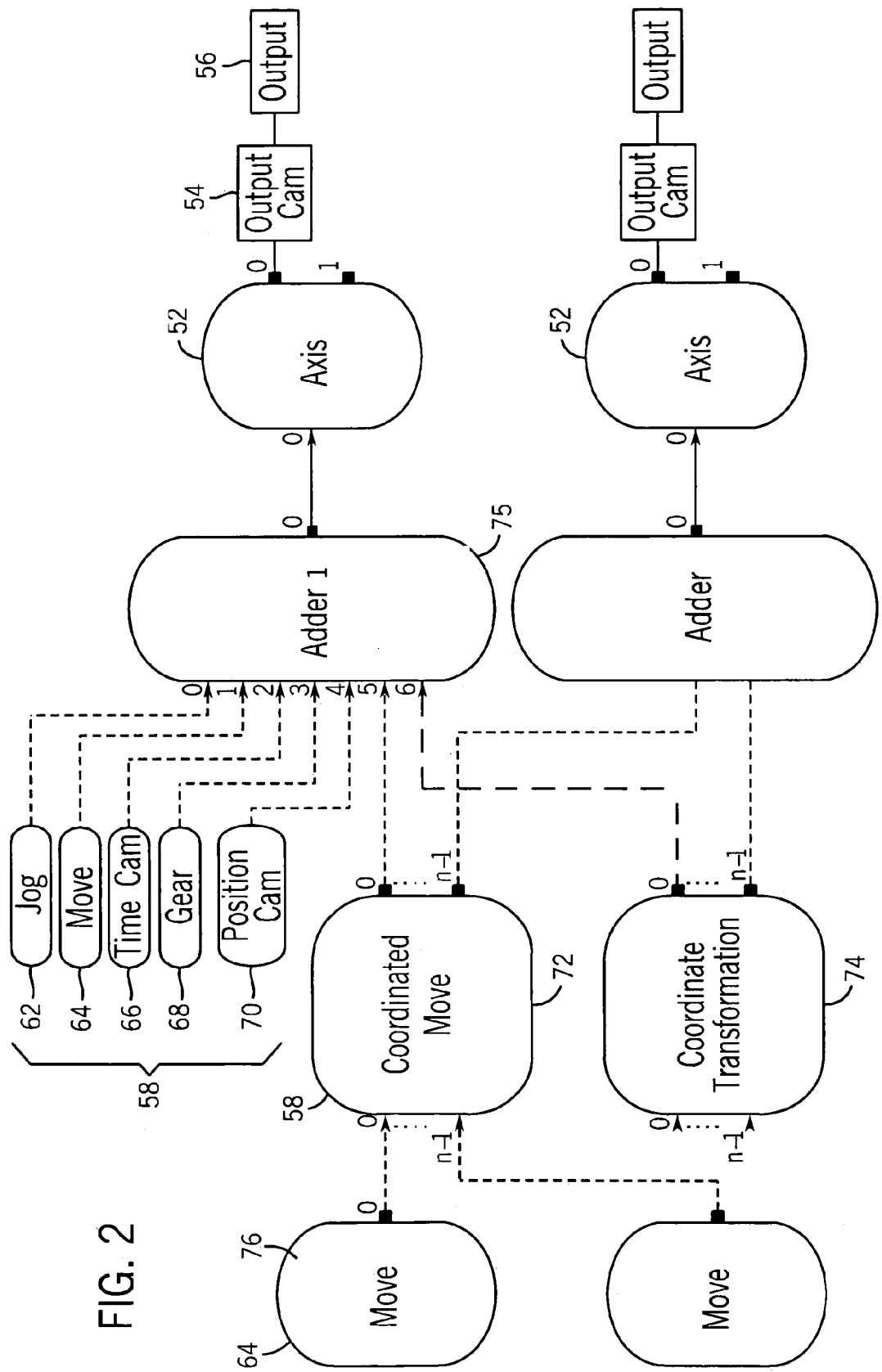
FIG. 2 is a functional block diagram showing building blocks embodied in a programming interface usable to program the control system of FIGS. 1A–1B according to an exemplary embodiment.

In the preferred embodiment, an arrangement such as that shown in FIG. 2 is employed. Referring now to FIG. 2, FIG. 2 is a functional block diagram showing building blocks embodied in a programming interface usable to program the control system 10. The building blocks include one or more motion control axis blocks 52, one or more output cam blocks 54, one or more output blocks 56, and a plurality of motion control blocks 58. The motion control blocks 58 further include one or more jog blocks 62, one or more move blocks 64, one or more time cam blocks 66, one or more gear blocks 68, one or more position cam blocks 70, one or more coordinated move blocks 72, and one or more coordinate transformation blocks 74. The motion control blocks 58 also include an adder block 75, which combines inputs (e.g., incremental position command values) from the remaining motion control blocks 58.

In one embodiment, the building blocks 52–58 are implemented as objects in an object-oriented programming environment. In an object-oriented programming environment, individual objects typically represent different physical objects (e.g., motors, sensors, etc.), relationships between physical objects (e.g., camming relationships, gearing relationships, etc), and so on. The objects are then accessed by instructions in a user program to affect operation of the physical objects or relationships therebetween. Thus, the axis blocks 52 may each be implemented as an object having services that may be invoked using one or more axis instructions, and the output cam blocks 54 may be implemented as an object having services that may be invoked using one or more output cam instructions. Further, each of the motion control blocks 58 may be implemented as objects (e.g., a jog object, a move object, a time cam object, a gear object, a position cam object, a coordinated move object, and a coordinate transformation object) having services that may be invoked using one or more respective instructions (e.g., a jog instruction, a move instruction, a time cam instruction, a gear instruction, a position cam instruction, a coordinated move instruction, and a coordinate transformation instruction).

In designing such a system, new instances of the above-mentioned objects may be created to represent new/additional devices or relationships between devices. Thus, although only a small number of building blocks 52–58 is shown, it will be appreciated that this configuration is purely for purposes of explanation and that practical systems are likely to have a configuration different than that shown in FIG. 2, typically with many additional ones of the building blocks 52–58. For example, new instances of the axis object may be created to represent each additional motion control axis (e.g., a motor, a shaft or other device driven by a motor, virtual axis, and so on), and various axis instructions may be incorporated into a user program to invoke the services of the axis objects. The axis instructions may then be executed to control movement of the motion control axes (e.g., to control a position such as an absolute position, relative position, delta position, etc., of the motion control axis). Other instructions may be executed to control output devices using the services of the output objects 56, for example, as a function of motor position (actual or measured) using output cam objects 54. Typically, the operation of the output devices 50 will at least to some extent be cyclic, and the output cam objects 54 may be used to synchronize the operation of the output devices to rotation of the shaft of a motor 27 (or to movement of a device driven by the shaft of the motor 27).

The motion control blocks 58 allow the motion control axis to be controlled in different ways. The jog block 62 permits the user (via a jog instruction) to specify a new velocity at which the shaft of the motor 27 is to move. The move block 64 permits the user (via a move instruction) to specify a new position for the shaft of the motor 27. The time cam block 66 permits the user (via a time cam instruction) to specify an axis position profile which specifies axis position as a function of time. The gear cam block 68 permits the user (via a gear instruction) to specify an electronic gearing relationship between the shaft of the motor 27 and the shaft of another motor (not shown) in the system 10. The position cam block 70 permits the user (via a position cam instruction) to specify an axis position profile which specifies axis position for the shaft of the motor 27 as a function of a position of the shaft of another motor (not shown) in the system 10. In the case of the gear block 64 and the position cam block 70, it will be appreciated that these blocks will receive inputs from other axis blocks similar to the axis block 52, which may in turn receive inputs from motion blocks similar to the motion blocks 58. The coordinate move block 72 and the coordinate transformation block 74 are described in greater detail below. It is therefore seen that the complexity of the motion control system 10 can be increased by providing multiple axes (and therefore multiple motors or other devices) and defining various relationships between the axes and other devices. Fewer, more, or different building blocks and instructions may also be used. Of course, it should be understood that these features, and all of the other features described herein, may also be implemented without using object-oriented techniques.

Referring back to FIGS. 1A–1B, each of the motors 27 is represented by an axis block 52 that is stored as control logic in the industrial controllers 12' (or motion controllers 23). It may also be noted, however, that virtual axes may also be used. Accordingly, in some cases, axis blocks 52 may be used in situations where there is no associated physical motor.

The control logic associated with each of the axis blocks 52 generates control signals for a respective one of the motors 27 responsive to inputs from the adder block 75. For example, in the preferred embodiment, described in greater detail below, the coordinated move block generates incremental position reference commands for each motion control axis block 52. Each axis block 52 uses the position reference commands as input to the nested feedback control arrangement described above in connection with FIG. 1B. The position of the motor 27 is monitored by the feedback device 29 which provides feedback information to the axis block 52. Alternatively, the feedback device 29 may be used to monitor the position of a device driven by the motor 27.

II. Coordinated Move and Coordinate Transformation Blocks

The coordinated move block 72 and the coordinate transformation block 74 will now be described in greater detail. The coordinated move block 72 provides a programmer of the system 10 with user-friendly mechanisms for controlling motion of multiple motion control axes (e.g., multiple motors 27) in a coordinated fashion. The coordinate transformation block 74 provides the programmer with a mechanism for relating the axes of one coordinate system to the axes of another coordinate system. Although two axes are shown, it will be understood that the blocks 72 and 74 may be used in connection with three axes or any other number of axes. If an object oriented approach is used, interfaces to the coordinated move block 72 and the coordinate transformation block 74 may be provided by way of one or more multi-axis coordination instructions 31, described in greater detail in Section III, below.

The coordinated move block 72 preferably provides an interface for linear moves in multi-dimensional Cartesian space and circular moves in two and three-dimensional Cartesian space. The preferred algorithm used for the path planning permits dynamic parameter changes for maximum velocity, acceleration, and deceleration along the path. It also provides smooth transitions (without spikes in acceleration) from one coordinated move path segment to the next.

The coordinate transformation block 74 preferably provides an interface for relating the axes of a source coordinate system to the axes of the target coordinate system. The possible source and target systems may include Cartesian coordinate systems in multi-dimensional space, cylindrical and spherical coordinate systems in two- and three-dimensional space, and independent and dependent kinematic coordinate systems in two- and three-dimensional space. The coordinate transformation block 74 enables translation and rotation from the source to the target system.

Figure 3:
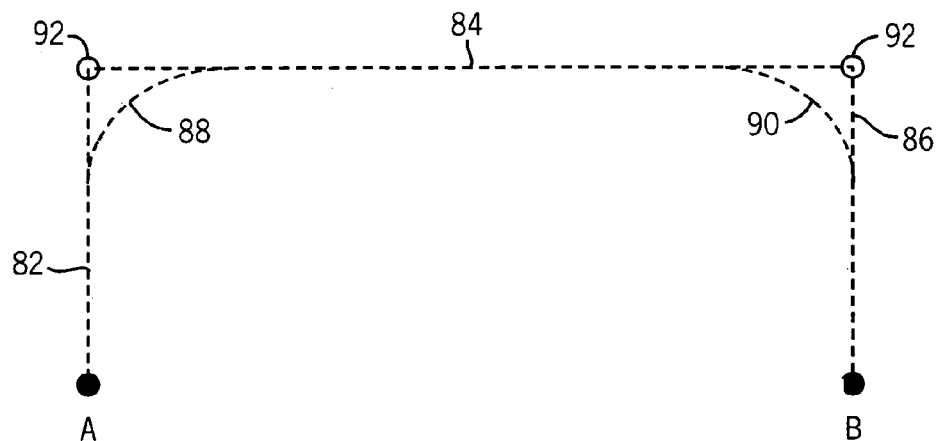
FIGS. 3–4 are examples of multi-dimensional path profiles that may be generated for use in connection with the control system of FIGS. 1A–1B according to an exemplary embodiment.
Figure 4:
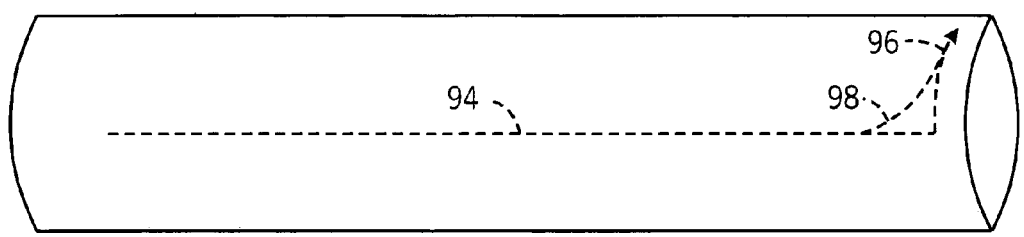

Referring now to FIGS. 3–4, examples of the operation of the coordinated move block 72 are shown. FIGS. 3–4 both show path profiles followed by a controlled element that is controlled by the coordinated move block 72. In FIG. 3, an exemplary two-dimensional path profile is shown which may be executed, for example, in the context of a pick-and-place system. Thus, as shown in FIG. 3, a pick-up mechanism may pick up a part at point A, move up along path segment 82, move over along path segment 84, and move down along path segment 86 to a placement point B. The path segments 82, 84 and 86 are not tangential to each other. Accordingly, transitioning path segments 88 and 90 are also shown which extend between and connect the path segments 82, 84 and 86. The transitioning path segments 88 and 90 transition movement from trajectories along the path segments 82 and 84 to trajectories along the path segment 84 and 86, respectively. In the context of the pick-and-place example, the transitioning path segments 88 and 90 allow the pick-and-place mechanism to smoothly transition between the path segments 82, 84 and 86 while maintaining a smooth acceleration profile and while not having to slow down. The path segments 88 and 90 may have shapes which are optimized for smooth path transitions and need not be circular segments.

Preferably, for programming convenience, the programming interface permits the programmer to specify only the path segments 82, 84 and 86 and the programmer is not required to also specify the transitioning path segments 88 and 90. It may be the case that the programmer is not particularly concerned about the exact manner in which the transitioning path segments are executed, and therefore this arrangement permits the programmer to program the overall path profile by programming only three path segments instead of five, which is more convenient.

The path segments 82, 84 and 86 may be specified as parameters in user instructions of a user program. For example, a separate coordinated move instruction may be used to program each of the segments 82, 84 and 86. In FIG. 3, the path segments 82, 84 and 86 are shown to be linear path segments. For each linear path segment, the coordinated move instruction may be used to specify endpoints 92 of the path segment and/or transition points or other parameters indicating when the move may begin transitioning from one linear path segment to the next. The additional transitioning path segments 88 and 90 are generated automatically by the coordinated move block 72 and do not need to be specified by the user. Of course, although the path profile shown in FIG. 3 comprises a series of user-specified non-tangential path segments 82, 84 and 86 connected by transitioning path segments 88 and 90, the user is also permitted specify path segments that are tangential (such that there is no need for transitioning path segments) for other portions of the overall path.

In operation, movement of the controlled element is first driven along the segment 82 responsive to a first coordinated move instruction in a user program. When the transition point 92 is reached, the coordinated move block 72 operates to control movement of the controlled element along the transition path segment 88. This process continues until the placement point B at the end of path segment 86 is reached. Typically, the transition from one path segment to the next uses the end dynamics of the current path segment as the start dynamics for the next path segment.

In FIG. 4, two path segments 94 and 96 specified by a user and an additional transitioning path segment 98 are shown. As shown in FIG. 4, the path segment 94 is generally linear and the path segment 96 is generally circular. In one embodiment (FIG. 18), the same coordinated move instruction may be used by an operator to program both types of moves. In another embodiment (FIGS. 23–24), one instruction may be used to program linear moves and another instruction may be used to program circular moves.

As shown in FIG. 4, the path segment 94 and the path segment 96 are located in different three-dimensional planes. The path segment 94 is generally normal to the plane defined by the path segment 96 and, accordingly, there is no single three dimensional plane that contains both path segments 94 and 96. Nevertheless, the coordinated move block 72 is able to generate the transitioning path segment 98 which is able to transition between the non-tangential, non-coplanar path segments. The transitioning path segment need not be specified by a user, which makes it easier for the user to program the system 10.

Figure 5:
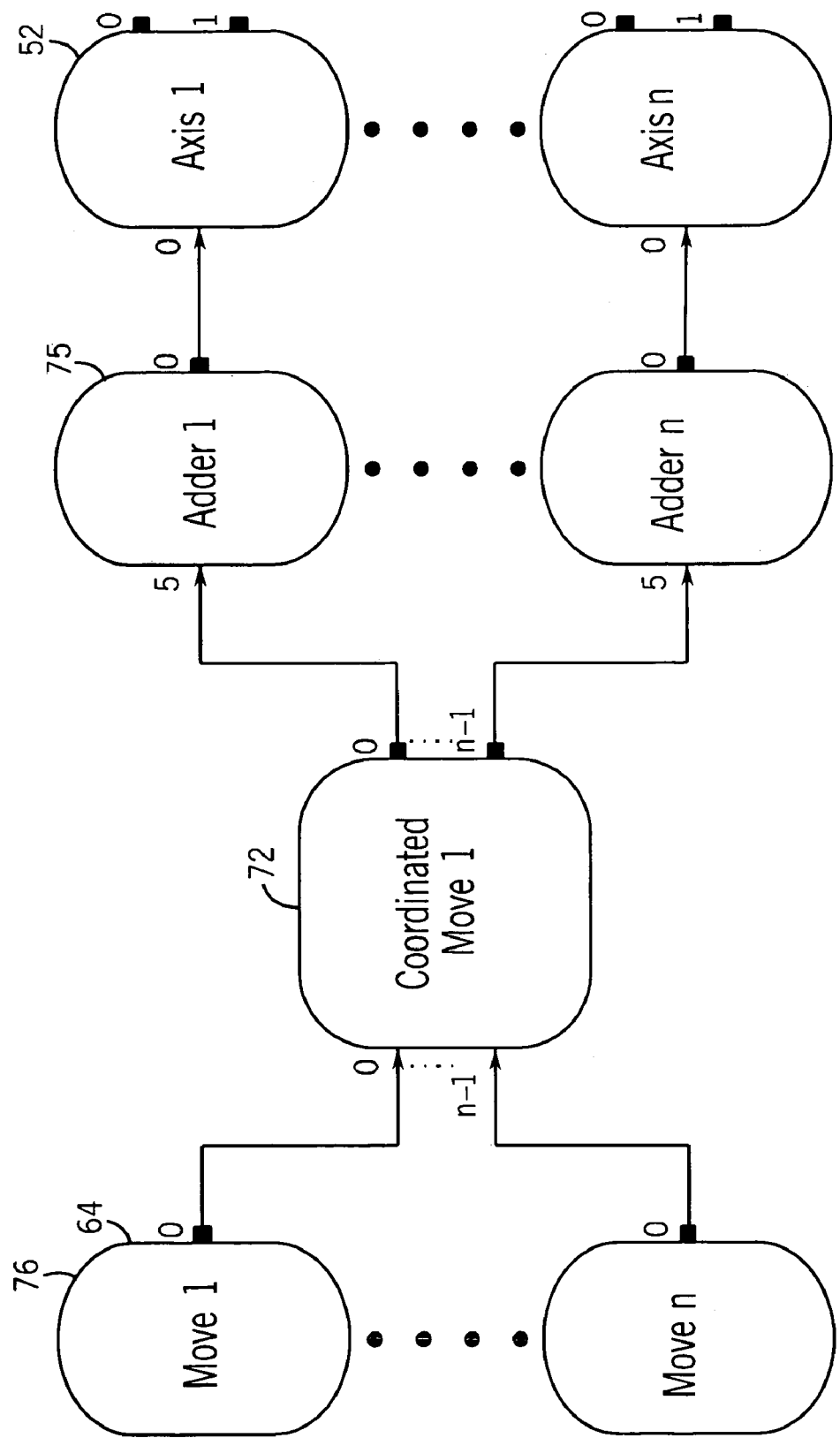
FIG. 5 is a functional block diagram showing a coordinated move block of FIG. 2 in greater detail.

As will be seen below, in the coordinated move instruction 200, the user specifies a group of coordinated motion control axes (e.g., corresponding to the motors 27) which define the target coordinate system for the move. Generally speaking, the target coordinate systems may be different from one path segment to the next. With reference to FIG. 5, each coordinated move is preferably transformed into multiple individual orthogonal moves (represented as move blocks 76) of a source coordinate system during initial execution of a coordinated move instruction 200. In the context of the coordinated move block 72, the source coordinate system is defined by the coordinated move block 72 and is not user-specified. As detailed below, in one embodiment, the source coordinate system is defined based on the trajectory of the path segment. For example, the source coordinate system may be defined as having one axis which is tangential to the path segment, along with additional axes which are normal and bi-normal to the tangential axis.

In one embodiment, for the transitioning path segments, the source coordinate system is defined relative to the next path segment (e.g., when transitioning from path segment 82 to path segment 84, a source coordinate system defined based on the path segment 84 may be used). As noted previously, however, the transition from one path segment to the next preferably uses the end dynamics of the current path segment as the start dynamics for the next path segment. Accordingly, in a more preferred embodiment, as the move transitions dynamically from the source coordinate system that was used in connection with path segment 82 to the source coordinate system to be used in connection with path segment 84, the move's dynamics (position, velocity and acceleration) change gradually from one path segment to the next path segment. This arrangement facilitates providing a smooth acceleration profile as the transition from one path segment to the next path segment occurs. The interpolators are reinitialized with each path segment and the orientation of the interpolators remains constant during the execution of each path segment.

Because each coordinated move is transformed into multiple individual orthogonal moves, a separate interpolator may be provided for each orthogonal move (that is, each move block 76 may be provided with its own separate interpolator). Each interpolator provides a separate respective set of incremental position reference values for each of the axes of the source coordinate system during a dynamic phase of the move instruction. Assuming for example a three dimensional source coordinate system, three interpolators may be used which each generate a set of incremental position reference values in the source coordinate system. The incremental position reference values are generated substantially simultaneously by the interpolators, e.g., in accordance with regular update cycles (which may for example be in the range of hundreds of milliseconds to microseconds).

The coordinated move block 72 includes coordinate transformation logic which performs a coordinate transformation to transform the incremental position reference values commands from the source coordinate system to a target coordinate system. Whereas the source coordinate system is preferably defined based on the trajectory of the move, the target coordinate system is preferably defined based on the motion control axes which correspond to the axes of movement of three respective motors, as previously noted. The coordinate transformation logic is therefore able to transform the incremental position reference values generated by the move blocks 76 in the source coordinate system to position reference values which are useable by the motion controllers 23 in the target coordinate system.

With reference to FIG. 2, the move blocks 76 are connected to the coordinated move block 72. As a result, the outputs of the individual move objects 76 provide the inputs (incremental position reference values) to the coordinated move block 72, and the coordinated move block 72 is responsible for transforming the individual moves back into the target coordinate system and supplying these coordinates to the axis blocks 52. After completion of the individual moves, the target coordinates are preferably adjusted to the target position values, to accommodate any rounding errors in the transformation. This routine may be executed in the coordinated move block 72.

Figure 6:
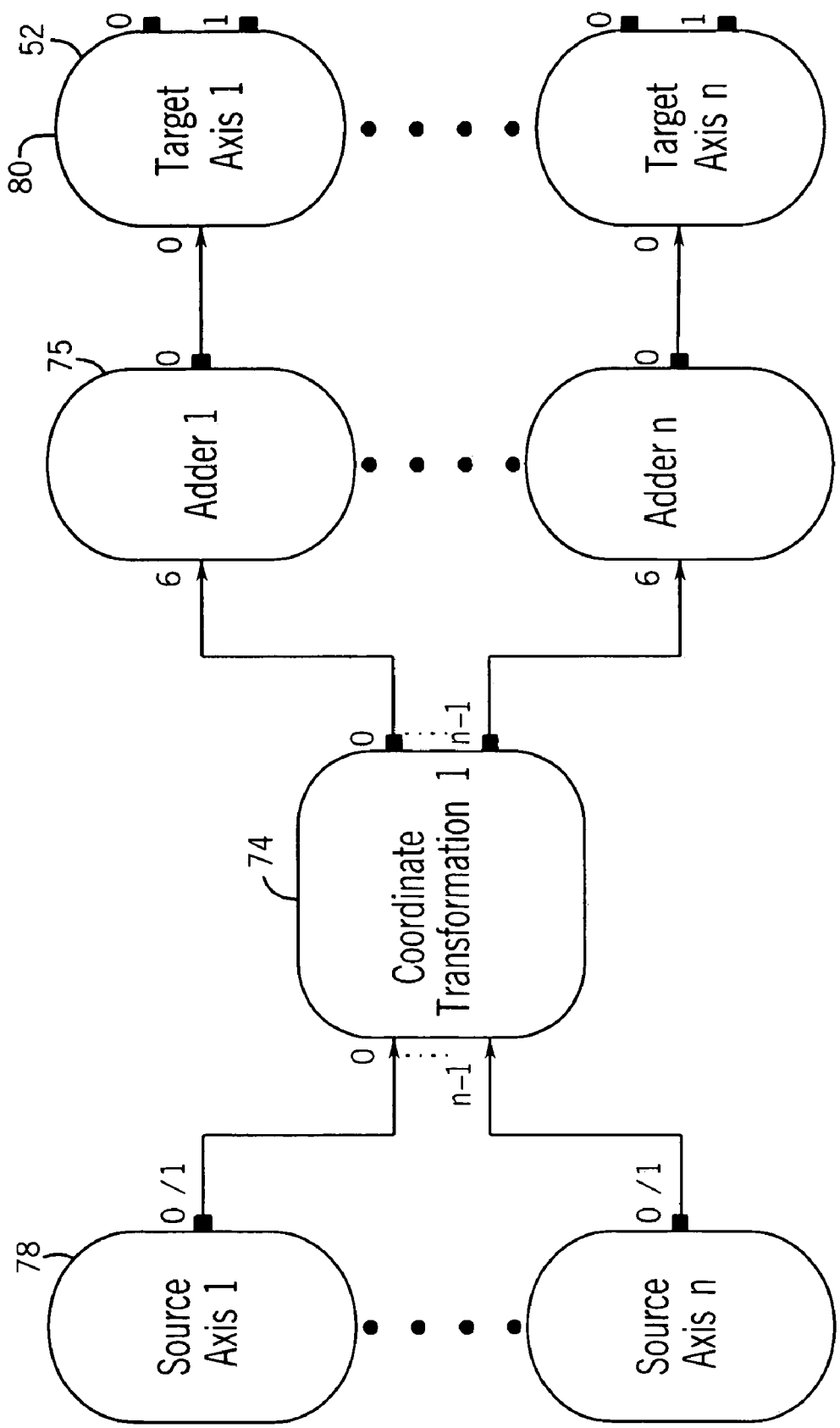
FIG. 6 is a functional block diagram showing a coordinate transform block of FIG. 2 in greater detail.

With reference to FIG. 6, the coordinate transformation block 74 preferably provides an interface for relating the axes of a source coordinate system to the axes of the target coordinate system. As shown in FIG. 6, the axes of a source system are connected to the coordinate transformation block 74. The coordinate transformation block 74 is used to transform the incremental position reference values in the source coordinate system from the axis blocks 78 into incremental position reference values in the target coordinate system for the axis blocks 80.

Figure 7:
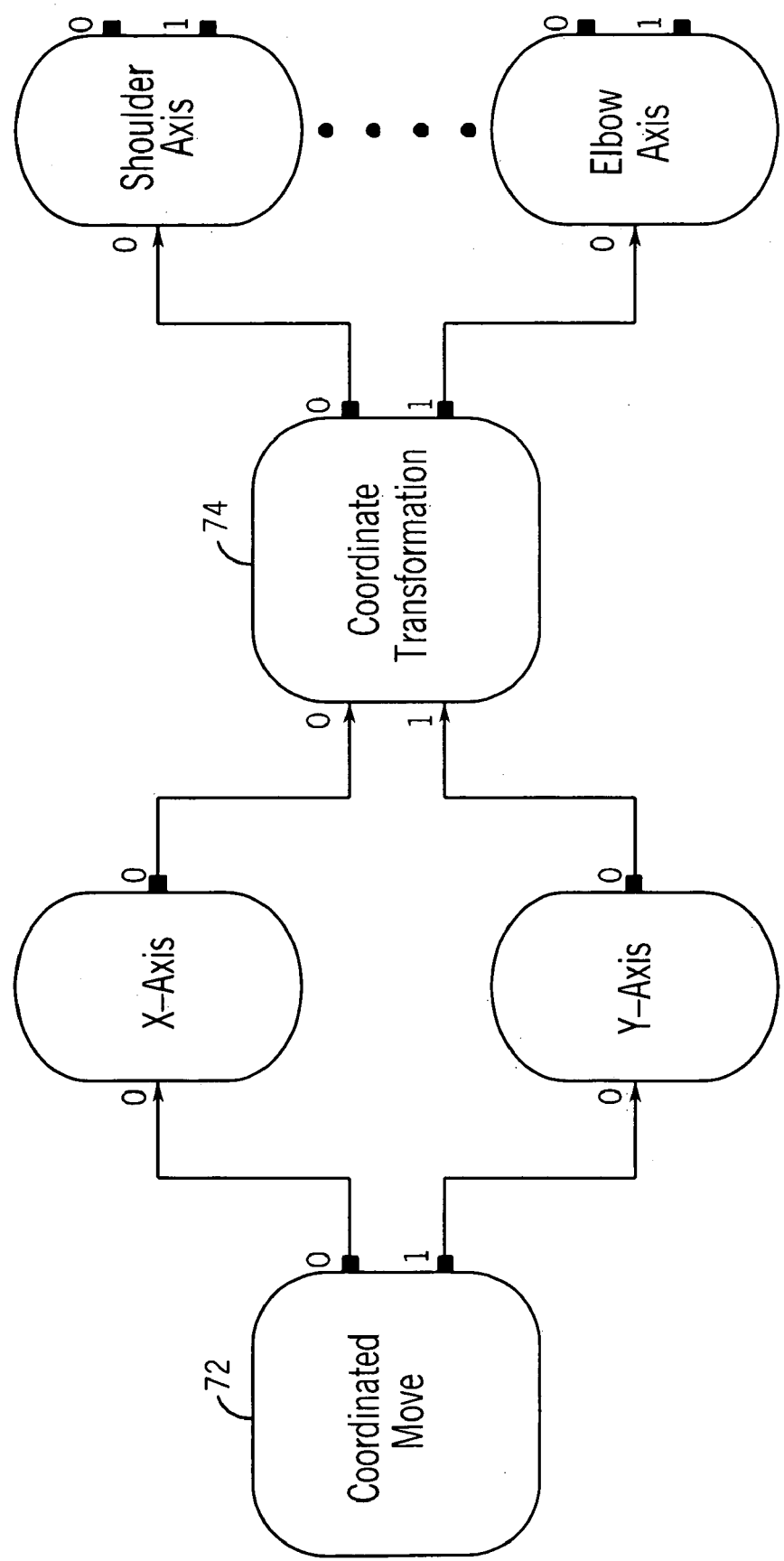
FIG. 7 is a functional block diagram showing the coordinate transformation block of FIG. 6 in combination with the coordinated move block of FIG. 2.

With reference to FIG. 7, the coordinated move block 72 and coordinate transformation block 74 may also be used in combination. For example, in the case of a two-axis robot, it may be desirable to control the shoulder and elbow axis of the robot by commanding a path in Cartesian space. In this configuration, the coordinated move block 72 may provide the command position for the x- and y-axis. The coordinate transformation block 74 may then be responsible for transforming the x- and y-axis positions into the shoulder and elbow axis positions.

The source axis may provide either the actual or command coordinates as input for the coordinate transformation block 74. This allows multi-dimensional interpolation to operate in one domain (e.g., an x-y coordinate system) even though the hardware (e.g., motors, feedback devices) are operating in another domain (e.g., a shoulder-axis, elbow-axis coordinate system).

In FIGS. 5–7, the coordinated move block 72 and the coordinate transformation block 74 are shown as being connected to multiple axis blocks 78. Each axis block 78 is associated with a different corresponding motor. However, this relationship may be direct or indirect. For example, each of the axis blocks 78 may directly correspond to an associated motor. Alternatively, one or more of the axis blocks 78 may be a virtual axis which is connected by way of one or more other blocks (not shown) to an associated motor.

As apparent from the above discussion, in the preferred embodiment, the coordinated move path is calculated using multi-dimensional interpolation with coordinate transformation. This approach may offer such advantages as support for dynamic path transitions, smooth path transitions, independent specification of acceleration and deceleration, and relatively easy implementation. Other approaches, such as one-dimensional interpolation with coordinate transformation, superimposed interpolation of two profiles with coordinate transformation, interpolation with finite impulse response filters, interpolation with non-uniform rational B-splines, and interpolation with Bezier splines may be used. In some cases, these other approaches offer faster speed for short move distances. As will be appreciated, each of these other approaches offers their own advantages and disadvantages.

The coordinated move block 72 and the coordinate transformation block 74 preferably support a variety of coordinate systems. Section II(A) describes examples of coordinate systems that may be supported and associated coordinate transformation equations. Section II(B) describes examples of supported coordinated moves. Section II(C) describes examples of auxiliary algorithms that may be used to derive the transformation matrices. Section II(D) describes examples of instruction interfaces for coordinated moves and the relationship to the coordinated move block 72 and the coordinate transformation block 74. The equations and algorithms in Sections II(A)–II(C) may be embodied in and employed by the coordinated move block 72 and the coordinate transformation block 74 in connection with providing services invoked by the instructions described in Section II(D). While Sections II(A)–II(D) provide examples of mathematical equations, algorithms, instruction interfaces, and techniques that may be used to implement the functionality described herein, it will be appreciated that other equations, algorithms, interfaces and techniques may also be used.

A. Coordinate System Description

The coordinated move block 72 and the coordinate transformation block 74 preferably supports a variety of different coordinate systems. These coordinate systems may include, for example, multi-dimensional Cartesian coordinate systems, two- and three-dimensional cylindrical, and spherical coordinate systems as well as two and three-dimensional independent and dependent coordinate systems. The two-dimensional cylindrical and spherical coordinate system can also be viewed as polar coordinate system. The independent and dependent coordinate systems represent specific kinematic relationships. Of course, depending on the application, additional and/or different coordinate systems may also be used.

For purposes of mathematical characterization, each coordinate system is specified by a coordinate origin, a coordinate basis, and a scale of measurement along the basis axes or curves. With these specifications, a point in space is defined by a set of coordinates that specify the multitude of the scale of measurement along each basis axes or curve.

In addition to defining a point in space with one coordinate system, it also is desirable to be able to transform the coordinates of a point from one coordinate system to another. Coordinate transformation is also desirable for the implementation of the coordinated moves. The principal coordinate transformations are translation (shifting) and rotation of a Cartesian coordinate system and transforming cylindrical, spherical, independent, and dependent coordinate systems to and from a Cartesian coordinate system. All other transformations can be derived from these principal coordinate transformations. The coordinate transformations described in this section are used in both the coordinated move block 72 and the coordinate transformation block 74.

This section describes these various coordinate systems. The following table provides a description of vector math notations used herein:

TABLE I

Exemplary Mathematical Notations

| NOTATION | DESCRIPTION |
|---|---|
| $x$ | Scalar value |
| $P = (x_1, \ldots, x_n)$ | Point or Position (text format) |
| $P = \begin{bmatrix} x_1 \\ \vdots \\ x_n \end{bmatrix}$ | Point or Position (equation format) |
| $\bar{v} = [v_1, \ldots, v_n]$ | Vector (text format) |
| $\bar{v} = \begin{bmatrix} v_1 \\ \vdots \\ v_n \end{bmatrix}$ | Vector (equation format) |
| $\bar{v}^T = [v_1 \ldots v_n]$ | Transposed vector (equation format) |
| $\bar{M} = [\bar{v}_1, \ldots, \bar{v}_n]$ | Matrix (text format) |
| $\bar{M} = [\bar{v}_1 \cdots \bar{v}_n]$ $= \begin{bmatrix} v_{11} & \cdots & v_{n1} \\ \vdots & \ddots & \vdots \\ v_{1m} & \cdots & v_{nm} \end{bmatrix}$ | Matrix (equation format) |
| $\bar{M}^T = \begin{bmatrix} \bar{v}_1^T \\ \vdots \\ \bar{v}_n^T \end{bmatrix}$ $= \begin{bmatrix} v_{11} & \cdots & v_{1m} \\ \vdots & \ddots & \vdots \\ v_{n1} & \cdots & v_{nm} \end{bmatrix}$ | Transposed matrix (equation format) |
| $B = \{\bar{v}_1, \ldots, \bar{v}_n\}$ | Basis of a coordinate system |
| $\operatorname{atan}(x_2, x_1)$ | Angle between the vector from the origin O to the point P $(x_1, x_2)$ and the positive $\bar{x}_1$-axis with the angle limited to the range $(-\pi, \pi)$. |
| $\bar{v}^T \bar{w} = v_1 w_1 + \ldots + v_n w_n$ | Inner product of two vectors |
| $\bar{v} \times \bar{w} = \begin{bmatrix} v_2 w_3 - v_3 w_2 \\ v_3 w_1 - v_1 w_3 \\ v_1 w_2 - v_2 w_1 \end{bmatrix}$ | Outer product of two vectors |
| $\|\bar{v}\| = \sqrt{\bar{v}^T \bar{v}}$ | Length or norm of vector $\bar{v}$ |
| $\det \bar{M}$ | Determinant of matrix $\bar{M}$ |
| $\mu_{ij} = (-1)^{i+j} \det \bar{M}_{ij}$ | Cofactor corresponding to element $m_{ij}$ of matrix $\bar{M}$. The determinant $\det \bar{M}_{ij}$ is called the ijth minor of the matrix $\bar{M}$, where $\bar{M}_{ij}$ is the matrix obtained by deleting the ith column and jth row of the matrix $\bar{M}$. |

Herein, the term "axis" refers to a reference line of a coordinate system. The term "motion axis" refers to a linear or rotary axis having a linear or angular coordinate. A motion axis may be physical hardware (e.g., a motor) or virtual (e.g., used for data processing purposes). The term "unit vector refers to a vector whose norm is one. The term "orthogonal vectors" refers to vectors whose inner product is zero. The term "orthonormal vectors" refers to orthogonal unit vectors. The term "orthogonal matrix" refers to a matrix whose column vectors are mutually orthonormal.

1. Cartesian Coordinate System

Figure 8:
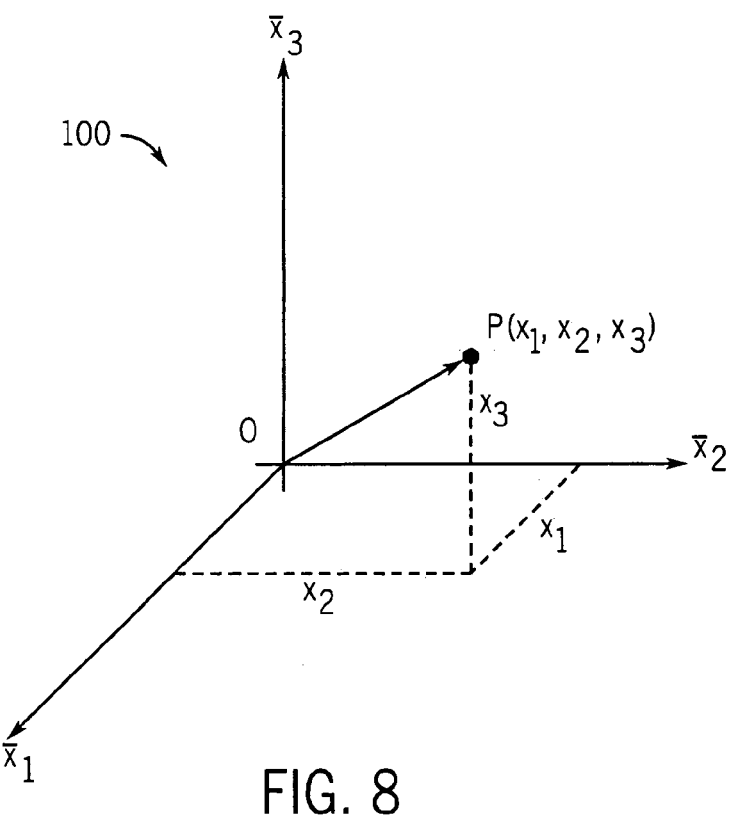
FIGS. 8–14 are examples of coordinate systems that may be used in programming the control system of FIGS. 1A–1B according to an exemplary embodiment.

Referring now to FIG. 8, FIG. 8 shows the geometric relationship of a three-dimensional Cartesian coordinate system 100. As shown in FIG. 8, the Cartesian coordinate system 100 is defined by a coordinate origin O and mutually orthogonal coordinate axes $\{\bar{x}_1, \ldots, \bar{x}_n\}$. With the same linear scale of measurement on the individual axes, the Cartesian coordinates $(x_1, \ldots, x_n)$ define a point P in Cartesian coordinate space.

Figure 9:
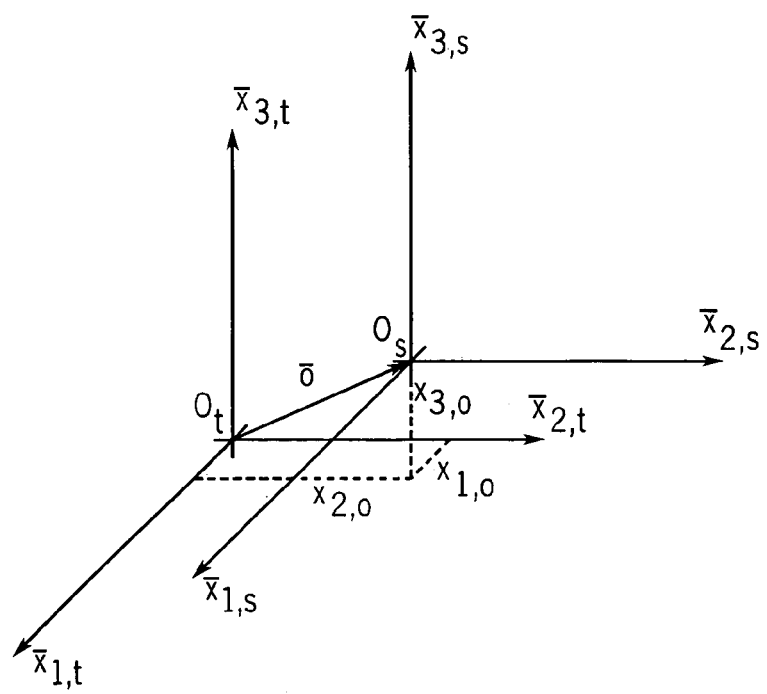

Referring now to FIG. 9, a translation transformation may be used to shift the origin of a Cartesian coordinate system. FIG. 9 illustrates the geometric relationship between the source and target coordinate systems of the translation transformation. The coordinates $(x_{1,t}, \ldots, x_{n,t})$ of a point $P_t$ specified in the target system depend on the coordinates $(x_{1,s}, \ldots, x_{n,s})$ of the same point $P_s$ specified in the source system and the offset vector $\bar{o}=(x_{1,o}, \ldots, X_{n,o})$.

The algebraic relationship between the coordinates $(x_{1,s}, \ldots, x_{n,s})$ of a point $P_s$ specified in the source system and the coordinates $(x_{1,t}, \ldots, x_{n,t})$ of the same point $P_t$ specified in the target system is defined by the following equation:

$$P_t = P_s + \bar{o}$$

$$\begin{bmatrix} x_{1,t} \\ \vdots \\ x_{n,t} \end{bmatrix} = \begin{bmatrix} x_{1,s} \\ \vdots \\ x_{n,s} \end{bmatrix} + \begin{bmatrix} x_{1,o} \\ \vdots \\ x_{n,o} \end{bmatrix}$$

The inverse transformation is defined by the following equation:

$$P_s = P_t - \bar{o}$$

$$\begin{bmatrix} x_{1,s} \\ \vdots \\ x_{n,s} \end{bmatrix} = \begin{bmatrix} x_{1,t} \\ \vdots \\ x_{n,t} \end{bmatrix} - \begin{bmatrix} x_{1,o} \\ \vdots \\ x_{n,o} \end{bmatrix}$$

Figure 10:
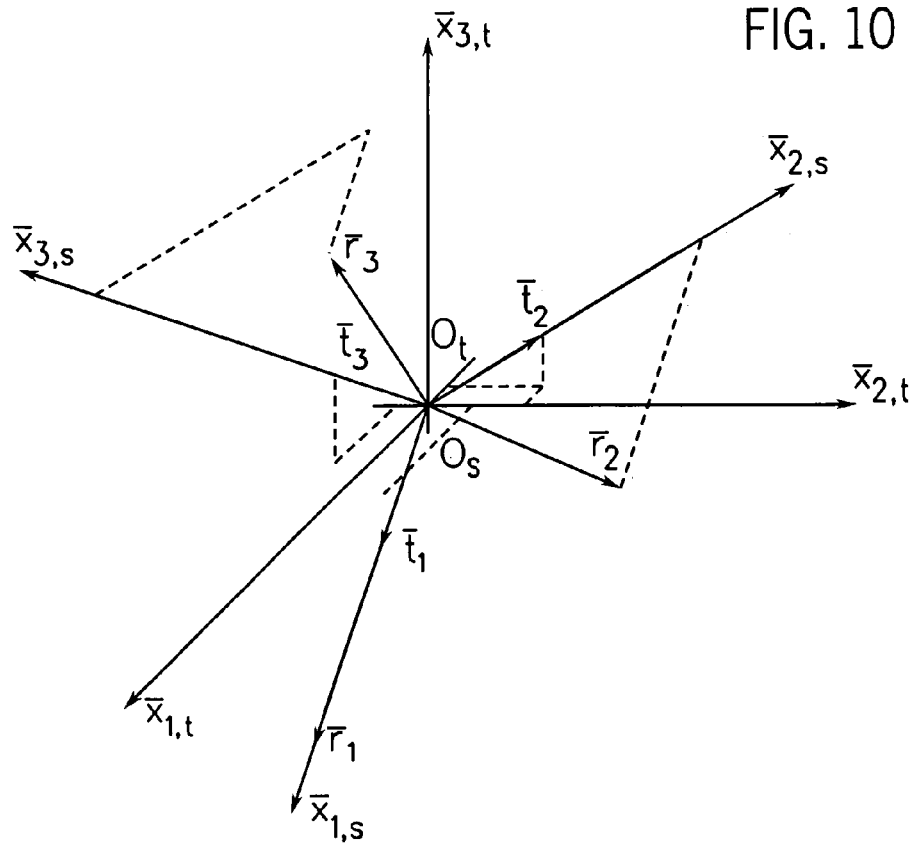

Referring now to FIG. 10, a rotation transformation may be used to rotate the axes of a Cartesian coordinate system. FIG. 10 illustrates the geometric relationship between the source and target coordinate systems in a rotation transformation. The coordinates $(x_{1,t}, \ldots, x_{n,t})$ of a point $P_t$ specified in the target system depend on the coordinates $(x_{1,s}, \ldots, x_{n,s})$ of the same point $P_s$ specified in the source system and the rotation matrix $\bar{R}=[\bar{r}_1, \ldots, \bar{r}_n]$. The columns of the rotation matrix are the basis vectors $\{\bar{r}_1, \ldots, \bar{r}_n\}$ of the source system specified in the target system. Since these vectors do not necessarily represent a mutually orthonormal basis, they are transformed into such a basis $\{\bar{t}_1, \ldots, \bar{t}_n\}$ by applying the auxiliary algorithm of Section II(C).

The algebraic relationship between the coordinates $(x_{1,s}, \ldots, x_{n,s})$ of a point $P_s$ specified in the source system and the coordinates $(x_{1,t}, \ldots, x_{n,t})$ of the same point $P_t$ specified in the target system is defined by the following equation.

$$P_t = \bar{T} P_s$$

$$\begin{bmatrix} x_{1,t} \\ \vdots \\ x_{n,t} \end{bmatrix} = [\bar{t}_1 \cdots \bar{t}_n] \begin{bmatrix} x_{1,s} \\ \vdots \\ x_{n,s} \end{bmatrix}$$

Since the transformation matrix T is orthogonal, the above equation can be restated.

$$P_t = \bar{T} P_s$$

$$\bar{T}^T P_t = \bar{T}^T \bar{T} P_s$$

$$= \begin{bmatrix} \bar{t}_1^T \\ \vdots \\ \bar{t}_n^T \end{bmatrix} [\bar{t}_1 \cdots \bar{t}_n] P_s$$

$$= \begin{bmatrix} \bar{t}_1^T \bar{t}_1 & \cdots & \bar{t}_1^T \bar{t}_n \\ \vdots & \ddots & \vdots \\ \bar{t}_n^T \bar{t}_1 & \cdots & \bar{t}_n^T \bar{t}_n \end{bmatrix} P_s$$

$$= \bar{I} P_s$$

$$= P_s$$

Therefore, the inverse transformation is defined by the following equation.

$$P_s = \bar{T}^T P_t$$

$$\begin{bmatrix} x_{1,s} \\ \vdots \\ x_{n,s} \end{bmatrix} = \begin{bmatrix} \bar{t}_1^T \\ \vdots \\ \bar{t}_n^T \end{bmatrix} \begin{bmatrix} x_{1,t} \\ \vdots \\ x_{n,t} \end{bmatrix}$$

Similarly, the algebraic relationship between a vector $\bar{v}_s$ at the point $P_s$ specified in the source system and the same vector $\bar{v}_t$ specified in the target system is defined by $\bar{v}_t = \bar{T} \bar{v}_s$ and $\bar{v}_s = \bar{T}^T \bar{v}_t$.

2. Cylindrical Coordinate System

Figure 11:
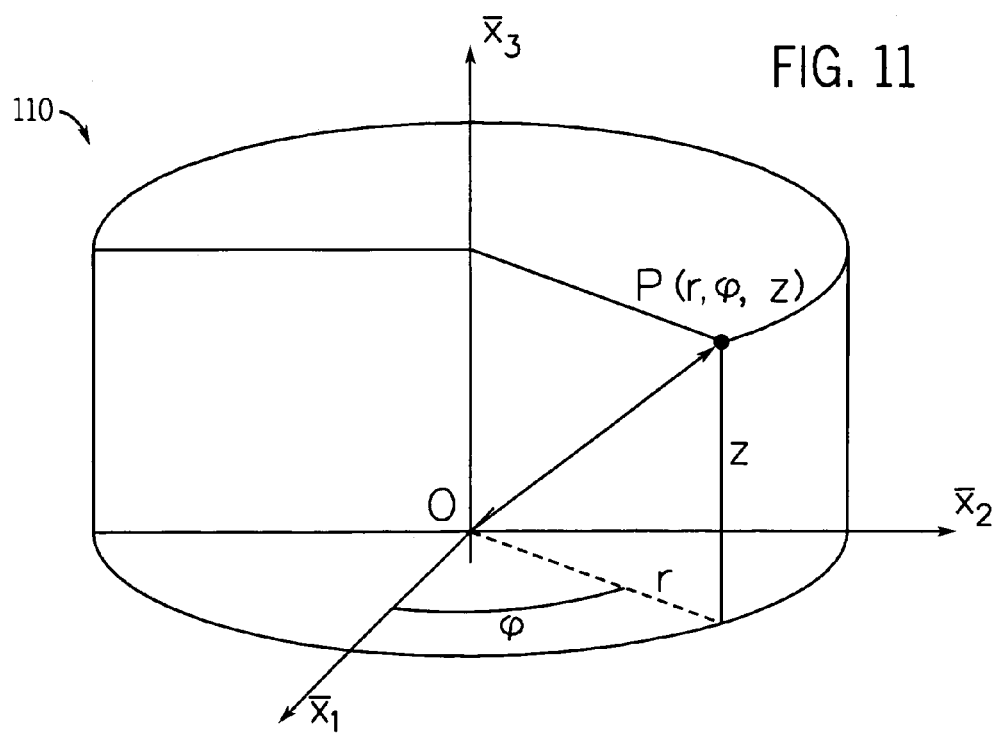

Referring now to FIG. 11, FIG. 11 shows the geometric relationship of a three-dimensional cylindrical coordinate system 110. The coordinate system 110 is defined by a coordinate origin O and three mutually orthogonal coordinate curves $\{r, \phi, z\}$ (tangents are orthogonal except along the $\bar{x}_3$-axis). With the same linear scale of measurement on the curves $\bar{r}$ and $\bar{z}$ and a radian scale of measurement on the curve $\bar{\phi}$, the cylindrical coordinates $(r, \phi, z)$ define a point P in cylindrical coordinate space.

A transformation may be performed to transform coordinates in the cylindrical coordinate system to coordinates in a Cartesian coordinate system. Specifically, the algebraic relationship between the coordinates $(r, \phi, z)$ of a point $P_s$ specified in the cylindrical system and the coordinates $(x_1, x_2, x_3)$ of the same point $P_t$ specified in the Cartesian system is defined by the following equation.

$$P_t = f_{Cyl. \to Cart.}(P_s)$$

$$\begin{bmatrix} x_1 \\ x_2 \\ x_3 \end{bmatrix} = \begin{bmatrix} r\cos\varphi \\ r\sin\varphi \\ z \end{bmatrix} \qquad 5$$

Similarly, the algebraic relationship between the coordinates $(v_r, v_\varphi, v_z)$ of a vector $\overline{v}_s$ specified in the cylindrical system and the coordinates $(v_1, v_2, v_3)$ of the same vector $\overline{v}_t$ specified in the Cartesian system at the point $P_s$ is defined by the following equation.

$$\overline{v}_t = g_{Cyl.\to Cart.}(P_s, \overline{v}_s)$$

$$\begin{bmatrix} v_1 \\ v_2 \\ v_3 \end{bmatrix} = \begin{bmatrix} v_r\cos\varphi - v_\varphi\sin\varphi \\ v_r\sin\varphi + v_\varphi\cos\varphi \\ v_z \end{bmatrix}$$

A transformation may also be performed to transform coordinates in the Cartesian system to coordinates in cylindrical coordinate system. In general, the coordinates $(x_1, x_2, x_3)$ of a point $P_s$ specified in the Cartesian system uniquely define the coordinates $(r, \phi, z)$ of the same point $P_t$ specified in the cylindrical system. In the special case that the point $P_s$ is located on the $\overline{x}_3$-axis, the coordinates $(q_1, q_2, q_3)$ of a vector $\overline{q}_s$, which is non-parallel to the $\overline{x}_3$-axis, are used to uniquely define the coordinate $\phi$. The algebraic relationship between the coordinates $(x_1, x_2, x_3)$ of the point $P_s$ and the coordinates $(r, \phi, z)$ of the same point $P_t$ is defined by the following equation.

$$P_t = f_{Cart.\to Cyl.}(P_s, \overline{q}_s)$$

$$\begin{bmatrix} r \\ \varphi \\ z \end{bmatrix} = \begin{cases} \begin{bmatrix} \sqrt{x_1^2 + x_2^2} \\ \operatorname{atan}(x_2, x_1) \\ x_3 \end{bmatrix} & \text{for } x_1 \neq 0 \text{ or } x_2 \neq 0 \\ \begin{bmatrix} 0 \\ \operatorname{atan}(q_2, q_1) \\ x_3 \end{bmatrix} & \text{for } x_1 = 0 \text{ and } x_2 = 0 \end{cases}$$

Similarly, the algebraic relationship between the coordinates $(v_1, v_2, v_3)$ of a vector $\overline{v}_s$ specified in the Cartesian system and the coordinates $(v_r, v_\varphi, v_z)$ of the same vector $\overline{v}_t$ specified in the cylindrical system at the point $P_s$ is defined by the following equation.

$$\overline{v}_t = g_{Cart.\to Cyl.}(P_s, \overline{q}_s, \overline{v}_s)$$

$$\begin{bmatrix} v_r \\ v_\varphi \\ v_z \end{bmatrix} = \begin{bmatrix} v_1\cos\varphi + v_2\sin\varphi \\ -v_1\sin\varphi + v_2\cos\varphi \\ v_3 \end{bmatrix}$$

$$= \begin{cases} \begin{bmatrix} \dfrac{v_1 x_1 + v_2 x_2}{\sqrt{x_1^2 + x_2^2}} \\ \dfrac{-v_1 x_2 + v_2 x_1}{\sqrt{x_1^2 + x_2^2}} \\ v_3 \end{bmatrix} & \text{for } x_1 \neq 0 \text{ or } x_2 \neq 0 \\ \begin{bmatrix} \dfrac{v_1 q_1 + v_2 q_2}{\sqrt{q_1^2 + q_2^2}} \\ \dfrac{-v_1 q_2 + v_2 q_1}{\sqrt{q_1^2 + q_2^2}} \\ v_3 \end{bmatrix} & \text{for } x_1 = 0, x_2 = 0, q_1 = \lambda v_1, \\ & \text{and } q_2 \neq \lambda v_2 \\ \begin{bmatrix} \sqrt{v_1^2 + v_2^2} \\ 0 \\ v_3 \end{bmatrix} & \text{for } x_1 = 0, x_2 = 0, q_1 = \lambda v_1, \\ & \text{and } q_2 = \lambda v_2 \end{cases}$$

3. Spherical Coordinate System

Figure 12:
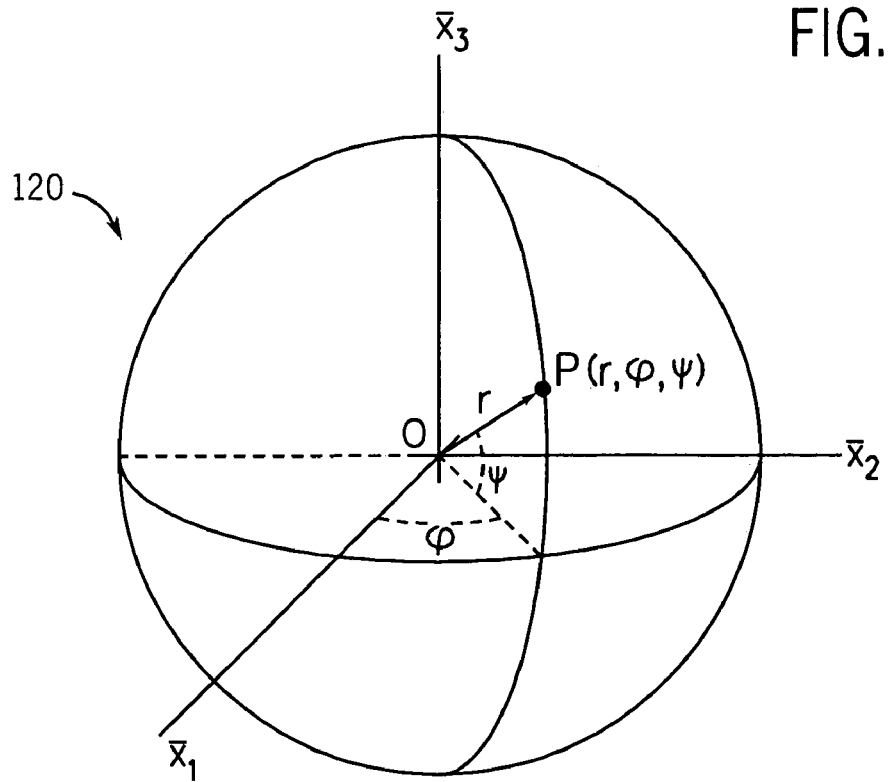

Referring now to FIG. 12, FIG. 12 shows the geometric relationship of a three-dimensional spherical coordinate system 120. The coordinate system 120 is defined by coordinate origin O and the three mutually orthogonal coordinate curves $\{\overline{r}, \overline{\phi}, \overline{\psi}\}$ (tangents are orthogonal except along the $\overline{x}_3$-axis). With a linear scale of measurement on the curve $\overline{r}$ and a radian scale of measurement on the curves $\overline{\phi}$ and $\overline{\psi}$, the spherical coordinates $(r, \phi, \psi)$ define a point P in spherical coordinate space.

A transformation may be used to transform coordinates in the spherical coordinate system to coordinates in the Cartesian coordinate system. Specifically, the algebraic relationship between the coordinates $(r, \phi, \psi)$ of a point $P_s$ specified in the spherical system and the coordinates $(x_1, x_2, x_3)$ of the same point $P_t$ specified in the Cartesian system is defined by the following equation:

$$P_t = f_{Sph.\to Cart.}(P_s)$$

$$\begin{bmatrix} x_1 \\ x_2 \\ x_3 \end{bmatrix} = \begin{bmatrix} r\cos\varphi\cos\psi \\ r\sin\varphi\cos\psi \\ r\sin\psi \end{bmatrix}$$

Similarly, the algebraic relationship between the coordinates $(v_r, v_\varphi, v_\psi)$ of a vector $\overline{v}_s$ specified in the spherical system and the coordinates $(v_1, v_2, v_3)$ of the same vector $\overline{v}_t$ specified in the Cartesian system at the point $P_s$ is defined by the following equation.

$$\overline{v}_t = g_{Sph.\to Cart.}(P_s, \overline{v}_s)$$

$$\begin{bmatrix} v_1 \\ v_2 \\ v_3 \end{bmatrix} = \begin{bmatrix} v_r\cos\varphi\cos\psi + v_\varphi\sin\varphi - v_\psi\cos\varphi\sin\psi \\ v_r\sin\varphi\cos\psi + v_\varphi\cos\varphi - v_\psi\sin\varphi\sin\psi \\ v_r\sin\psi + v_\psi\cos\psi \end{bmatrix}$$

A transformation may be also used to transform coordinates in the Cartesian coordinate system to coordinates in the spherical coordinate system. In general, the coordinates ($x_1$, $x_2$, $x_3$) of a point $P_s$ specified in the Cartesian system uniquely define the coordinates (r, φ, ψ) of the same point $P_t$ specified in the spherical system. In the special case that the point $P_s$ is located on the $\bar{x}_3$-axis, the coordinates ($q_1$, $q_2$, $q_3$) of a vector $\bar{q}_s$, which is non-parallel to the $\bar{x}_3$-axis, are used to uniquely define the coordinate φ. The algebraic relationship between the coordinates ($x_1$, $x_2$, $x_3$) of the point $P_s$ and the coordinates (r, φ, ψ) of the same point $P_t$ is defined by the following equation.

$$P_t = f_{Cart.\rightarrow Sph.}(P_s, \bar{q}_s)$$

$$\begin{bmatrix} r \\ \varphi \\ \psi \end{bmatrix} = \begin{cases} \begin{bmatrix} \sqrt{x_1^2 + x_2^2 + x_3^2} \\ \operatorname{atan}(x_2, x_1) \\ \operatorname{atan}\left(x_3, \sqrt{x_1^2 + x_2^2}\right) \end{bmatrix} & \text{for } x_1 \neq 0 \text{ or } x_2 \neq 0 \\ \begin{bmatrix} |x_3| \\ \operatorname{atan}(q_2, q_1) \\ \operatorname{sgn}(x_3)\frac{\pi}{2} \end{bmatrix} & \text{for } x_1 = 0 \text{ and } x_2 = 0 \end{cases}$$

Similarly, the algebraic relationship between the coordinates ($v_1$, $v_2$, $v_3$) of a vector $\bar{v}_s$ specified in the Cartesian system and the coordinates ($v_r$, $v_\varphi$, $v_\psi$) of the same vector $\bar{v}_t$ specified in the spherical system at the point $P_s$ is defined by the following equation.

$$\bar{v}_t = g_{Cart.\rightarrow Sph.}(P_s, \bar{q}_s, \bar{v}_s)$$

$$\begin{bmatrix} v_r \\ v_\varphi \\ v_\psi \end{bmatrix} = \begin{bmatrix} v_1 \cos\varphi \cos\psi + v_2 \sin\varphi \cos\psi + v_3 \sin\psi \\ -v_1 \sin\varphi + v_2 \cos\varphi \\ -v_1 \cos\varphi \sin\psi - v_2 \sin\varphi \sin\psi + v_3 \cos\psi \end{bmatrix}$$

$$= \begin{cases} \begin{bmatrix} \dfrac{v_1 x_1 + v_2 x_2 + v_3 x_3}{\sqrt{x_1^2 + x_2^2 + x_3^2}} \\ \dfrac{-v_1 x_2 + v_2 x_1}{\sqrt{x_1^2 + x_2^2}} \\ \dfrac{-(v_1 x_1 + v_2 x_2)x_3 + v_3(x_1^2 + x_2^2)}{\sqrt{x_1^2 + x_2^2}\sqrt{x_1^2 + x_2^2 + x_3^2}} \end{bmatrix} & \text{for } x_1 \neq 0 \text{ or } x_2 \neq 0 \\ \begin{bmatrix} \dfrac{v_1 q_1 + v_2 q_2 + v_3 q_3}{\sqrt{q_1^2 + q_2^2 + q_3^2}} \\ \dfrac{-v_1 q_2 + v_2 q_1}{\sqrt{q_1^2 + q_2^2}} \\ \dfrac{-(v_1 q_1 + v_2 q_2)q_3 + v_3(q_1^2 + q_2^2)}{\sqrt{q_1^2 + q_2^2}\sqrt{q_1^2 + q_2^2 + q_3^2}} \end{bmatrix} & \begin{array}{l}\text{for } x_1 = 0, x_2 = 0, q_1 = \lambda v_1, \\ \text{and } q_2 \neq \lambda v_2\end{array} \\ \begin{bmatrix} \dfrac{\lambda(v_1^2 + v_2^2) + v_3 q_3}{\sqrt{\lambda^2(v_1^2 + v_2^2) + q_3^2}} \\ 0 \\ \dfrac{(\lambda v_3 - q_3)\sqrt{v_1^2 + v_2^2}}{\sqrt{\lambda^2(v_1^2 + v_2^2) + q_3^2}} \end{bmatrix} & \begin{array}{l}\text{for } x_1 = 0, x_2 = 0, q_1 = \lambda v_1, \\ q_2 = \lambda v_2, \text{ and } q_3 \neq \lambda v_3\end{array} \\ \begin{bmatrix} \sqrt{v_1^2 + v_2^2 + v_3^2} \\ 0 \\ 0 \end{bmatrix} & \begin{array}{l}\text{for } x_1 = 0, x_2 = 0, q_1 = \lambda v_1, \\ q_2 = \lambda v_2, \text{ and } q_3 = \lambda v_3\end{array} \end{cases}$$

4. Other Coordinate Systems

Figure 13:
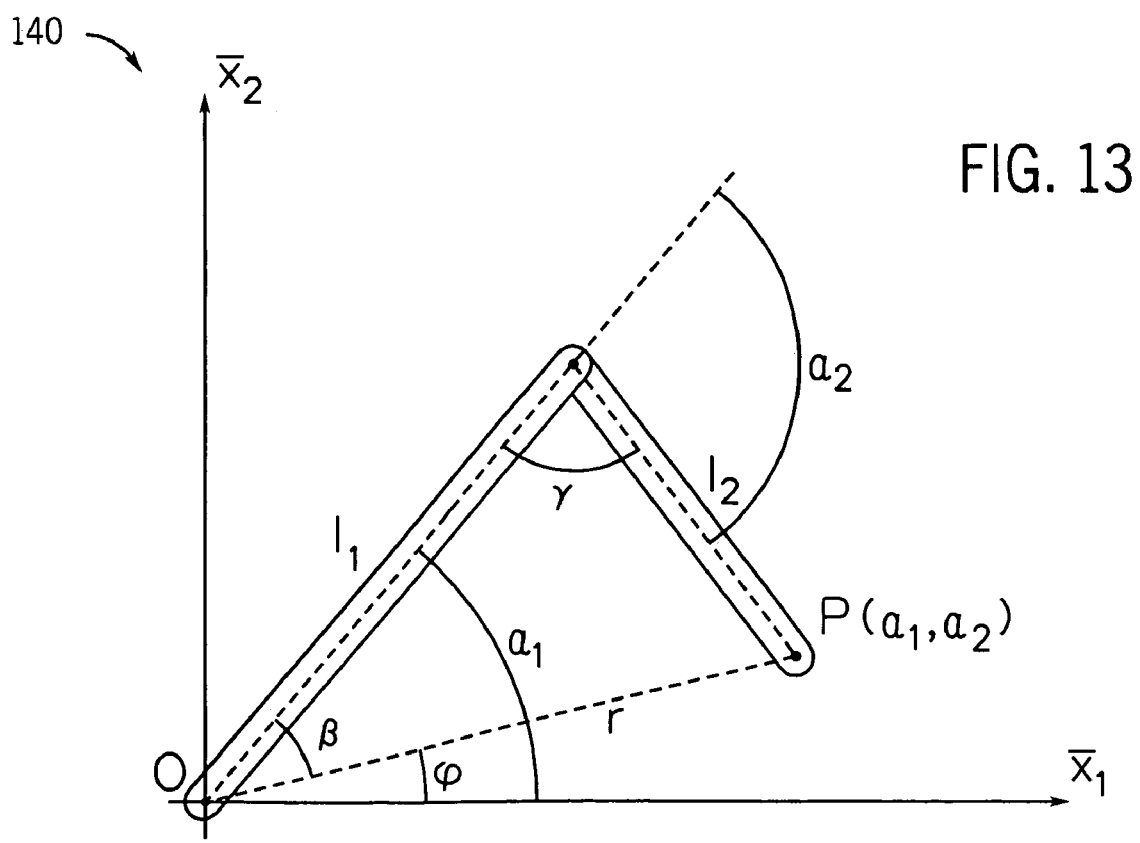
Figure 14:
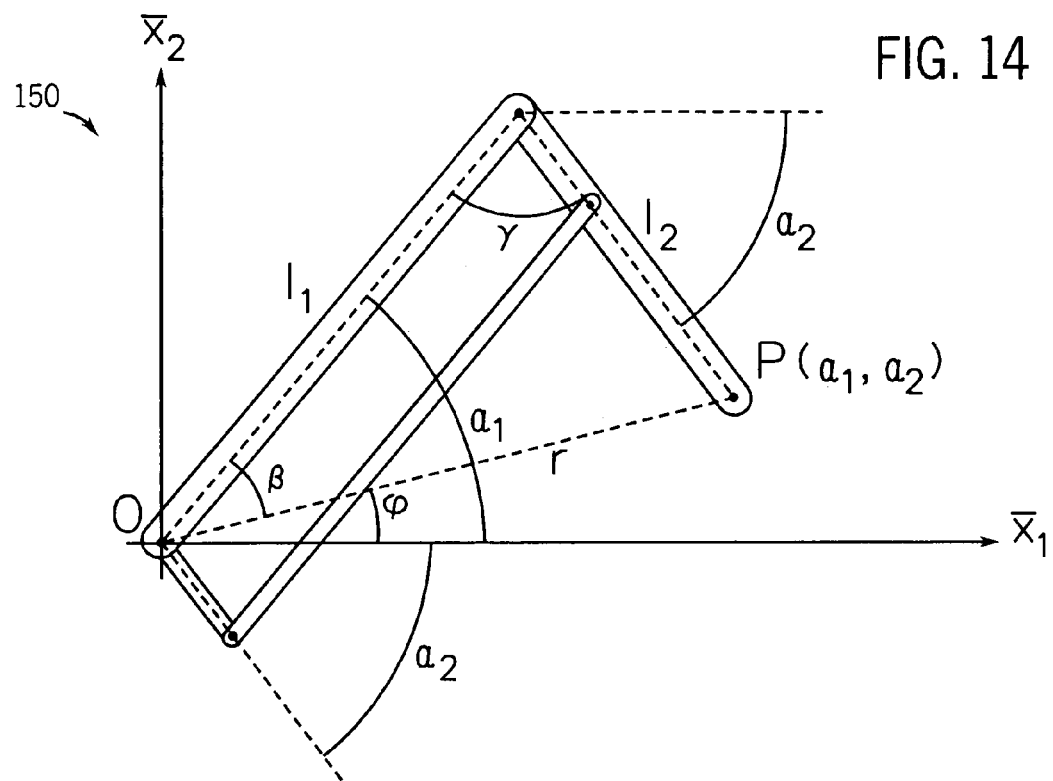

Additional and/or different coordinate systems may also be used. For example, it may be desirable to develop one or more other coordinate systems which are tailored to be used in specific applications. Two such coordinate systems are shown in FIGS. 13–14. In FIG. 13, a coordinate system 140 is shown which is useable in the context of a two-arm robotics application in which the two arms are independently moveable ("independently linked"). In FIG. 14, a coordinate system 150 is shown which is useable in the context of a two-arm robotics application in which the two arms are not independently moveable ("dependently linked").

a. Independent Coordinate System

Referring first to FIG. 13, the geometric relationship of a left-hand ($\alpha_2 < 0$) independent coordinate system is shown. An independent coordinate system is a kinematic system with two independent links. The coordinate origin O, the length of the two links ($0 < l_1$ and $0 < l_2$), and the two coordinate curves $\{\bar{\alpha}_1, \bar{\alpha}_2\}$ define an independent coordinate system. With the same linear scale of measurement on the two links and a radian scale of measurement on the curves $\bar{\alpha}_1$ and $\bar{\alpha}_2$, the independent coordinates ($\alpha_1$, $\alpha_2$) define a point P in independent coordinate space.

A transformation may be used to transform coordinates in the independent coordinate system to coordinates in the Cartesian coordinate system. This transformation is sometimes referred to as forward kinematics. The algebraic relationship between the coordinates ($\alpha_1$, $\alpha_2$) of a point $P_s$ specified in the independent system and the coordinates ($x_1$, $x_2$) of the same point $P_t$ specified in the Cartesian system is defined by the following equation.

$$P_t = f_{Indep.\rightarrow Cart.}(P_s)$$

$$\begin{bmatrix} x_1 \\ x_2 \end{bmatrix} = \begin{bmatrix} l_1 \cos\alpha_1 + l_2 \cos(\alpha_1 + \alpha_2) \\ l_1 \sin\alpha_1 + l_2 \sin(\alpha_1 + \alpha_2) \end{bmatrix}$$

A transformation may also be used to transform coordinates in the Cartesian coordinate system to coordinates in the independent coordinate system. This transformation is sometimes referred to as inverse kinematics. Since the kinematic system can either represent a left-hand ($\alpha_2 < 0$) or a right-hand ($0 \leq \alpha_2$) system, the result of this transformation is not uniquely defined. However, by establishing one configuration during initialization, the result is uniquely defined from then on.

With the polar coordinates of a point $P_s$ $$\begin{bmatrix} r \\ \varphi \end{bmatrix} = \begin{bmatrix} \min\left(\sqrt{x_1^2 + x_2^2}, l_1 + l_2\right) \\ \operatorname{atan}(x_2, x_1) \end{bmatrix}$$

and the sine and cosine rule, the angles β and γ can be derived. First, the cosine rule $$r^2 = l_1^2 + l_2^2 - 2 l_1 l_2 \cos\gamma$$

provides the angle $$\gamma = a\cos\left(\frac{l_1^2 + l_2^2 - r^2}{2 l_1 l_2}\right)$$

Second, the sine rule $$\frac{\sin\beta}{l_2} = \frac{\sin\gamma}{r}$$

provides the angle $$\beta = \begin{cases} \mathrm{asin}\left(\dfrac{l_2}{r}\sin\gamma\right) & \text{for } r \neq 0 \\ 0 & \text{for } r = 0 \end{cases}$$

With the above results, the algebraic relationship between the coordinates $(x_1, x_2)$ of a point $P_s$ specified in the Cartesian system and the coordinates $(\alpha_1, \alpha_2)$ of the same point $P_t$ specified in the independent system is defined by the following equations.

Left-Hand System:

$$p_t = f_{Cart.\rightarrow Indep.}(P_s)$$

$$\begin{bmatrix} \alpha_1 \\ \alpha_2 \end{bmatrix} = \begin{bmatrix} \varphi + \beta \\ \gamma - \pi \end{bmatrix}$$

Right-Hand System:

$$p_t = f_{Cart.\rightarrow Indep.}(P_s)$$

$$\begin{bmatrix} \alpha_1 \\ \alpha_2 \end{bmatrix} = \begin{bmatrix} \varphi - \beta \\ \pi - \gamma \end{bmatrix}$$

b. Dependent Coordinate System

Referring next to FIG. 14, the geometric relationship of a left-hand $(\alpha_2 < \alpha_1)$ dependent coordinate system is shown. A dependent coordinate system is a kinematic system with two dependent links. The coordinate origin O, the length of the two links ($0 < l_1$ and $0 < l_2$), and the two coordinate curves $\{\overline{\alpha}_1, \overline{\alpha}_2\}$ define a dependent coordinate system. With the same linear scale of measurement on the two links and a radian scale of measurement on the curves $\overline{\alpha}_1$ and $\overline{\alpha}_2$, the dependent coordinates $(\alpha_1, \alpha_2)$ define a point P in dependent coordinate space.

A transformation may be used to transform coordinates in the dependent coordinate system to coordinates in the Cartesian coordinate system. This transformation is sometimes referred to as forward kinematics. The algebraic relationship between the coordinates $(\alpha_1, \alpha_2)$ of a point $P_s$ specified in the dependent system and the coordinates $(x_1, x_2)$ of the same point $P_t$ specified in the Cartesian system is defined by the following equation.

$$P_t = f_{Dep.\rightarrow Cart.}(P_s)$$

$$\begin{bmatrix} x_1 \\ x_2 \end{bmatrix} = \begin{bmatrix} l_1\cos\alpha_1 + l_2\cos\alpha_2 \\ l_1\sin\alpha_1 + l_2\sin\alpha_2 \end{bmatrix}$$

A transformation may also be used to transform coordinates in the Cartesian coordinate system to coordinates in the dependent coordinate system. This transformation is sometimes referred to as inverse kinematics. Since the kinematic system can either represent a left-hand $(\alpha_2 < \alpha_1)$ or a right-hand $(\alpha_1 \leq \alpha_2)$ system, the result of this transformation is not uniquely defined. However, by establishing one configuration during initialization, the result is uniquely defined from then on.

With the polar coordinates of a point $P_s$ $$\begin{bmatrix} r \\ \varphi \end{bmatrix} = \begin{bmatrix} \min\left(\sqrt{x_1^2 + x_2^2}, l_1 + l_2\right) \\ \mathrm{atan}(x_2, x_1) \end{bmatrix}$$

and the sine and cosine rule, the angles $\beta$ and $\gamma$ can be derived. First, the cosine rule $$r^2 = l_1^2 + l_2^2 - 2l_1l_2\cos\gamma$$

provides the angle $$\gamma = \mathrm{acos}\left(\frac{l_1^2 + l_2^2 - r^2}{2l_1l_2}\right)$$

Second, the sine rule $$\frac{\sin\beta}{l_2} = \frac{\sin\gamma}{r}$$

provides the angle $$\beta = \begin{cases} \mathrm{asin}\left(\dfrac{l_2}{r}\sin\gamma\right) & \text{for } r \neq 0 \\ 0 & \text{for } r = 0 \end{cases}$$

With the above results, the algebraic relationship between the coordinates $(x_1, x_2)$ of a point $P_s$ specified in the Cartesian system and the coordinates $(\alpha_1, \alpha_2)$ of the same point $P_t$ specified in the dependent system is defined by the following equations.

Left-hand System:

$$P_t = f_{Cart.\rightarrow Dep.}(P_s)$$

$$\begin{bmatrix} \alpha_1 \\ \alpha_2 \end{bmatrix} = \begin{bmatrix} \varphi + \beta \\ \alpha_1 + (\gamma - \pi) \end{bmatrix}$$

$$= \begin{bmatrix} \varphi + \beta \\ \varphi + \beta + \gamma - \pi \end{bmatrix}$$

Right-hand System:

$$P_t = f_{Cart.\rightarrow Dep.}(P_s)$$

$$\begin{bmatrix} \alpha_1 \\ \alpha_2 \end{bmatrix} = \begin{bmatrix} \varphi - \beta \\ \alpha_1 + (\pi - \gamma) \end{bmatrix}$$

-continued $$= \begin{bmatrix} \varphi - \beta \\ \varphi - \beta + \pi - \gamma \end{bmatrix}$$

B. Coordinated Move Profiles

In the preferred embodiment, the coordinated move block 72 may be used to provide, for example, a linear or circular path in a Cartesian coordinate system from the current position to a new position. For circular moves, the path also either takes into account an auxiliary position that specifies the center of the circle or a position along the circle, or alternately the radius of the circle may be specified in place of an auxiliary position. The actual path over time also depends on the current speed and acceleration, the maximum speed, acceleration, and deceleration as well as the velocity profile type.

1. Linear Move

Figure 15:
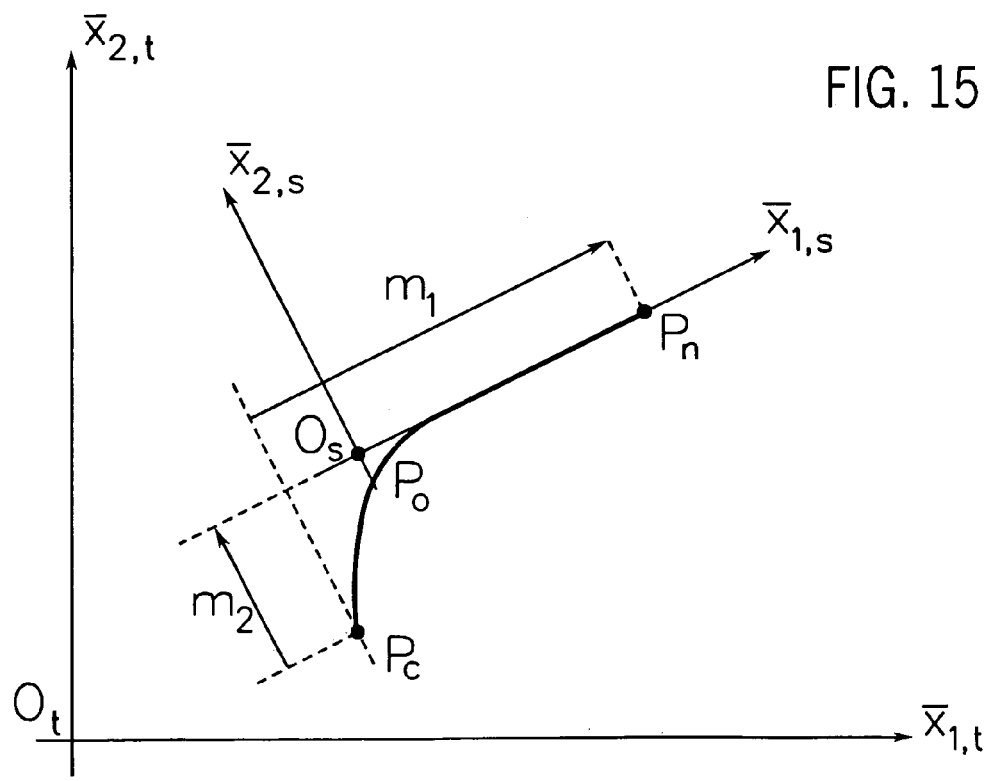
FIG. 15 is an example of a linear move that may be programmed for use in connection with the control system of FIGS. 1A–1B according to an exemplary embodiment.

Referring now to FIG. 15, a coordinated linear move provides a linear path in a multi-dimensional Cartesian coordinate system from a current position $P_c$ to a new position $P_n$. FIG. 15 shows the geometric relationship of a simple two-dimensional linear move. In general, the ideal line for this move is defined by the old position $P_o$, which specifies either the position of a previous coordinated move or the current position $P_c$. If there was no previous coordinated move, the old position $P_o$ is assumed to be equal to the current position $P_c$. Since the actual path generally is not exactly linear due to the current position $P_c$, the current velocity $\bar{v}_c$, and the current acceleration $\bar{a}_c$, the resulting path is fairly complex. However, the representation of the path can be simplified by transforming the move parameters from the original (target) Cartesian coordinate system to a new (source) Cartesian coordinate system. An appropriate source system is defined by the origin $O_s$, which is equal to the old position $P_o$, and the coordinate axes $\{\bar{x}_{1,s}, \ldots, \bar{x}_{n,s}\}$, where n denotes the number of coordinated axes.

The coordinate axes $\{\bar{x}_{1,s}, \ldots, \bar{x}_{n,s}\}$, are characterized by the mutually orthonormal basis $\{\bar{t}_1, \ldots, \bar{t}_n\}$, which may be defined by the following procedure.

1. The first m basis vectors $\{\bar{t}_1, \ldots, \bar{t}_m\}$, can be calculated by applying the auxiliary algorithm of Section II(C), where the vectors $\{\bar{t}_1, \ldots, \bar{t}_m\}$ specify the first m (m<n) mutually independent vectors in the set $P_n - P_o$, $P_n - P_c$, $\bar{v}_c$, and $\bar{a}_c$. The algorithm in Section II(C) also handles the identification of the first m mutually independent vectors.

2. The remaining n-m basis vectors $\{\bar{t}_{m+1}, \ldots, \bar{t}_n\}$ can be calculated by applying the auxiliary algorithm of Section II(C).

The resulting offset vector $\bar{o} = O_s - O_t$ and transformation matrix $\bar{T} = \{\bar{t}_1, \ldots, \bar{t}_n\}$, define the source coordinate system. Therefore, the current position $P_c$, the new position $P_n$, the current velocity $\bar{v}_c$, and the current acceleration $\bar{a}_c$ can be transformed from the target to the source system.

$$P_{c,s} = \bar{T}^T (P_c - \bar{o})$$

$$P_{n,s} = \bar{T}^T (P_n - \bar{o})$$

$$\bar{v}_s = \bar{T}^T \bar{v}_c$$

$$\bar{a}_s = \bar{T}^T \bar{a}_c$$

In the source system, the multi-dimensional coordinated linear move can be separated into multiple individual one-dimensional moves ($m_1 \ldots m_n$). Therefore, the coordinates of the velocity $\bar{v}_s$ and acceleration $\bar{a}_s$ represent the start velocity and start acceleration for the individual moves. The distance $\bar{d}_s$ for all individual moves specified in the source system can be calculated based on the current position $P_{c,s}$ and the new position $P_{n,s}$ specified in the source system.

$$\bar{d}_s = P_{n,s} - P_{c,s}$$
$$= \bar{T}^T (P_n - \bar{o}) - \bar{T}^T (P_c - \bar{o})$$
$$= \bar{T}^T (P_n - P_c)$$

During run-time, the interpolator of each individual move block 76 generates incremental position reference values for the coordinates of $P_s$ in the source system. With these updates, the incremental position reference values $P_t$ in the target system can simply be calculated by applying a coordinate transformation from the source to the target system.

$$P_t = \bar{T} P_s + \bar{o}$$

2. Circular Move

Figure 16:
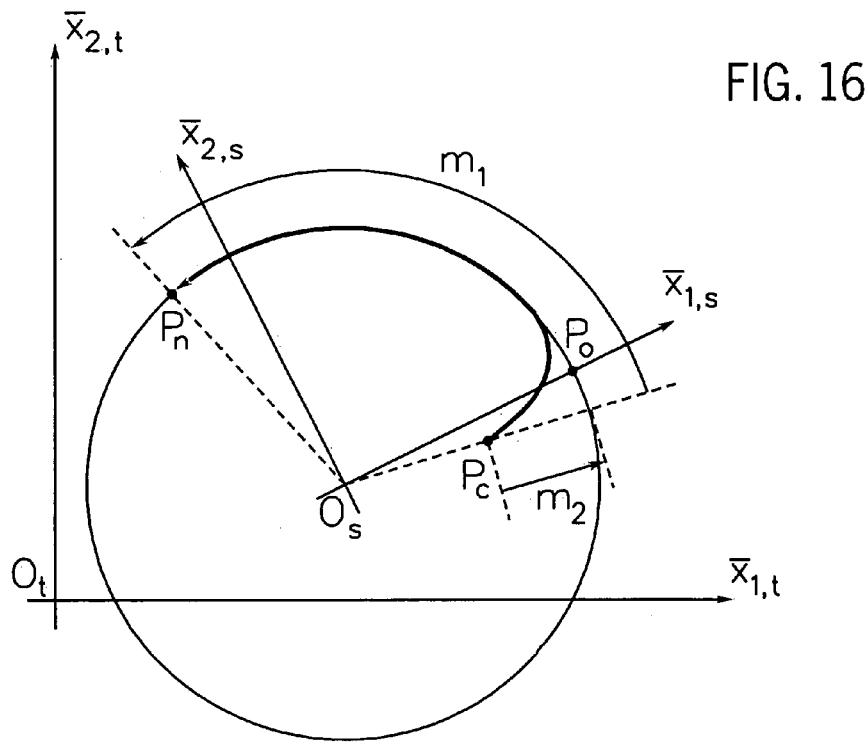
FIG. 16 is an example of a circular move that may be programmed for use in connection with the control system of FIGS. 1A–1B according to an exemplary embodiment.

Referring now to FIG. 16, a coordinated circular move provides a circular path in a two- or three-dimensional Cartesian coordinate system from a current position $P_c$ to a new position $P_n$. FIG. 16 shows the geometric relationship of a simple two-dimensional circular move. In general, the ideal circle for this move is defined by the old position $P_o$, which specifies either the position of the previous coordinated move or the current position $P_c$, and the auxiliary position $P_a$, which specifies either the center of the circle or a position along the circle. (Alternatively, the radius may be specified from which the center is calculated.) If there was no previous coordinated move, the old position $P_o$ is assumed to be equal to the current position $P_c$. Since the actual path generally is not exactly circular due to the current position $P_c$, the current velocity $\bar{v}_c$, and the current acceleration $\bar{a}_c$, the resulting path is more complex. However, the representation of the path can be simplified by transforming the move parameters from the original (target) Cartesian coordinate system to a new (source) cylindrical coordinate system. An appropriate source system is defined by the origin $O_s$, which is equal to the center of the circle, and the coordinate axes $\{\bar{x}_{1,s}, \ldots, \bar{x}_{n,s}\}$, where n denotes the number of coordinated axes. However, in order to calculate the origin $O_s$, the vector $\bar{n}$ that is normal to the plane of the circle needs to be calculated first.

In the general case that the vectors $P_n - P_a$ and $P_a - P_o$ are linearly independent and an auxiliary vector $\bar{a}$ is not specified, the normal vector $\bar{n}$ is defined by the outer product of the vectors $P_n - P_a$ and $P_a - P_o$.

$$\bar{b} = (P_n - P_a) \times (P_a - P_o)$$

$$\bar{n} = \frac{\bar{b}}{\|\bar{b}\|}$$

However, if the vectors $P_n - P_a$ and $P_a - P_o$ are linearly dependent and an auxiliary vector $\bar{a}$ is not specified, the circle is not defined.

With the positions $P_a$ and $P_o$ on the plane of the circle the corresponding projected positions $P_a'$ and $P_o'$ onto the plane of the circle are equal to the original positions.

$$P_a' = P_a$$

$$P_o' = P_o$$

In the special case that an auxiliary vector $\bar{a}$ is specified, the normal vector $\bar{n}$ is defined by the auxiliary vector $\bar{a}$.

$$\bar{n} = \frac{\bar{a}}{\|\bar{a}\|}$$

However, if the auxiliary vector $\bar{a}$ is zero, the circle is not defined.

With the positions $P_a$ and $P_o$ not necessarily on the plane of the circle, the projected positions $P_a'$ and $P_o'$ onto the plane of the circle are calculated. Since a projected position P' has to be on a straight line, which goes through the original position P and is parallel to the vector $\bar{n}$, $$P' = P + \gamma \bar{n}$$

and has to be on the plane, which goes through the new position $P_n$ and is normal to the vector $\bar{n}$, $$\bar{n}^T (P' - P_n) = 0$$

the projected position P' is defined by the following equation.

$$\bar{n}^T(P + \gamma \bar{n} - P_n) = 0$$

$$\gamma \bar{n}^T \bar{n} = \bar{n}^T(P_n - P)$$

$$\gamma = \bar{n}^T(P_n - P)$$

$$P' = P + (\bar{n}^T(P_n - P))\bar{n}$$

As a result, the projected positions $P_a'$ and $P_o'$ are defined by the following equations.

$$P_a' = P_a + (\bar{n}^T(P_n - P_a))\bar{n}$$

$$P_o' = P_o + (\bar{n}^T(P_n - P_o))\bar{n}$$

If the auxiliary position $P_a$ specifies the center of the circle, the origin $O_s$ is directly defined.

$$O_s = P_a'$$

If the auxiliary position $P_a$ specifies a position along the circle, the origin $O_s$ is defined by the intersection of the following three planes.

$$(P_n - P_a')^T O_s = (P_n - P_a')^T \frac{P_n + P_a'}{2}$$

$$(P_a' - P_o')^T O_s = (P_a' - P_o')^T \frac{P_a' + P_o'}{2}$$

$$\bar{n}^T O_s = \bar{n}^T P_n$$

$$\bar{n}^T O_s = \bar{n}^T P_n$$

The first plane passes through the mid-point between $P_n$ and $P_a'$ and is orthogonal to $P_n - P_a'$. The second plane passes through the mid-point between $P_a'$ and $P_o'$ and is orthogonal to $P_a' - P_o'$. The third plane passes through the positions $P_n$, $P_a'$, and $P_o'$. The origin $O_s$ can be found by solving the above set of three linear equations.

However, if the vectors $P_n - P_a'$ and $P_a' - P_o'$ are linearly dependent, the circle is not defined.

For a two-dimensional circular move, the third plane is defined implicitly and the problem degenerates to a set of two linear equations.

The coordinate axes $\{\bar{x}_{1,s}, \ldots, \bar{x}_{n,s}\}$ are characterized by the mutually orthonormal basis $\{\bar{t}_1, \ldots, \bar{t}_n\}$, which is defined by the following procedure.

1. With $\bar{r}_1$ representing the first non-zero vector in the set $P_o' - O_s$ and $P_n - O_s$, the first basis vector $$\bar{t}_1 = \frac{\bar{r}_1}{\|\bar{r}_1\|}$$

is defined.

2. With the normal vector $\bar{n}$, the second basis vector $$\bar{t}_2 = \bar{n} \times \bar{t}_1$$

is defined. For a two-dimensional circular move, the normal vector is defined implicitly and the problem degenerates.

$$\bar{t}_2 = \begin{bmatrix} -t_{12} \\ t_{11} \end{bmatrix}$$

3. The third basis vector $\bar{t}_3$ is equal to the normal vector $\bar{n}$.

The resulting offset vector $\bar{o} = O_s - O_t$ and transformation matrix $T = \{\bar{t}_1, \ldots, \bar{t}_n\}$ define not only the source cylindrical coordinate system but also an intermediate Cartesian coordinate system. Therefore, the current position $P_c$, the new position $P_n$, the current velocity $\bar{v}_c$, and the current acceleration $\bar{a}_c$ can be first transformed from the target to the intermediate system.

$$P_{c,i} = T^T(P_c - \bar{o})$$

$$P_{n,i} = T^T(P_n - \bar{o})$$

$$\bar{v}_i = T^T \bar{v}_c$$

$$\bar{a}_i = T^T \bar{a}_c$$

In the special case that the position $P_{c,i}$ is located on the $\bar{x}_{3,s}$-axis at least one of the vectors in the set $\bar{v}_i$, $\bar{a}_i$, and $P_{n,i} - P_{c,i}$, has to be non-parallel to the $\bar{x}_{3,s}$-axis. The first non-parallel vector in the above set defines the vector $\bar{q}_i$. Therefore, the current position $P_{c,i}$, the new position $P_{n,i}$, the current velocity $\bar{v}_i$, and the current acceleration $\bar{a}_i$ can be transformed from the intermediate to the source system.

$$P_{c,s} = f_{Cart. \to Cyl.}(P_{c,i}, \bar{q}_i)$$

$$P_{n,s} = f_{Cart. \to Cyl.}(P_{n,i}, \bar{q}_i)$$

$$\bar{v}_s = g_{Cart. \to Cyl.}(P_{c,i}, \bar{q}_i, \bar{v}_i)$$

$$\bar{a}_s = g_{Cart. \to Cyl.}(P_{c,i}, \bar{q}_i, \bar{a}_i)$$

In the source system, the two- or three-dimensional coordinated circular move can be separated into two or three individual one-dimensional moves ($m_1$, $m_2$, and $m_3$). Therefore, the coordinates of the velocity $\bar{\mu}_s$ and acceleration $\bar{a}_s$ represent the start velocity and start acceleration for the individual moves. The distance $\bar{d}_s$ for all individual moves specified in the source system can be calculated based on the current position $P_{c,s}$ and the new position $P_{n,s}$ specified in the source system.

$$\bar{d}_s = P_{n,s} - P_{c,s}$$

Since the old position $P_o$ and the new position $P_n$ split the circle into two arcs, the direction of the path along the circle still needs to be defined. Therefore, the coordinate $\phi_d$ of $\overline{d}_s$ may need to be adjusted depending on the direction of the path.

If an auxiliary vector $\overline{a}$ is specified, the right-handed screw rule specifies the direction of the path. With the coordinate $\phi_c$ and $\phi_n$ of the positions $P_{c,s}$ and $P_{n,s}$ the coordinate $\phi_d$ of $\overline{d}_s$ can be adjusted according to the following algorithm.

$\phi_d = \phi_n - \phi_c$ if $\phi_d < 0$ $\phi_d += 2\pi$

If an auxiliary vector $\overline{a}$ is not specified, the old position $P_o$ needs to be transformed from the target to the source system.

$P_{o,i} = T^T(P_o' - \overline{o})$ $P_{o,s} = f_{Cart. \rightarrow Cyl.}(P_{o,i}, \overline{q}_i)$ If an auxiliary vector $\overline{a}$ is not specified and the auxiliary position $P_a$ specifies the center of the circle, the shorter arc defines the direction of the path. With the coordinates $\phi_o$, $\phi_c$, and $\phi_n$ of the positions $P_{o,s}$, $P_{c,s}$, and $P_{n,s}$ the coordinate $\phi_d$ of $\overline{d}_s$ can be adjusted according to the following algorithm.

```
if φo < φn
    if φn - φo < π
        direction = positive
    else
        direction = negative
else
    if φo - φn < π
        direction = negative
    else
        direction = positive
φd = φn - φc
if direction = = positive
    if φd < 0
        φd + = 2π
    else
        if 0 < φd
            φd - = 2π
```

If an auxiliary vector $\overline{a}$ is not specified and the auxiliary position $P_a$ specifies a position along the circle, the arc, which includes the auxiliary position $P_a$, defines the direction of the path. Therefore, the auxiliary position $P_a$ needs to be transformed from the target to the source system.

$P_{a,i} = T^T(P_a' - \overline{o})$ $P_{a,s} = f_{Cart. \rightarrow Cyl.}(P_{a,i}, \overline{q}_i)$ With the coordinates $\phi_o$, $\phi_c$, $\phi_a$, and $\phi_n$ of the positions $P_{o,s}$, $P_{c,s}$, $P_{a,s}$, and $P_{n,s}$ the coordinate $\phi_d$ of $\overline{d}_s$ can be adjusted according to the following algorithm.

```
if φo < φn
    if φo < φa and φa < φn
        direction = positive
    else
        direction = negative
else
    if φn < φa and φa < φo
        direction = negative
    else
        direction = positive
φd = φn - φc
if direction = = positive
```

-continued

```
    if φd < 0
        φd + = 2π
    else
        if 0 < φd
            φd - = 2π
```

During run-time each individual move generates position updates for the coordinates of $P_s$ in the source system. With these updates, the position updates $P_t$ in the target system can simply be calculated by applying a coordinate transformation from the source to the target system.

$P_t = Tf_{Cyl. \rightarrow Cart.}(P_s) + \overline{o}$

3. Blended Move

Figure 17:
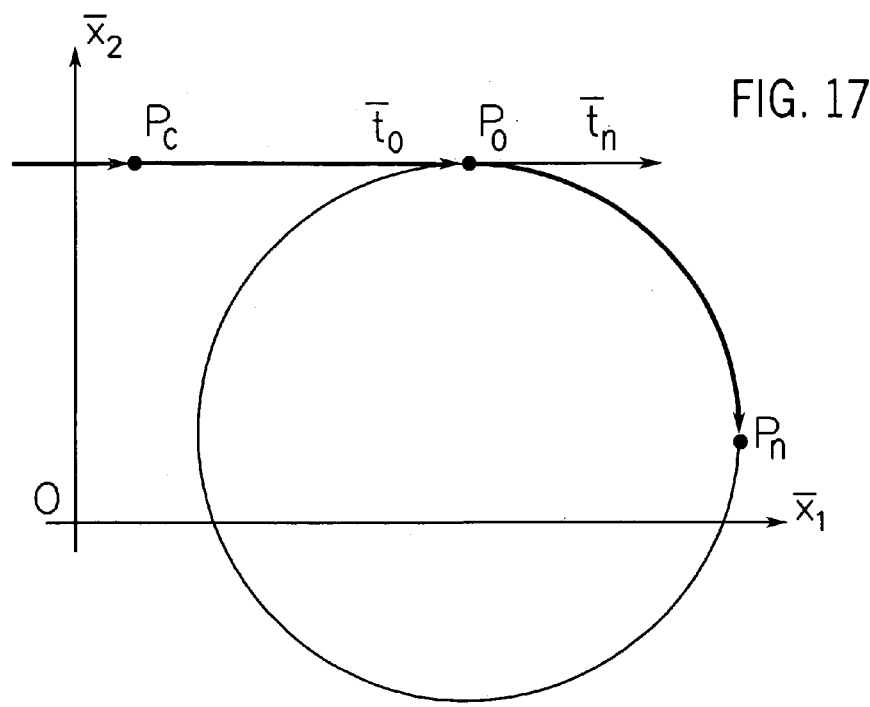
FIG. 17 is an example of a blended move that may be programmed for use in connection with the control system of FIGS. 1A–1B according to an exemplary embodiment.

Referring now to FIG. 17, in general, the transition from one move to the next move simply involves using the dynamics of the current move as start dynamics for the next move. However, this might not generate the desired path in all circumstances. An example would be a straight transition from a linear move to a circular move. In one embodiment, the coordinated move block 72 causes a transitioning path segment to be generated which approaches the circle quickly instead of continuing the linear move until the transition position $P_o$.

In the preferred embodiment, since this behavior is not always desired, the concept of blended moves is also supported. This blending method provides transitioning at speed from the current move to the next move at or before the transition position $P_o$. The resulting path is shown in FIG. 17.

The blending algorithm preferably comprises the following:

1. Calculate the distance d along the ideal path from the old position $P_o$ to the new position $P_n$. Based on the type of the next move this can be a linear or circular path.
2. Scale the distance d with the scaling value s which is based on the tangential vectors $\overline{t}_o$ and $\overline{t}_n$.

$$r = \frac{\overline{t}_o \overline{t}_n}{\|\overline{t}_o\|\|\overline{t}_n\|}$$

$$s = \begin{cases} r & \text{for } r > 0 \\ 0 & \text{for } r \leq 0 \end{cases}$$

$$d' = sd$$

3. Initiate an incremental move along the ideal path of the current move of distance d'. Based on the type of the current move this can be a linear or circular move.
4. Transition to the next move at or before the old position $P_o$ based on the specified transition range.

Due to the general approach of this algorithm, any combination of linear and circular move can be blended.

C. Auxiliary Algorithms

The two auxiliary algorithms described in this subsection may be used to calculate the transformation matrices for the coordinate transformations and coordinated moves.

1. Transformation to Orthonormal Basis Vectors

Given the set of basis vectors $\{\overline{r}_1, \ldots, \overline{r}_k\}$ in n-dimensional space, this algorithm calculates the corresponding mutually orthonormal basis vectors $\{\overline{t}_1, \ldots, \overline{t}_m\}$ using the Gram-Schmidt orthogonalization method. Even though this method is not as numerically reliable as the singular value or QR decomposition method, the number of required mathematical operations for the typical number of basis vectors is smaller.

Initially, all vectors in the set $\{\bar{r}_1, \ldots, \bar{r}_k\}$ that are zero are removed from the set. Then, the first orthonormal basis vector $$\bar{t}_1 = \frac{\bar{r}_1}{\|\bar{r}_1\|}$$

is defined. The remaining orthonormal basis vectors $\{\bar{t}_2, \ldots, \bar{t}_m\}$ are calculated iteratively. First, the basis vector $$\bar{s}_i = \bar{r}_i - \sum_{j=1}^{i-1} (\bar{r}_i^T \bar{t}_j) \bar{t}_j$$

is calculated. If the basis vector $\bar{r}_i$ is linearly dependent to the basis vectors $\{\bar{t}_1, \ldots, \bar{t}_{i-1}\}$ the resulting vector $\bar{s}_i$ is zero and both $\bar{r}_i$ and $\bar{s}_i$ are removed from the set. Otherwise, the basis vector $\bar{s}_i$ is orthogonal to the basis vectors $\{\bar{t}_1, \ldots, \bar{t}_{i-1}\}$. Second, the corresponding orthonormal basis vector $$\bar{t}_i = \frac{\bar{s}_i}{\|\bar{s}_i\|}$$

is defined.

2. Complementation of Orthonormal Basis Vectors

Given the mutually orthonormal basis vectors $\{\bar{t}_1, \ldots, \bar{t}_m\}$ in n-dimensional space, this algorithm calculates the complementing mutually orthonormal basis vectors $\{\bar{t}_{m+1}, \ldots, \bar{t}_{n-1}\}$.

The first n−m−1 basis vectors $\{\bar{t}_{m+1}, \ldots, \bar{t}_{n-1}\}$ are calculated iteratively. First, the basis vector $$\bar{s}_i^T = \left[ \underbrace{\tau_{i1} \cdots \tau_{ii}}_{i} \ \underbrace{0 \cdots 0}_{n-i} \right]$$

is defined by the cofactors $\tau_{ij}$ that correspond to the element $t_{ij}$ of the transformation submatrix $$\tilde{T} = \begin{bmatrix} t_{11} & \cdots & t_{1i} \\ \vdots & \ddots & \vdots \\ t_{1i} & \cdots & t_{ii} \end{bmatrix}$$

If the resulting vector $\bar{s}_i$ is zero, it can not be used as basis vector and is replaced with $$\bar{s}_i^T = \left[ \underbrace{0 \cdots 0}_{i-1} \ 1 \ \underbrace{0 \cdots 0}_{n-i} \right]$$

Due to the above definitions and the following equation $$\bar{s}_i^T \bar{t}_j = [\tau_{i1} \cdots \tau_{ii} \ 0 \cdots 0] \begin{bmatrix} t_{j1} \\ \vdots \\ t_{ji} \\ t_{j,i+1} \\ \vdots \\ t_{jn} \end{bmatrix}$$

$$= \tau_{i1} t_{j1} + \cdots + \tau_{ii} t_{ji}$$

$$= \det \begin{bmatrix} t_{11} & \cdots & t_{i-1,1} & t_{j1} \\ \vdots & \ddots & \vdots & \vdots \\ t_{1i} & \cdots & t_{i-1,i} & t_{ji} \end{bmatrix}$$

the basis vector $\bar{s}_i$ satisfies the following condition.

$\bar{s}_i^T \bar{t}_j = 0$ for $j < i$

Therefore, the basis vector $\bar{s}_i$ is orthogonal to the basis vectors $\{\bar{t}_1, \ldots, \bar{t}_{i-1}\}$. Second, the corresponding orthonormal basis vector $$\bar{t}_i = \frac{\bar{s}_i}{\|\bar{s}_i\|}$$

is defined. The calculation of the last orthonormal basis vector $\bar{t}_n$ can be simplified, since the transformation matrix $\bar{T} = [\bar{t}_1, \ldots, \bar{t}_n]$ is orthogonal.

$$\bar{T}^T \bar{T} = \begin{bmatrix} \bar{t}_1^T \\ \vdots \\ \bar{t}_n^T \end{bmatrix} [\bar{t}_1 \cdots \bar{t}_n]$$

$$= \begin{bmatrix} \bar{t}_1^T \bar{t}_1 & \cdots & \bar{t}_1^T \bar{t}_n \\ \vdots & \ddots & \vdots \\ \bar{t}_n^T \bar{t}_1 & \cdots & \bar{t}_n^T \bar{t}_n \end{bmatrix}$$

$$= \bar{I}$$

This orthogonality equation can be used to determine the determinant of the transformation matrix T.

$\bar{T}^T \bar{T} = \bar{I}$ $\det \bar{T}^T \bar{T} = 1$ $\det \bar{T}^T \det \bar{T} = 1$ $(\det \bar{T})^2 = 1$ $\det \bar{T} = 1$ In addition, the orthogonality equation can be restated using the above result, Cramer's rule, and the cofactors $\tau_{ij}$ that correspond to the element $t_{ij}$ of the transformation matrix T.

$$\bar{T}^T = \bar{T}^{-1}$$

-continued $$= \frac{1}{det\overline{T}} \begin{bmatrix} \tau_{11} & \cdots & \tau_{1n} \\ \vdots & \ddots & \vdots \\ \tau_{nl} & \cdots & \tau_{nn} \end{bmatrix}$$

$$= \begin{bmatrix} \tau_{11} & \cdots & \tau_{1n} \\ \vdots & \ddots & \vdots \\ \tau_{nl} & \cdots & \tau_{nn} \end{bmatrix}$$

Therefore, the last orthonormal basis vector $\bar{t}_n$ is defined by the following equation.

$$\bar{t}_n = \begin{bmatrix} \tau_{nl} \\ \vdots \\ \tau_{nn} \end{bmatrix}$$

III. Instructions

Referring now to FIGS. 18–24, as mentioned above, motion control operations including move operations are achieved through the use of one or more multi-axis coordination instructions 31. The multi-axis coordination instructions 31 are part of the same programming language (e.g., a ladder logic programming language) as the instructions used in connection with the blocks shown in FIG. 2. Assuming an object-orientated approach is used, the multi-axis coordination instructions 31 invoke the services of the coordinated move block 72 and the coordinate transformation block 74.

Figure 18:
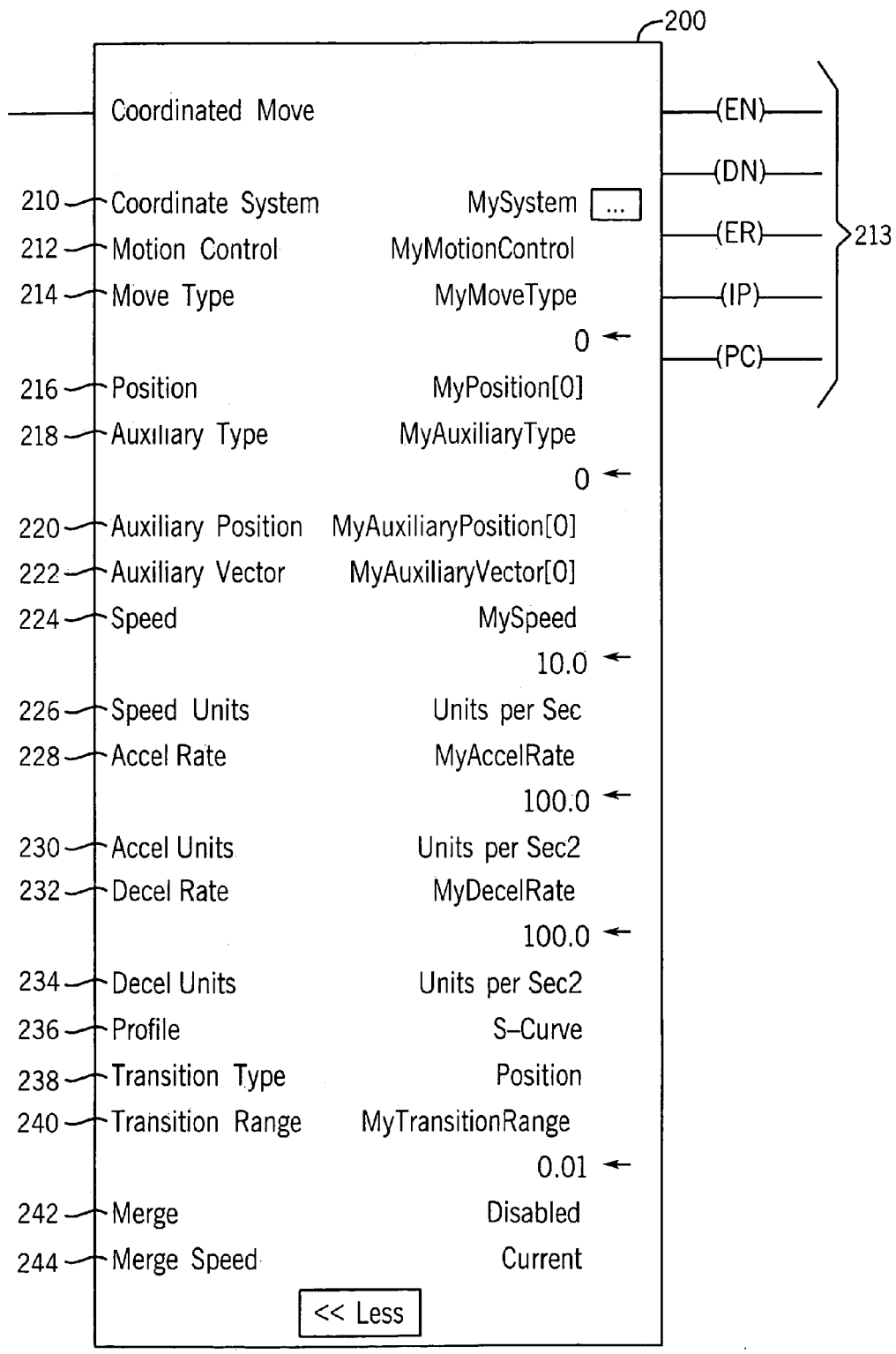
FIG. 18 is an instruction faceplate for a coordinate move instruction according to an exemplary embodiment.
Figure 19:
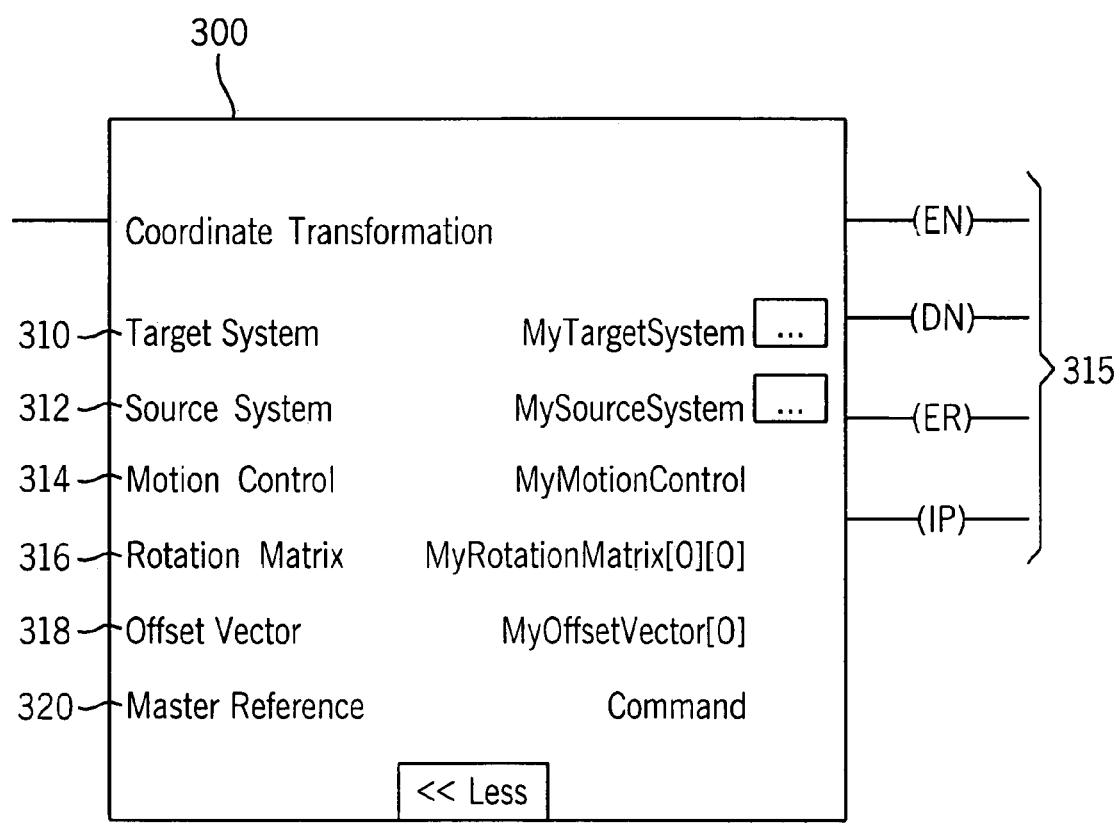
FIG. 19 is an instruction faceplate for a coordinate transformation instruction according to an exemplary embodiment.
Figure 20:
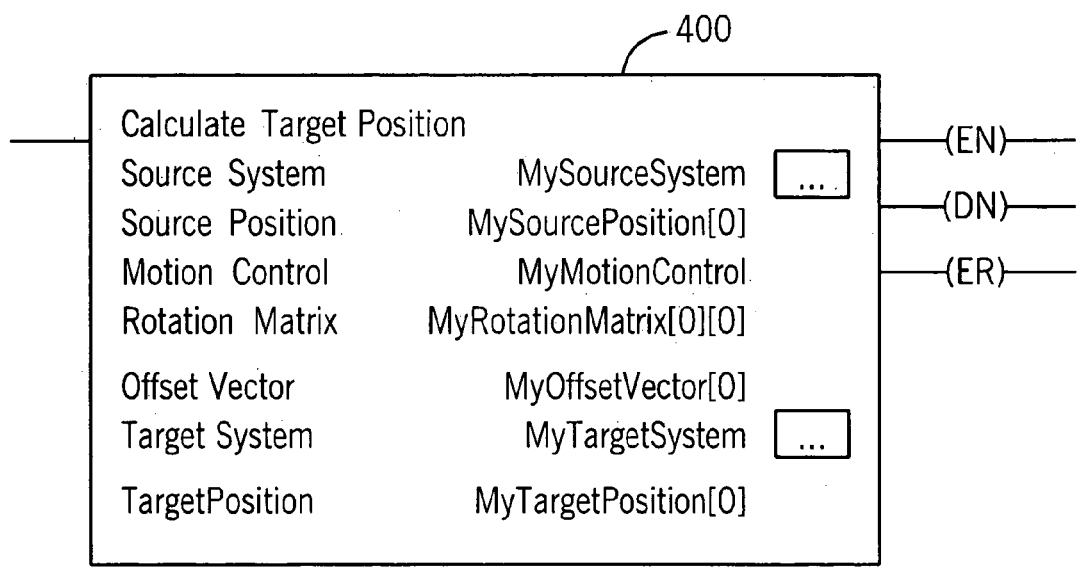
FIG. 20 is an instruction faceplate for a calculate target position instruction according to an exemplary embodiment.
Figure 21:
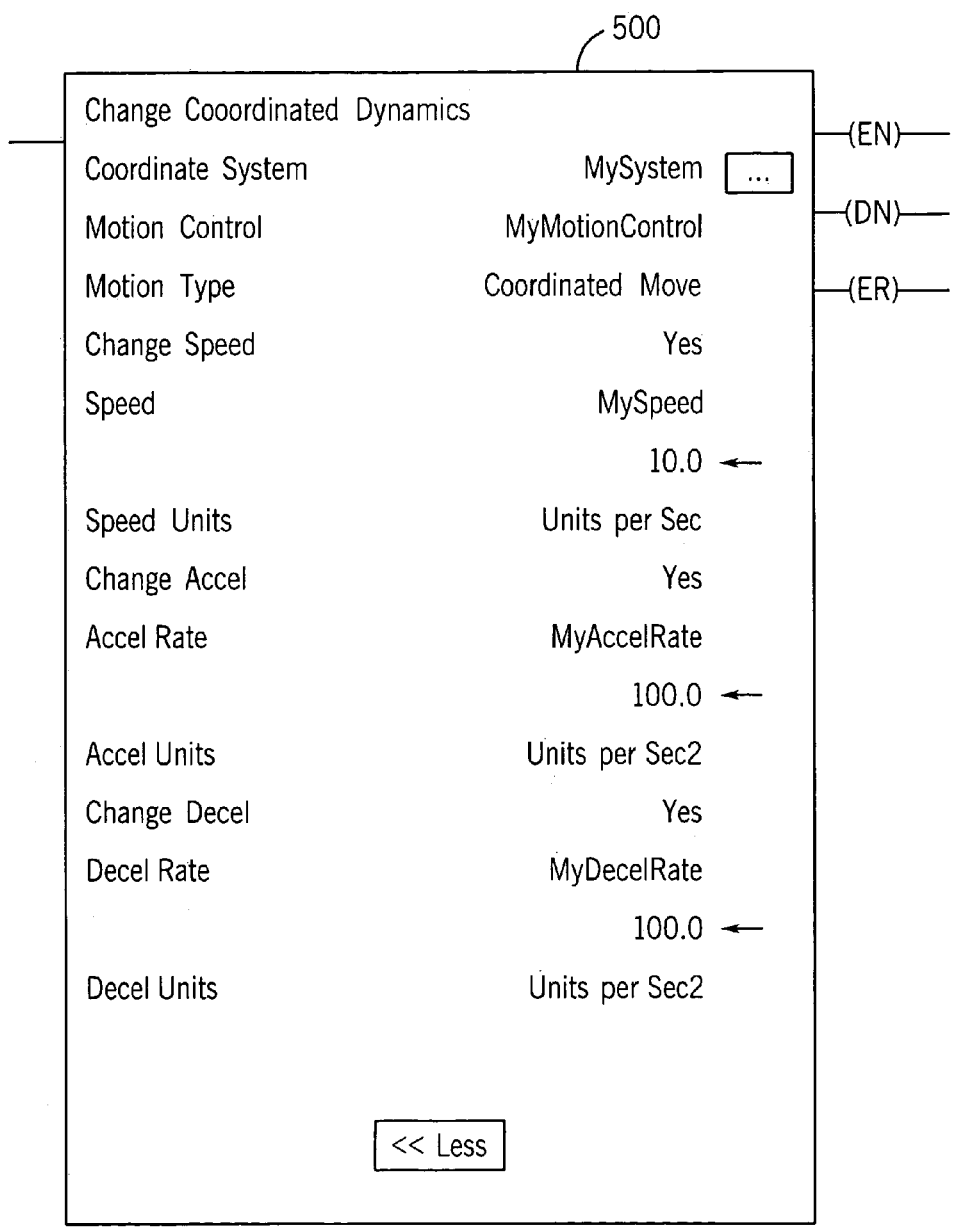
FIG. 21 is an instruction faceplate for a change coordinated dynamics instruction according to an exemplary embodiment.
Figure 22:
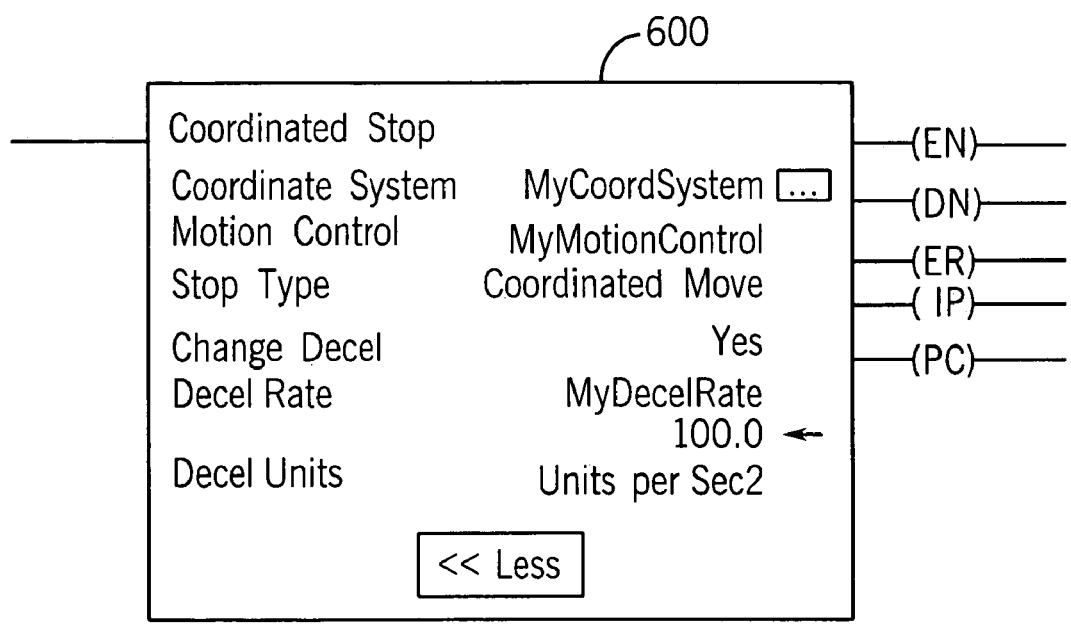
FIG. 22 is an instruction faceplate for a stop instruction according to an exemplary embodiment.

FIGS. 18–22 show the multi-axis instructions 31 as they appear to the programmer in one embodiment in which the instructions are instructions in a ladder logic programming language. The axes representing a Cartesian coordinate system can be moved to a new position using a coordinated move instruction 200 (FIG. 18), and can be issued on the fly path dynamic changes using a change coordinated dynamics instruction 500 (FIG. 21). In addition, the axes representing a target coordinate system can be locked to the axes representing a source coordinate system using the coordinate transformation instruction 300 (FIG. 19). Further, a position specified in the source coordinate system can be transformed into the same position specified in the target coordinate system using the calculate target position instruction 400 (FIG. 19). The axes involved in a coordinate system may be stopped together using the coordinated stop instruction 600 (FIG. 22). All instructions are part of the group of motion move instructions. FIGS. 23–24 show alternative embodiments of the coordinated move instruction 200.

A. Coordinated Move Instruction 200

Referring now to FIG. 18, in a first embodiment, a linear or circular coordinated move for the specified motion control axes within a Cartesian coordinate system may be initiated using a coordinated move instruction 200. FIG. 18 shows an exemplary ladder faceplate of the coordinated move instruction 200. A linear move approaches the new position directly. A circular move approaches the new position by circling either around or via the auxiliary position. The new and auxiliary positions can be defined as absolute or incremental position.

The coordinated move instruction 200 has operands 210–244 as shown in FIG. 18. As described below, the operands 210–244 are used to specify user-configurable parameters that configure the coordinated move initiated by execution of the coordinated move instruction 200. These operands will now be described in greater detail.

The coordinate system operand 210 specifies the group of motion control axes which span the coordinates $(x_1, \ldots, x_n)$ of a Cartesian coordinate system. The group of motion control axes correspond to axes of movement as defined by physical hardware (e.g., motors 27 and/or related hardware). The coordinate system may support up to thirty-two axes or more, depending on system configuration.

The motion control operand 212 provides information via bits 213. The bits 213 include an enable bit (EN) which is set when the rung transitions from false to true and which is reset when the rung transitions from true to false, a done bit (DN) which is reset when the rung transitions from false to true and which is set when the coordinated move has been initiated successfully, an error bit (ER) which is reset when the rung transitions from false to true and which is set when the coordinated move has not been initiated successfully, an in process bit (IP) which is set when the coordinated move has been initiated successfully and which is reset when the coordinated move reaches the new position or when the coordinated move is superseded by another coordinated move instruction or terminated by some other motion instruction, and a process complete bit (PC) which is reset when the rung transitions from false to true and which is set when the coordinated move reaches the new position. In addition to providing information via the bits 213, the coordinated move instruction 200 may also have other indicators such as error code indicators.

The move type operand 214 defines the path type of the coordinated move. In one embodiment, the coordinated move instruction 200 may be used for linear or circular move profiles. In this embodiment, the move type may be set to absolute linear (the axes move directly to the new position, which is defined by the position array), incremental linear (the axes move directly to the new position, which is defined by the sum of the position array and the old position), absolute circular (the axes move along a circular path to the new position, which is defined by the position array), or incremental circular (the axes move along a circular path to the new position, which is defined by the sum of the position array and the old position). Depending on the selected transition type operand 238, the current position or the position of the previous coordinated move defines the old position.

The position operand 216 defines either the new absolute or incremental position, depending on the value of the move type operand 214. The position operand 216 is a one-dimensional array, whose dimension is defined by the number of specified axes.

The auxiliary type operand 218 specifies how the auxiliary position operand 220 defines the circle if the move type operand 214 is set to circular. (If the move type operand 214 is set to linear, the specification of the auxiliary type is irrelevant/not used.) In one embodiment, the auxiliary type operand 218 may be set to absolute center (the auxiliary position array defines the center of the circle), incremental center (the sum of the auxiliary position array and the old position defines the center of the circle), absolute via (the auxiliary position array defines a position along the circle), or incremental via (the sum of the auxiliary position array and the old position defines a position along the circle). Depending on the value of the transition type operand 238, the current position or the position of the previous coordinated move defines the old position.

The auxiliary position operand 220 defines either the absolute or incremental auxiliary position, depending on the value of the auxiliary type operand 218. The auxiliary position operand 220 is a one-dimensional array, whose dimension is defined by the number of specified axes. If the move type operand 214 is set to linear, the specification of the auxiliary position operand 220 is optional. However, if the move type operand 214 is set to circular, the auxiliary position operand 220 specifies the center of the circle or a position along the circle.

The auxiliary vector operand 222 defines a vector that is normal to the plane of the circle if the move type operand 214 is set to circular. If the auxiliary type operand 218 is set to center, the direction of the auxiliary vector specifies the rotational direction of the circular move according to the right-handed screw rule. The auxiliary vector operand 222 is a one-dimensional array, whose dimension is defined by the number of specified axes. In general, the specification of the auxiliary vector operand 222 is optional. However, the auxiliary vector operand 214 may be specified when the move type operand 214 is set to circular and the vectors from the old position to the auxiliary position and from the auxiliary position to the new position are linearly dependent. The auxiliary vector operand 214 may also be specified when the move type operand 214 is set to circular, the auxiliary type operand 218 is set to center, and the rotational direction should not follow the shorter arc.

The speed operand 224, accel rate operand 228, and decel rate operand 232 define the maximum speed, acceleration, and deceleration along the path of the coordinated move. The speed units operand 226, accel units operand 230, and decel units operand 234 define the units that are applied to the values of speed, accel rate, and decel rate, where the maxima represent the maxima of the first coordinate system and the units represent coordination units. The profile operand 236 specifies whether the velocity profile of the coordinated move follows a trapezoidal or S-curve profile.

The transition type operand 238 defines the old position, which is used to establish the ideal path to the new position, and the transition schedule, which defines when the coordinated axes will start transitioning to the new position. The transition type operand 238 may be set to various values as indicated below.

| Transition Type | Behavior |
| --- | --- |
| Direct | The current position defines the old position. The coordinated axes immediately start moving to the new position. |
| Immediate | The position of the previous coordinated move defines the old position. If there was no previous coordinated move, the old position is assumed to be equal to the current position. The coordinated axes immediately start transitioning to the new position. |
| Decel | The position of the previous coordinated move defines the old position. If there was no previous coordinated move, the old position is assumed to be equal to the current position. When the previous coordinated move starts to decelerate, the coordinated axes start transitioning to the new position. |
| Position | The position of the previous coordinated move defines the old position. If there was no previous coordinated move, the old position is assumed to be equal to the current position. When the remaining position of the previous coordinated move is less than the transition range, the coordinated axes start transitioning to the new position. |
| Position and Blended | The position of the previous coordinated move defines the old position. If there was no previous coordinated move, the old position is assumed to be equal to the current position. When the remaining position of the previous coordinated move is less than the transition range, the coordinated axes start transitioning to the new position along a blended path. |

The merge operand 242 specifies whether or not to turn either all the motion or just the coordinated portion of the move into a pure coordinated move for all axes in the coordinated system:

| Merge | Behavior |
| --- | --- |
| Disabled | Any currently executing single axis motion instructions involving any axes defined in the specified coordinate system will not be affected by the activation of this instruction, and will result in superimposed motion on the affected axes. Also, any coordinated motion instructions involving the same specified coordinate system will run to completion based on its termination type. |
| Coordinated Motion | Any currently executing coordinated motion instructions involving the same specified coordinate system will be terminated, and the prior motion will be merged into the current move at the speed defined in the merge speed parameter. Also, any pending coordinated motion instructions will be cancelled. Any currently executing system single axis motion instructions involving any axes defined in the specified coordinate system will not be affected by the activation of this instruction, and will result in superimposed motion on the affected axes |
| All Motion | Any currently executing single axis motion instructions involving any axes defined in the specified coordinate system, and any currently executing coordinated motion instructions involving the same specified coordinate system, will be terminated, and the prior motion will be merged into the current move at the speed defined in the merge speed parameter. Also, any pending coordinated motion instructions will be cancelled. |

If the merge is enabled, the merge speed operand 244 defines the maximum speed along the path of the coordinated move.

B. Coordinate Transformation Instruction 300

The coordinate transformation 300 instruction initiates a coordinate transformation between the specified source and target coordinate system axes. Based on the type of the source and target system and the specified parameters, some or all of the following steps are performed: Transformation of the source system to a Cartesian coordinate system; rotation of the Cartesian coordinate system with the rotation matrix $\overline{R}$; translation of the Cartesian coordinate system with the offset vector $\overline{o}$; and/or transformation of the Cartesian coordinate system to the target system. The transformation matrix $\overline{T}$ can be calculated from the rotation matrix $\overline{R}$; by applying the auxiliary algorithm of Section II(C)(2). Therefore, the algebraic relationship between the source and target system is defined by:

$$P_t = f_{Cart.\to Target}(\overline{T} f_{Source \to Cart.}(P_s) + \overline{o})$$

Before executing the coordinate transformation instruction 300, the target axes may be moved to the position that corresponds to the position of the source axes and the specific coordinate transformation. The user can calculate the required position of the target axes using the calculate target position instruction 400.

The ladder faceplate of a three-dimensional coordinate transformation instruction 300 is shown in FIG. 19. The coordinate transformation instruction 300 has operands 310–320. The target and source coordinate system operands 310 and 312 specify the reference frames used to describe a set of individual axis positions. The following table shows the relevant coordinate systems, their dimension (n), and the notation used to describe the individual axis positions. The coordinate transformation instruction 300 supports transformations to and from each of the following coordinate systems: Cartesian, articulated cylindrical, articulated independent (e.g., 2, 3, or 4 axes), articulated dependent (e.g., 2, 3, or 4 axes), polary/cylindrical, SCARA independent, SCARA dependent, spherical. (A SCARA: (Selective Compliance Assembly Robot Arm) coordinate system is used for a combination of cylindrical and revolute configurations operating in the horizontal plane. This arrangement includes three linked arms with two rotary joints to provide movement in the horizontal plane; vertical movement is provided at the end of the arm.) Other coordinate system transformations may also be supported.

The maximum number of target or source axes defines the actual dimension of the coordinate transformation. If the number of target axes is higher than the number of the source axes, the coordinates for the missing source axes are assumed to be zero. In the case of an independent or dependent system, the coordinate transformation instruction 300 establishes a left-hand or right-hand configuration based on the initial angular coordinates. Thereafter, the established configuration is maintained. Hence, the coordinate transformation instruction 300 provides multi-dimensional coordinate transformations with the maximum dimension dependent on the selected source and target system.

For a linear coordinate, the coordinate value represents coordination units, which are defined by the coordination constant. For an angular coordinate such as $\phi$, $\psi$, $\alpha_1$, or $\alpha_2$, the coordinate value represents radians.

The target and source coordinate systems preferably support up to n axes (e.g., n=32, depending on system configuration). Note that for some transformations the target and source systems may contain the same axes.

The motion control operand 314 provides information via bits 315 which operate in generally the same manner as the bits 213 of FIG. 18. In addition to providing information via the bits 315, the coordinate transformation instruction 300 may also have other indicators such as error code indicators.

The rotation matrix $\overline{R}$ operand 316 defines the transformation matrix that is used to rotate the Cartesian coordinate system. It is a two-dimensional array, whose dimensions are defined by the maximum number of specified target or source axes. However, the specification of the rotation matrix is optional. If the rotation matrix is not specified it is assumed to be a unit matrix.

The offset vector $\overline{o}$ operand 318 defines the translation of the Cartesian coordinate system. It is a one-dimensional array, whose dimension is defined by maximum number of specified target or source axes. However, the specification of the offset vector is optional. If the offset vector is not specified it is assumed to be zero.

The master reference operand 320 specifies whether the actual or command position of the source axes should be transformed. The transformation may be bidirectional. Transformation preferably may however only occur in one direction at a time. The direction of transfer is only dependent on which side (source or target) the command is being generated.

C. Other Instructions

FIGS. 20–22 show other instructions that may be employed in connection with one or both of the coordinated move block 72 and the coordinate transformation block 74. These instructions include a calculate target position instruction 400, a change coordinated dynamics instruction 500, and axis coordinated stop instruction 600.

The calculate target position instruction 400 transforms a specified position from the source coordinate system into the target coordinate system. The calculate target position instruction 400 provides multi-dimensional coordinate transformations with the maximum dimension dependent on the selected source and target system. Based on the type of the source and target system and the specified parameters, some or all of the following steps are performed: transformation of the source system to a Cartesian coordinate system; rotation of the Cartesian coordinate system with the rotation matrix $\overline{R}$; translation of the Cartesian coordinate system with the offset vector $\overline{o}$; and/or transformation of the Cartesian coordinate system to the target system. Therefore, the algebraic relationship between the source and target system is defined by:

$$P_t = f_{Cart. \rightarrow Target}(Tf_{Source \rightarrow Cart.}(P_s) + \overline{o})$$

The ladder faceplate of a calculate target position instruction 400 is shown in FIG. 20.

The change coordinated dynamics instruction 500 initiates a change in dynamics for the specified coordinate system motion. Based on the specified motion type, the change coordinated dynamics instruction 500 changes the coordinated move (or jog) motion profile active on the specified system. In case of a coordinated move, the change coordinated dynamics instruction 500 changes the dynamics for the active as well as the pending coordinate move. The ladder faceplate of the change coordinated dynamics instruction 500 is shown in the FIG. 21.

The axis coordinated stop instruction 600 initiates a controlled stop of the specified coordinate system motion or transformation. Based on the specified stop type, the axis coordinated stop instruction 600 stops either all motion profiles or only a specific motion profile of the specified coordinate system. The ladder faceplate of the axis coordinated stop instruction 600 is shown in FIG. 22.

FIGS. 23–24 show an alternative embodiment of the coordinated move instruction 200. In the embodiment as shown in FIGS. 23–24, separate instructions are provided for linear moves and for circular moves.

The major differences between these two embodiments will now be described in greater detail. Since a separate instruction is used in this embodiment for linear and circular, the instruction used defines the type of move to be performed, either linear or circular.

FIG. 23 shows a linear instruction in accordance with this embodiment. The only two parameters that are different from the previous embodiment for linear are move type 500 and termination type 502. The move type 500 is used to define if the move is absolute or incremental. The definition of absolute and incremental is the same as the previous embodiment.

The termination type 502 is defined as follows:

| Transition Type | Behavior |
| --- | --- |
| Actual Tolerance | When the vector position lag for the primary axes and the position lag for each ancillary axis is less than the actual tolerance, the instruction will terminate. The position lag is the actual position minus the commanded position and is computed after the entire linear move has been interpolated, |

| Transition Type | Behavior |
|---|---|
| | that is, when the distance to go equals zero. A possible following instruction can then begin |
| No Settle | When the vector position lag for the primary axes and the position lag for each ancillary axis is less than the actual tolerance, the instruction will terminate. The position lag is the actual position minus the commanded position and is computed after the entire linear move has been interpolated, that is, when the distance to go equals zero. A possible following instruction can then begin. |
| Command Tolerance | When the vector distance-to-go for the primary axes and the distance-to-go for each ancillary axis is less than the command tolerance, the instruction will terminate. The distance-to-go is the distance from the programmed endpoint to the commanded position. A possible following instruction can then begin. If there is no following instruction, the move will degenerate to No Settle. |
| No Decel | When the entire linear move has been interpolated up to the deceleration point, the instruction will terminate. The deceleration point of the move is dependent on the profile chosen (trapezoidal or S-curve). A possible following instruction can then begin. If there is no following instruction, the move will degenerate to No Settle. |

In addition to all the bits defined for the previous embodiment, this embodiment has an (AC) bit which is set when the instruction is being executed. There is a queue of instructions which have been partially processed. The AC bit indicates which of the instructions is being executed.

FIG. 23 shows a circular instruction for this embodiment. The following five operands are different from the previous embodiment: move type 504, circle type 505, via/center/radius 506, direction 507 and termination type 508.

The move type operand 504 is defined as described above in connection with the move type operand 500. The circle type operand 505 describes the type of circle being programmed. It defines how to interpret the via/center/radius operand 506. The circle type operand 505 specifies if the value given in the operand 506 should be used as a point along the arc of the circle or the circle center, or the circle radius.

The via/center/radius operand 506 defines an array which is interpreted as defined by the operand 505, i.e., a point on the circle as an absolute via (the array value defines a position along the circle), or an incremental via (the sum of the array value and the old position defines a position along the circle) or the absolute center or an incremental center (the sum of the array value and the old position defines the center of the circle), or the radius of the circle.

The direction operand 507 specifies the rotational direction of the circular move according to the right-handed screw rule for a two dimensional circle and the shortest/longest path for a 3 dimensional circle. The termination type operand 508 for circular is defined to be the same as it is for linear.

IV. Bézier Spline Interpolation

Referring now to FIGS. 25–31, in another embodiment, rather than implement the coordinated move block 72 using coordinate transformations, the coordinated move block 72 is implemented using Bézier spline interpolation. According to this approach, the user is permitted to specify a plurality of weighting points in order to define a path profile. In response, the coordinated move block 72 generates a smooth path based on the specific boundary conditions which passes near the weighting points.

Figure 25:
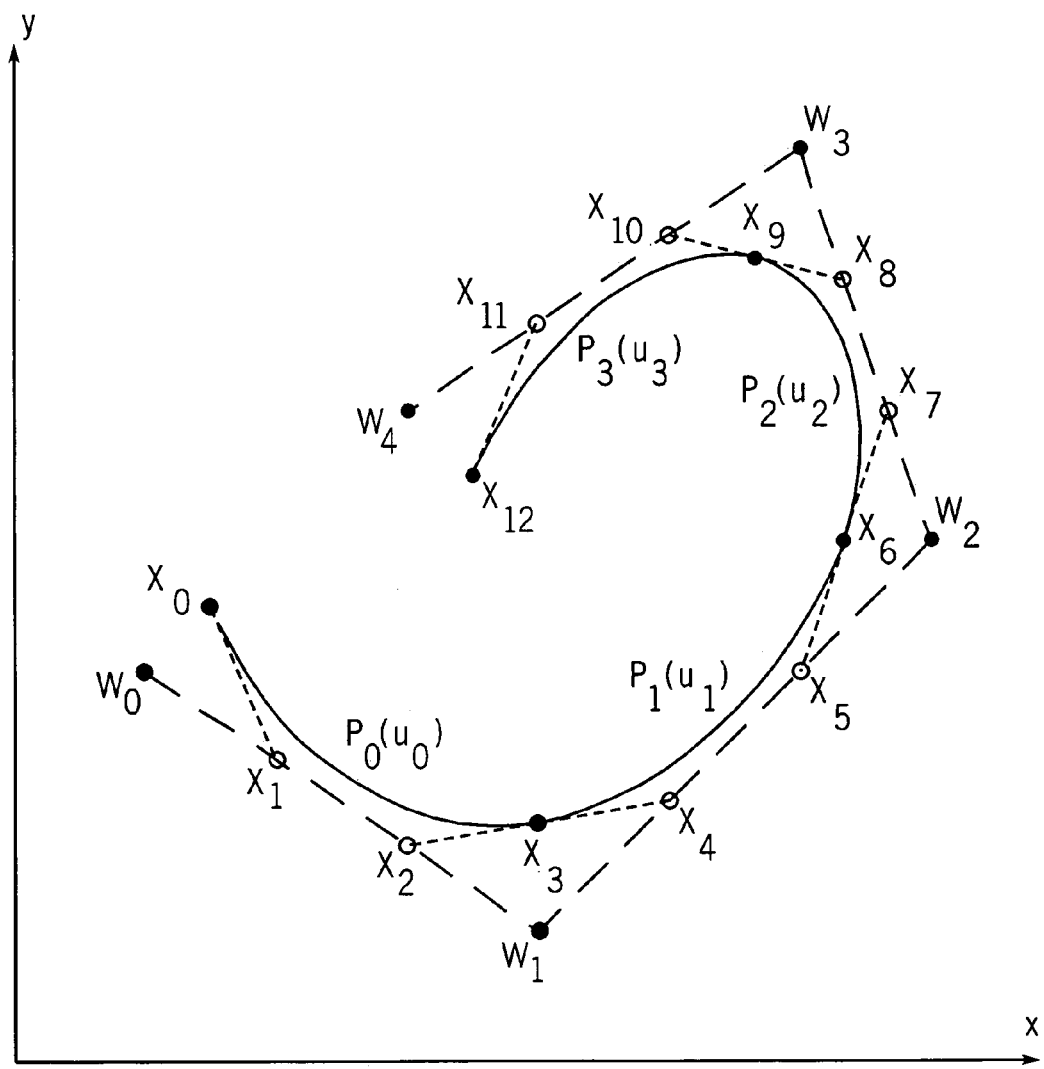
FIG. 25 shows an example of a Bézier spline curve which may be generated according to another exemplary embodiment.
Figure 26:
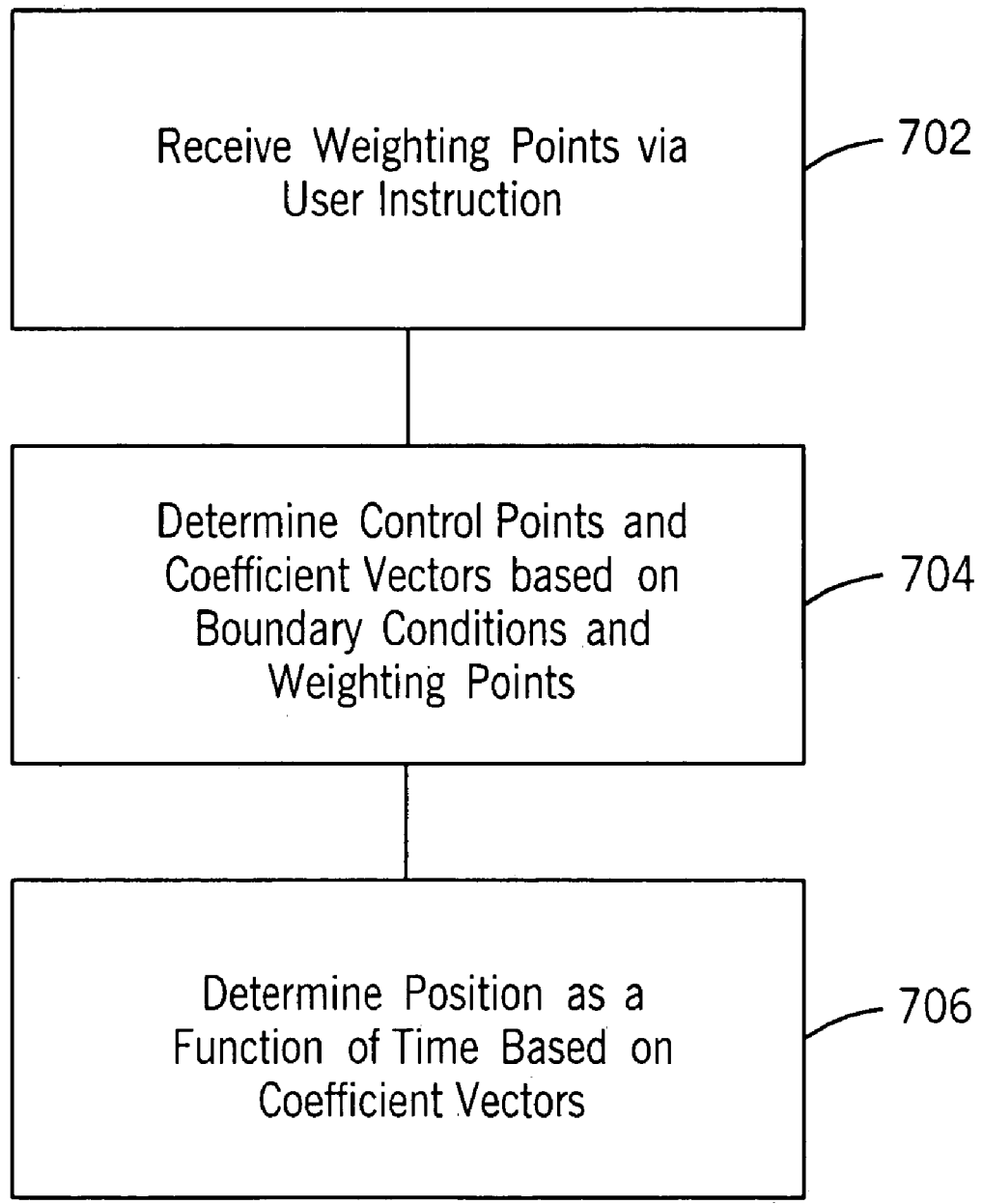
FIG. 26 shows a process for generating position reference values as a function of time for the embodiment of FIG. 25.

Referring specifically to FIG. 25, FIG. 25 shows an example of a Bézier spline curve which may be generated by the coordinated move block 72. In FIG. 25, the user has specified five weighting points $W_0$–$W_4$. However, the user may also specify the starting and ending dynamics instead of the starting and ending weighting point $W_0$ and $W_4$. It will be understood that the number and placement of weighting points may vary from case to case as specified by the user. The weighting points may be specified by the user using the coordinated move instruction 200 or similar instruction modified to incorporate a plurality of fields configured to receive such weighting points. Based on the boundary control points $X_0$ and $X_{12}$ and the weighting points $W_0$–$W_4$, the coordinated move block 72 identifies a plurality of control points (shown as points $X_1$–$X_{11}$) and an associated plurality of polynomial path segments (shown as polynomials $P_0$–$P_3$). Again, it will be understood that the number and arrangement of control points and polynomial segments varies based on the weighting points specified by the user.

In the example of FIG. 25, the endpoints of the path profile are defined by the control points $X_0$ and $X_{12}$. Thus, the move starts at the control point $X_0$ with a starting velocity $\overline{v_s}$ and a starting acceleration $\overline{a_s}$ (determined by the previous move) and ends at the control point $X_{12}$ with an ending velocity $\overline{v_e}$ and an ending acceleration $\overline{a_e}$ (determined by the next move). As will be detailed below, the remaining control points ($X_1$–$X_{11}$) are then calculated such that the first and second derivatives of the spline segments at the transition points ($X_3$, $X_6$, $X_9$) between the path segments are equal. The path passes through the transition points but typically does not pass through the remaining control points. In the context of a path profile, where the curve represents position as a function of time, the control points are calculated such that the velocity vectors and the acceleration vectors are equal for adjacent path segments at the transition points. Also, within the constraint that the first and second derivatives must be equal for adjacent path segments, the remaining control points ($X_1$–$X_{11}$) are calculated such that the path segments ($P_0$–$P_3$) pass near the weighting points ($W_0$–$W_4$). The control points may be calculated by a separate calculation instruction or during an initial phase of a coordinated move instruction.

In the general case, the user may specify m+1 weighting points $\{W_0 \ldots W_m\}$ resulting in m path segments $\{P_0 \ldots P_{m-1}\}$ Hence, in the example of FIG. 25, where five weighting points $W_0$–$W_4$ are specified, there are four polynomial path segments $P_0$–$P_3$. For each path segment $P_j$ (where j=0, 1, 2, 3, depending on the path segment), a plurality of coefficient vectors $\overline{c_{0,j}}$, $\overline{c_{1,j}}$, $\overline{c_{2,j}}$, and $\overline{c_{3,j}}$ is calculated (not shown in FIG. 25). The control vectors are calculated based on a subset of the control points ($X_{3j}$, $X_{3j+1}$, $X_{3j+2}$, $X_{3j+3}$). For example, for the path segment $P_1$, the control vectors are calculated based on the control points $X_3$, $X_4$, $X_5$, and $X_6$, with the control points $X_3$ and $X_6$ being the transition points for the path segment $P_1$. The control point $X_6$ is also a transition point for the path segment $P_2$, and therefore, the coefficient vectors $\overline{c_{0,j}}$, $\overline{c_{1,j}}$, $\overline{c_{2,j}}$, and $\overline{c_{3,j}}$ for the two path segments are calculated such that the starting velocity and acceleration vectors for the path segment $P_2$ are equal to the ending velocity and acceleration vectors for the path segment $P_1$ at the transition point $X_6$.

The coefficient vectors $\overline{c_{0,j}}$, $\overline{c_{1,j}}$, $\overline{c_{2,j}}$, and $\overline{c_{3,j}}$ are used during the dynamic phase of the profile generation (e.g., as the controlled element is moving) to calculate the current position, that is, to calculate the position reference values for the motion controllers 23. The Bézier spline polynomial is configured to provide the geometry of the path as a function of individual parameters $u_j$ which vary between 0 and 1 but which may in turn be specified as a function of time. Accordingly, the position reference values may be generated as a function of time and provided to the motion control loops to control operation of each of the motion control axes. Each calculated $P_j$ value specifies the position of the curve in multiple dimensions (i.e., a multi-dimensional array), such that one coordinate may be provided to each of the plurality of motion control loops.

As in the case of the coordinate transformation technique described above in Section II, Bézier spline interpolation may be used to generate transitioning path segments between a variety of types of path segments including linear, circular, and curved path segments. Also, rather than using Bézier spline interpolation only for transitioning path segments, the entire path could be constructed using Bézier spline interpolation. Because the path is calculated such that the velocity and acceleration are constant at path transition points and at the endpoints, Bézier spline interpolation provides a smooth path between points in space. Likewise, the calculations are sufficiently simple such that it is possible to change the profile dynamically during path execution.

In Section IV(A), a mathematical characterization is provided of a single segment of a Bézier spline. Based on this knowledge and the requirement of smooth boundary conditions, Section IV(B) derives the general algorithm for Bézier spline interpolation. Section IV(C) provides the specific algorithms for Bézier splines transitions such as blending to and from linear, circular, or curved motion profiles. Section IV(D) describes the dynamics of a Bézier spline.

A. Mathematical Characterization of Single Bézier Spline Segment

In this section, an equation for a single exemplary Bézier spline segment is provided. Initially, in this section, the exemplary Bézier may be any one of a starting path segment, an intermediate path segment, or an ending path segment in a Bézier path comprising multiple adjacent Bézier path segments. From the Bézier spline equation and known boundary conditions, equations for calculating the coefficient vectors $\overline{c_{0,j}}$, $\overline{c_{1,j}}$, $\overline{c_{2,j}}$, and $\overline{c_{3,j}}$ for the spline segment based on the control points $(X_{3j}, X_{3j+1}, X_{3j+2}, X_{3j+3})$, and equations for calculating the first and second derivatives for the path starting points and ending points ($P_j'(0)$, $P_j'(1)$, $P_j''(0)$, and $P_j''(1)$), are developed.

The position $P_j$ of a cubic Bézier spline segment j can be described by a cubic polynomial $$P_j(u_j) = \overline{c_{0,j}} + \overline{c_{1,j}} * u_j + \overline{c_{2,j}} * u_j^2 + \overline{c_{3,j}} * u_j^3$$

with the coefficient vectors $\{\overline{c_{0,j}}, \ldots \overline{c_{3,j}}\}$ and the parameter $u_j \in [0,1]$.

However, this representation can be transformed into the standard Bézier representation with the introduction of the control points $\{X_{3j}, \ldots, X_{3j+3}\}$ that satisfy the following boundary conditions:

1. The polynomial $P_j(u_j)$ starts at the control point $X_{3j}$:

$$P_j(0) = X_{3j}$$

2. The polynomial $P_j(u_j)$ ends at the control point $X_{3j+3}$:

$$P_j(1) = X_{3j+3}$$

3. The polynomial $P_j(u_j)$ starts with a first derivative defined by the control point $X_{3j+1}$ and the multiplier $\mu_{s,j}$:

$$P_j'(0) = \mu_{s,j}(X_{3j+1} - X_{3j})$$

4. The polynomial $P_j(u_j)$ ends with a first derivative defined by the control point $X_{3j+2}$ and the multiplier $\mu_{e,j}$:

$$P_j'(1) = \mu_{e,j}(X_{3j+3} - X_{3j+2})$$

5. The polynomial $P_j(u_j)$ starts with a second derivative that is independent of the control point $X_{3j+3}$:

$$P_j''(0) = f(X_{3j}, X_{3j+1}, X_{3j+2})$$

6. The polynomial $P_j(u_j)$ ends with a second derivative that is independent of the control point $X_{3j}$:

$$P_j''(1) = g(X_{3j+1}, X_{3j+2}, X_{3j+3})$$

Using the conditions 1, 2, 3, and 4, the polynomial $P_j(u_j)$, and its first derivative, $$P_j'(u_j) = \overline{c_{1,j}} + 2 * \overline{c_{2,j}} * u_j + 3 * \overline{c_{3,j}} * u_j^2$$

a set of equations for the coefficient vectors of the polynomial $P_j(u_j)$ can be derived as follows.

$$X_{3j} = \overline{c_{0,j}}$$

$$X_{3j+3} = \overline{c_{0,j}} + \overline{c_{1,j}} + \overline{c_{2,j}} + \overline{c_{3,j}}$$

$$\mu_{s,j}(X_{3j+1} - X_{3j}) = \overline{c_{1,j}}$$

$$\mu_{e,j}(X_{3j+3} - X_{3j+2}) = \overline{c_{1,j}} 2 * \overline{c_{2,j}} + 3 * \overline{c_{3,j}}$$

In order to solve the above set of equations, the coefficient vector $\overline{c_{3,j}}$ is separated from the second equation.

$$\overline{c_{3,j}} = X_{3j+3} - \overline{c_{0,j}} - \overline{c_{1,j}} - \overline{c_{2,j}}$$

Using the above result, the coefficient vector $\overline{c_{2,j}}$ can be calculated.

$$\begin{aligned}
\mu_{e,j}(X_{3j+3} - X_{3j+2}) &= \overline{c_{1,j}} + 2 * \overline{c_{2,j}} + 3 * \overline{c_{3,j}} \\
&= \overline{c_{1,j}} + 2 * \overline{c_{2,j}} + 3(X_{3j+3} - \overline{c_{0,j}} - \overline{c_{1,j}} - \overline{c_{2,j}}) \\
&= -3 * \overline{c_{0,j}} - 2 * \overline{c_{1,j}} - c_{2,j} + 3 * X_{3j+3} \\
\overline{c_{2,j}} &= -3 * \overline{c_{0,j}} - 2 * \overline{c_{1,j}} + 3 * X_{3j+3} - \\
&\quad \mu_{e,j}(X_{3j+3} - X_{3j+2}) \\
&= -3 * X_{3j} - 2 \mu_{s,j}(X_{3j+1} - X_{3j}) + \\
&\quad 3 * X_{3j+3} - \mu_{e,j}(X_{3j+3} - X_{3j+2}) \\
&= (2 * \mu_{s,j} - 3)X_{3j} - 2 * \mu_{s,j} * X_{3j+1} + \\
&\quad \mu_{e,j} * X_{3j+2} + (3 - \mu_{e,j})X_{3j+3}
\end{aligned}$$

Using the coefficient vector $\overline{c_{2,j}}$, the coefficient vector $\overline{c_{3,j}}$ can be calculated.

$$\begin{aligned}
\overline{c_{3,j}} &= X_{3j+3} - \overline{c_{0,j}} - \overline{c_{1,j}} - \overline{c_{2,j}} \\
&= X_{3j+3} - X_{3j} - \mu_{s,j}(X_{3j+1} - X_{3j}) - \\
&\quad (2 * \mu_{s,j} - 3)X_{3j} + 2 * \mu_{s,j} * X_{3j+1} - \\
&\quad \mu_{e,j} * X_{3j+2} - (3 - \mu_{e,j})X_{3j+3} \\
&= (2 - \mu_{s,j})X_{3j} + \mu_{s,j} * X_{3j+1} - \mu_{e,j} * X_{3j+2} + (\mu_{e,j} - 2)X_{3j+3}
\end{aligned}$$

All the coefficient vectors $\{\overline{c_{0,j}}, \ldots \overline{c_{3,j}}\}$ of the polynomial $P_j(u_j)$ are now represented based on the known control points $\{X_{3j}, \ldots, X_{3j+3}\}$ and the unknown multipliers $\mu_{s,j}$ and $\mu_{e,j}$. Using the conditions 5 and 6 and the second derivative of the polynomial $P_j(u_j)$ $$P_j''(u_j) = 2 * \overline{c_{2,j}} + 6 * \overline{c_{3,j}} * u_j$$

a set of equations for the multipliers $\mu_{s,j}$ and $\mu_{e,j}$ can be derived.

$$\begin{aligned}
f(X_{3j}, X_{3j+1}, X_{3j+2}) &= 2 * \overline{c_{2,j}} \\
&= 2(2 * \mu_{s,j} - 3)X_{3j} - 4 * \mu_{s,j} * X_{3j+1} + \\
&\quad 2 * \mu_{e,j} * X_{3j+2} + 2(3 - \mu_{e,j})X_{3j+3}
\end{aligned}$$

$$g(X_{3j+1}, X_{3j+2}, X_{3j+3}) = 2*\overline{c_{2,j}} + 6*\overline{c_{3,j}}$$
$$= 2(2*\mu_{s,j} - 3)X_{3j} - 4*\mu_{s,j}*X_{3j+1} +$$
$$2*\mu_{e,j}*X_{3j+2} + 2(3-\mu_{e,j})X_{3j+3} +$$
$$6(2-\mu_{s,j})X_{3j} + 6*\mu_{s,j}*X_{3j+1} -$$
$$6*\mu_{e,j}*X_{3j+2} + 6(\mu_{e,j} - 2)X_{3j+3}$$
$$= 2(3-\mu_{s,j})X_{3j} + 2*\mu_{s,j}*X_{3j+1} -$$
$$4*\mu_{e,j}*X_{3j+2} + 2(2*\mu_{e,j} - 3)X_{3j+3}$$

In order for the function f to be independent of the control point $X_{3j+3}$ and the function g to be independent of the control point $X_{3j}$, the multipliers $\mu_{s,j}$ and $\mu_{e,j}$ have to be equal to 3. With this result, the coefficient vectors can be simplified:

$$\overline{c_{0,j}} = X_{3j}$$
$$\overline{c_{1,j}} = 3(-X_{3j} + X_{3j+1})$$
$$\overline{c_{2,j}} = 3(X_{3j} - 2*X_{3j+1} + X_{3j+2})$$
$$\overline{c_{3,j}} = -X_{3j} + 3(X_{3j+1} - X_{3j+2}) + X_{3j+3}$$

With the simplified coefficient vectors, the representation of the polynomial $P_j(u_j)$ can be transformed into the standard Bézier representation:

$$P_j(u_j) = \overline{c_{0,j}} + \overline{c_{1,j}}*u_j + \overline{c_{2,j}}*u_j^2 + \overline{c_{3,j}}*u_j^3$$
$$= X_{3j} + 3(-X_{3j} + X_{3j+1})u_j + 3(X_{3j} - 2*X_{3j+1} + X_{3j+2})u_j^2 +$$
$$(-X_{3j} + 3(X_{3j+1} - X_{3j+2}) + X_{3j+3})u_j^3$$
$$= X_{3j}(1 - 3*\mu_j + 3*\mu_j^2 - u_j^3) + 3*X_{3j+1}(u_j - 2*u_j^2 + u_j^3) +$$
$$3*X_{3j+2}(u_j^2 - u_j^3) + X_{3j+3}*u_j^3$$
$$= X_{3j}(1-u_j)^3 + 3*X_{3j+1}(1-u_j)^2 u_j +$$
$$3*X_{3j+2}(1-u_j)u_j^2 + X_{3j+3}*u_j^3$$

With the introduction of the distances $$\overline{d_k} := X_k - X_{k-1}$$
$$\overline{e_j} := 3*\overline{d_{3j+2}}$$

the equations for the coefficient vectors and the first and second derivatives of the polynomial $P_j(u_j)$ at the transition points can be further simplified:

$$\overline{c_{0,j}} = X_{3j}$$
$$\overline{c_{1,j}} = 3*\overline{d_{3j+1}}$$
$$\overline{c_{2,j}} = 3(\overline{d_{3j+2}} - \overline{d_{3j+1}})$$
$$= \overline{e_j} - \overline{c_{1,j}}$$
$$\overline{c_{3,j}} = X_{3j+3} - X_{3j} - 3*\overline{d_{3j+2}}$$
$$= X_{3j+3} - X_{3j} - \overline{e_j}$$
$$P_j'(0) = 3(X_{3j+1} - X_{3j})$$
$$= 3*\overline{d_{3j+1}}$$
$$P_j'(1) = 3(X_{3j+3} - X_{3j+2})$$
$$= 3*\overline{d_{3j+3}}$$
$$P_j''(0) = f(X_{3j}, X_{3j+1}, X_{3j+2})$$
$$= 6(X_{3j} - 2*X_{3j+1} + X_{3j+2})$$
$$= 6(\overline{d_{3j+2}} - \overline{d_{3j+1}})$$

$$P_j''(1) = g(X_{3j+1}, X_{3j+2}, X_{3j+3})$$
$$= 6(X_{3j+1} - 2*X_{3j+2} + X_{3j+3})$$
$$= 6(\overline{d_{3j+3}} - \overline{d_{3j+2}})$$

B. Bézier Spline Interpolation

Based on the knowledge of the equations for the coefficient vector $\overline{c_{0,j}}$, $\overline{c_{1,j}}$, $\overline{c_{2,j}}$, and $\overline{c_{3,j}}$ and the equations for the first and second derivatives at the path transition points ($P_j'(0)$, $P_j'(1)$, $P_j''(0)$, and $P_j''(1)$) as developed in the previous section for a single path segment, this section derives the general algorithm for Bézier spline interpolation over multiple path segments, including determining the locations of the control points $X_1$–$X_{3m-1}$ based on the boundary control points $X_0$ and $X_{3m}$ and the user-specified weighting points $\{W_0 \ldots W_m\}$ (where m is the number of Bézier spline segments). Using this information, the equations for the coefficient vectors is also further simplified.

As shown in FIG. 25, a cubic Bézier spline consists of a series of cubic Bézier spline segments with the Bézier spline passing through the control points $\{X_0, X_3, \ldots, X_{3m}\}$ and transitioning at the points $\{X_3, \ldots, X_{3m-3}\}$ with a smooth first and second derivative. As a result, the polynomials $P_j(u_j)$ with $0 \leq j < m$ satisfy the following boundary conditions:

1. The polynomial $P_j(u_j)$ starts at the control point $X_{3j}$:

$$P_j(0) = X_{3j} \quad 0 \leq j < m$$

2. The polynomial $P_j(u_j)$ ends at the control point $X_{3j+3}$:

$$P_j(1) = X_{3j+3} \quad 0 \leq j < m$$

3. The first derivatives of the preceding polynomial $P_{j-1}(u_{j-1})$ and the subsequent polynomial $P_j(u_j)$ are equal at the transition point $X_{3j}$:

$$P_{j-1}'(1) = P_j'(0) \quad 0 < j < m$$

4. The second derivatives of the preceding polynomial $P_{j-1}(u_{j-1})$ and the subsequent polynomial $P_j(u_j)$ are equal at the transition point $X_{3j}$:

$$P_{j-1}''(1) = P_j''(0) \quad 0 < j < m$$

Using the second derivative of the polynomial $P_j(u_j)$ at the transition points and condition 4, a set of equations for the control points $X_{3j-1}$ with $0 < j \leq m$ and $X_{3j+1}$ with $0 \leq j < m$ can be derived.

$$P_{j-1}''(1) = P_j''(0)$$

$$6(X_{3(j-1)+1} - 2*X_{3(j-1)+2} + X_{3(j-1)+3}) = 6(X_{3j} - 2*X_{3j+1} + X_{3j+2})$$

$$X_{3j-2} - 2*X_{3j-1} + X_{3j} = X_{3j} - 2*X_{3j+1} + X_{3j+2}$$

$$2*X_{3j-1} - X_{3j-2} = 2*X_{3j+1} - X_{3j+2}$$

With the specification of the weighting points $$W_j := 2*X_{3j-1} - X_{3j-2} \quad = 2*X_{3j+1} - X_{3j+2}$$
$$:= X_{3j-1} + (X_{3j-1} - X_{3j-2}) = X_{3j+1} - (X_{3j+2} - X_{3j+1})$$
$$:= X_{3j-1} + \overline{d_{3j-1}} \quad = X_{3j+1} - \overline{d_{3j+2}}$$

the control points can be derived by the following set of equations.

$$W_{j-1} + 2*W_j = (2*X_{3(j-1)+1} - X_{3(j-1)+2}) + 2(2*X_{3j-1} - X_{3j-2})$$
$$= 2*X_{3j-2} - X_{3j-1} + 4*X_{3j-1} - 2*X_{3j-2}$$
$$= 3*X_{3j-1}$$
$$2*W_j + W_{j+1} = 2(2*X_{3j+1} - X_{3j+2}) + (2*X_{3(j+1)-1} - X_{3(j+1)-2})$$
$$= 4*X_{3j+1} - 2*X_{3j+2} + 2*X_{3j+2} - X_{3j+1}$$
$$= 3*X_{3j+1}$$

Using the above result, the first derivative of the polynomial $P_j(u_j)$ at the transition points, and condition 3, a set of equations for the control points $X_{3j}$ with $0<j<m$ can be derived.

$$P_{j-1}'(1)=P_j'(0)$$

$$3(X_{3(j-1)+3}-X_{3(j-1)+2})=3(X_{3j+1}-X_{3j})$$

$$X_{3j}-X_{3j-1}=X_{3j+1}-X_{3j}$$

$$2*X_{3j}=X_{3j-1}+X_{3j+1}$$

Therefore, the control points $X_k$ with $0<k<3m$ (that is, the control points other than $X_0$ and $X_{3m}$) are defined by the following equations.

$$X_{3j-1} = \frac{W_{j-1} + 2*W_j}{3} \quad 0 < j \le m$$
$$X_{3j+1} = \frac{2*W_j + W_{j+1}}{3} \quad 0 \le j < m$$
$$X_{3j} = \frac{X_{3j-1} + X_{3j+1}}{2} \quad 0 < j < m$$

The remaining control points $X_0$ and $X_{3m}$ are defined by the boundary conditions.

With these results the equations for the coefficient vectors with $0<j<m$ can be further simplified.

$$\overline{d_k} := X_k - X_{k-1}$$
$$\overline{e_j} := 3*\overline{d_{3j+2}}$$
$$:= 3(X_{3j+2} - X_{3j+1})$$
$$:= 3(X_{3(j+1)-1} - X_{3j+1})$$
$$:= 3\left(\frac{W_{(j+1)-1} + 2*W_{(j+1)}}{3} - \frac{2*W_j + W_{j+1}}{3}\right)$$
$$:= W_j + 2*W_{j+1} - 2*W_j - W_{j+1}$$
$$:= W_{j+1} - W_j$$
$$\overline{c_{0,j}} = X_{3j}$$
$$\overline{c_{1,j}} = 3*\overline{d_{3j+1}}$$
$$= 3(X_{3j+1} - X_{3j})$$
$$= 3\left(X_{3j+1} - \frac{X_{3j-1} + X_{3j+1}}{2}\right)$$
$$= \frac{3}{2}(X_{3j+1} - X_{3j-1})$$
$$= \frac{3}{2}\left(\frac{2*W_j + W_{j+1}}{3} - \frac{W_{j-1} + 2*W_j}{3}\right)$$
$$= \frac{1}{2}(2*W_j + W_{j+1} - W_{j-1} - 2*W_j)$$
$$= \frac{W_{j+1} - W_{j-1}}{2}$$
$$\overline{c_{2,j}} = 3(\overline{d_{3j+2}} - \overline{d_{3j+1}})$$
$$= \overline{e_j} - \overline{c_{1,j}}$$
$$\overline{c_{3,j}} = X_{3j+3} - X_{3j} - 3*\overline{d_{3j+2}}$$
$$= X_{3j+3} - X_{3j} - \overline{e_j}$$

C. Bézier Spline Transitions

The remaining problem is to smoothly transition to and from a Bézier spline. As previously noted, Bézier spline interpolation may in one embodiment be used to connect linear, circular, and curved path segments. Accordingly, the transition to and from a Bézier spline can occur with or without a specific curvature. The first and last segments of the Bézier spline should have a curvature which matches the curvature (if any) of adjacent linear, circular, or curved path segments. In this section, simplified equations for the control points and the coefficient vectors are developed for the first and last path segments based on expected curvature of adjacent path segments.

1. Transition Without Curvature

Figure 27:
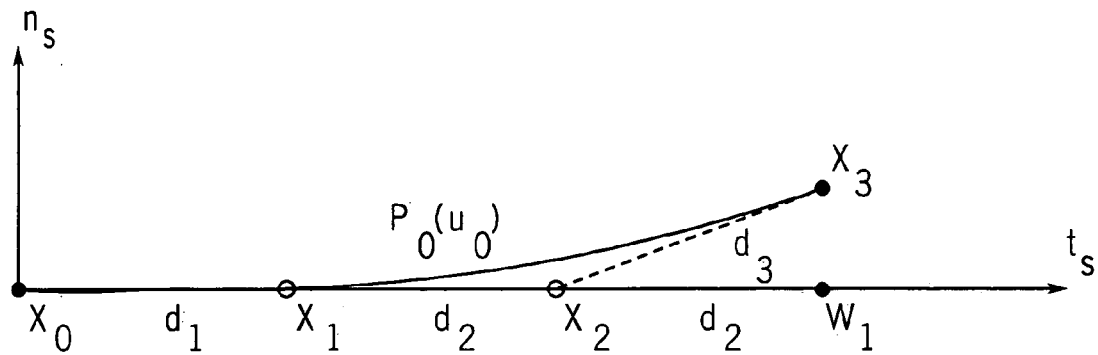
FIG. 27 shows a transition from a preceding motion profile to a Bézier spline segment for the embodiment of FIG. 25.

With reference to FIG. 27, the transition from a preceding motion profile to a Bézier spline occurs at the control point $X_0$ with a given tangent $\overline{t_s}$, a constant first derivative, and a zero curvature. With the second derivative at the transition point $$P_0''(0)=6(\overline{d_2}-\overline{d_1})$$

and the requirement of a constant first derivative at the transition point $$P_0''(0)=\overline{0}$$
$$6(\overline{d_2}-\overline{d_1})=\overline{0}$$
$$\overline{d_2}=\overline{d_1}$$

the curvature is defined by $$\kappa_s = \frac{\|P_0'(0) \times P_0''(0)\|}{\|P_0'(0)\|^3}$$
$$= \frac{\|P_0'(0) \times \overline{0}\|}{\|P_0'(0)\|^3}$$
$$= 0$$

and the distance $\overline{d_1}$ and the control points $X_1$ and $X_2$ are defined by the following equations:

$$\overline{d_1}+\overline{d_2}+\overline{d_2}=W_1-X_0$$
$$3*\overline{d_1}=W_1-X_0$$

$$\overline{d_1} = \frac{W_1 - X_0}{3}$$

$$X_1=X_0+\overline{d_1}$$
$$X_2=X_1+\overline{d_1}$$

With these results, the coefficient vectors can be simplified:

$$\overline{c_{0,0}} = X_0$$
$$\overline{c_{1,0}} = 3*\overline{d_1}$$
$$= W_1 - X_0$$
$$\overline{c_{2,0}} = 3(\overline{d_2} - \overline{d_1})$$
$$= \overline{0}$$
$$\overline{c_{3,0}} = X_3 - X_0 - 3*\overline{d_2}$$
$$= X_3 - X_0 - (W_1 - X_0)$$
$$= X_3 - W_1$$

The transition from a Bézier spline to a subsequent motion profile can be derived in a similar fashion.

$$\overline{d_{3m-1}} = \overline{d_{3m}}$$
$$\overline{d_{3m}} = \frac{X_{3m} - W_{m-1}}{3}$$
$$X_{3m-1} = X_{3m} - \overline{d_{3m}}$$
$$X_{3m-2} = X_{3m-1} - \overline{d_{3m}}$$
$$\overline{e_{m-1}} := 3 * \overline{d_{3m-1}}$$
$$:= X_{3m} - W_{m-1}$$
$$\overline{f_{m-1}} := X_{3m-3} - W_{m-1}$$
$$\overline{g_{m-1}} := 3 * \overline{f_{m-1}}$$
$$:= 3(X_{3m-3} - W_{m-1})$$
$$\overline{c_{0,m-1}} = X_{3m-3}$$
$$\overline{c_{1,m-1}} = 3 * \overline{d_{3m-2}}$$
$$= 3(X_{3m-2} - X_{3m-3})$$
$$= 3(W_{m-1} + \overline{d_{3m-1}} - X_{3m-3})$$
$$= 3 * \overline{d_{3m-1}} - 3(X_{3m-3} - W_{m-1})$$
$$= \overline{e_{m-1}} - \overline{g_{m-1}}$$
$$\overline{c_{2,m-1}} = \overline{e_{m-1}} - \overline{c_{1,m-1}}$$
$$= \overline{e_{m-1}} - (\overline{e_{m-1}} - \overline{g_{m-1}})$$
$$= \overline{g_{m-1}}$$
$$\overline{c_{3,m-1}} = X_{3m} - X_{3m-3} - \overline{e_{m-1}}$$
$$= X_{3m} - X_{3m-3} - (X_{3m} - W_{m-1})$$
$$= W_{m-1} - X_{3m-3}$$
$$= -\overline{f_{m-1}}$$

2. Transition with Curvature

Figure 28:
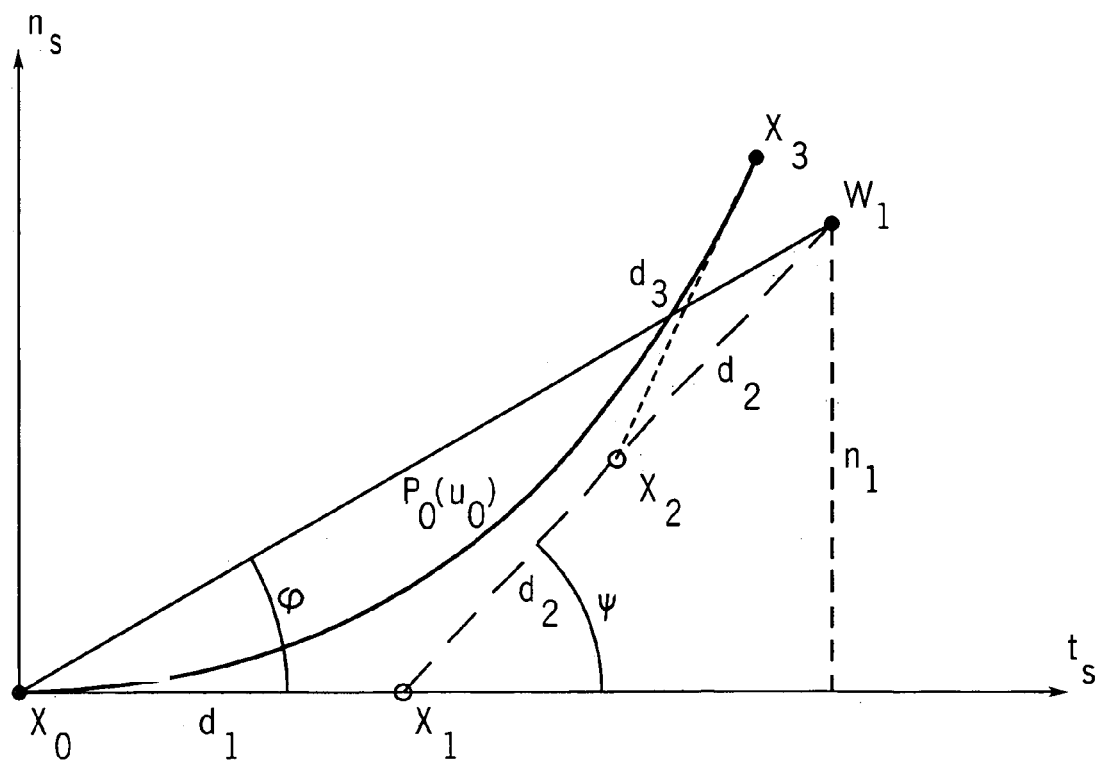
FIG. 28 shows another transition from a preceding motion profile to a Bézier spline segment for the embodiment of FIG. 25.

With reference to FIG. 28, the transition from a preceding motion profile to a Bézier spline occurs at the control point $X_0$ with a given tangent $\overline{t_s}$ and a given curvature $\kappa_s$. With the first and second derivative at the transition point $$P_0'(0) = 3 * \overline{d_1}$$
$$P_0''(0) = 6(\overline{d_2} - \overline{d_1})$$

and the definition of the curvature $\kappa_s$ $$\kappa_s = \frac{\|P_0'(0) \times P_0''(0)\|}{\|P_0'(0)\|^3}$$
$$= \frac{\|3 * \overline{d_1} \times 6(\overline{d_2} - \overline{d_1})\|}{\|3 * \overline{d_1}\|^3}$$
$$= \frac{2\|\overline{d_1} \times (\overline{d_2} - \overline{d_1})\|}{3\|\overline{d_1}\|^3}$$
$$= \frac{2\|\overline{d_1} \times \overline{d_2}\|}{3\|\overline{d_1}\|^3}$$
$$= \frac{2\|\overline{d_1}\|\|\overline{d_2}\|\sin(\psi)}{3\|\overline{d_1}\|^3}$$
$$= \frac{2\|\overline{d_2}\|\sin(\psi)}{3\|\overline{d_1}\|^2}$$
$$= \frac{n_1}{3\|\overline{d_1}\|^2}$$
$$= \frac{\|W_1 - X_0\|\sin(\varphi)}{3\|\overline{d_1}\|^2}$$

the length of the distance $\overline{d_1}$ is defined by the following equation.

$$\|\overline{d_1}\|^2 = \frac{\|W_1 - X_0\|\sin(\varphi)}{3 * \kappa_s}$$

Figure 29:
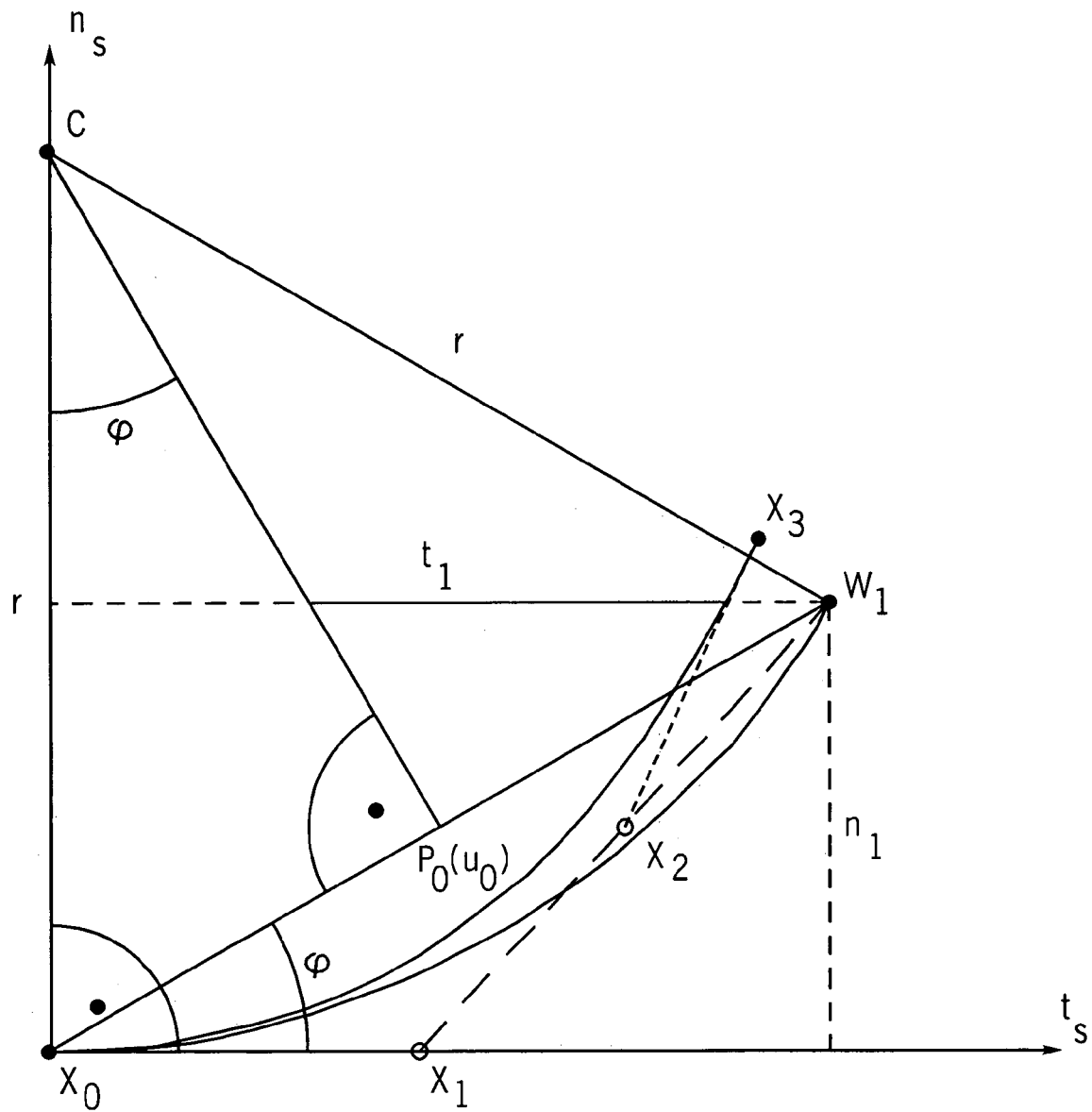
FIG. 29 shows a transition from a preceding circular motion profile to a Bézier spline segment for the embodiment of FIG. 25.

With reference to FIG. 29, in the case of a transition from a preceding circular motion profile to a Bézier spline with $$r = \frac{1}{\kappa_s}$$

and $$r\sin(\varphi) = \frac{\|W_1 - X_0\|}{2}$$

the equation for the length of the distance $\overline{d_1}$ can be further simplified.

$$\|\overline{d_1}\|^2 = \frac{\|W_1 - X_0\|\sin(\varphi)}{3 * \kappa_s}$$
$$= \frac{\|W_1 - X_0\|r\sin(\varphi)}{3}$$
$$= \frac{\|W_1 - X_0\|^2}{6}$$

Therefore, the distances $\overline{d_1}$ and $\overline{d_2}$ and the control points $X_1$ and $X_2$ are defined by the following equations.

$$\overline{d_1} = \|\overline{d_1}\| \frac{\overline{t_s}}{\|\overline{t_s}\|}$$
$$= \frac{\|W_1 - X_0\|}{\sqrt{6}} \frac{\overline{t_s}}{\|\overline{t_s}\|}$$
$$X_1 = X_0 + \overline{d_1}$$
$$\overline{d_2} = \frac{W_1 - X_1}{2}$$
$$X_2 = X_1 + \overline{d_2}$$

With these results and $$\overline{e_0} := 3 * \overline{d_2}$$

the coefficient vectors are defined by:

$$\overline{c_{0,0}} = X_0$$
$$\overline{c_{1,0}} = 3 * \overline{d_1}$$
$$\overline{c_{2,0}} = \overline{e_0} - \overline{c_{1,0}}$$
$$\overline{c_{3,0}} = X_3 - X_0 - \overline{e_0}$$

The transition from a Bézier spline to a subsequent motion profile can be derived in a similar fashion.

$$\overline{d_{3m}} = \frac{\|X_{3m} - W_{m-1}\|}{\sqrt{6}} \frac{\overline{t_e}}{\|\overline{t_e}\|}$$
$$X_{3m-1} = X_{3m} - \overline{d_{3m}}$$

$$\overline{d_{3m-1}} = \frac{X_{3m-1} - W_{m-1}}{2}$$

$$X_{3m-2} = X_{3m-1} - \overline{d_{3m-1}}$$

$$\overline{e_{m-1}} := 3 * \overline{d_{3m-1}}$$

$$\overline{g_{m-1}} := 3(X_{3m-3} - W_{m-1})$$

$$\overline{c_{0,m-1}} = X_{3m-3}$$

$$c_{1,m-1} = 3 * \overline{d_{3m-2}}$$
$$= 3(X_{3m-2} - X_{3m-3})$$
$$= 3(W_{m-1} + \overline{d_{3m-1}} - X_{3m-3})$$
$$= 3 * \overline{d_{3m-1}} - 3(X_{3m-3} - W_{m-1})$$
$$= \overline{e_{m-1}} - \overline{g_{m-1}}$$

$$\overline{c_{2,m-1}} = \overline{e_{m-1}} - \overline{c_{1,m-1}}$$
$$= \overline{e_{m-1}} - (\overline{e_{m-1}} - \overline{g_{m-1}})$$
$$= \overline{g_{m-1}}$$

$$\overline{c_{3,m-1}} = X_{3m} - X_{3m-3} - \overline{e_{m-1}}$$

As previously noted, the Bézier spline interpolation described herein is preferably configured so as to be able to handle dynamic path changes, or changes to the path while a current move is being executed. In the case of a dynamic path change, the transition is referred to herein as a merge transition.

In the case of a merge transition, the details of the preceding motion profile are unknown with the exception of the velocity and acceleration vectors at the transition point. These vectors define the starting velocity $\overline{v_s}$ and starting acceleration $\overline{a_s}$ at the control point $X_0$. For a transition with curvature, the starting velocity and acceleration are linearly independent and define the bi-normal vector $$\overline{b_s} = \overline{v_s} \times \overline{a_s}$$

the tangential, bi-normal, and normal unit vectors $$\overline{i_t} = \frac{\overline{v_s}}{\|\overline{v_s}\|}$$

$$\overline{i_b} = \frac{\overline{b_s}}{\|\overline{b_s}\|}$$

$$\overline{i_n} = \overline{i_b} \times \overline{i_t}$$

and the curvature $$\kappa_s = \frac{\|\overline{v_s} \times \overline{a_s}\|}{\|\overline{v_s}\|^3}$$
$$= \frac{\|\overline{b_s}\|}{\|\overline{v_s}\|^3}$$

With the above results the merge transition can be derived from the circle transition by either defining the chord or arc length.

According to the chord length method, with the chord length equal to the merge tolerance $\delta$ $$\|W_1 - X_0\| = \delta$$

and the results from the circle transition, the weighting point $W_1$ can be calculated.

$$\overline{d_1} = \frac{\|W_1 - X_0\|}{\sqrt{6}} \frac{\overline{v}}{\|\overline{v_s}\|}$$
$$= \frac{\delta}{\sqrt{6}} \overline{i_t}$$

$$\frac{n_1}{3\|\overline{d_1}\|^2} = \kappa_s$$

$$n_1 = 3\|\overline{d_1}\|^2 \kappa_s$$
$$= \frac{\delta^2 * \kappa_s}{2}$$

$$t_1^2 + n_1^2 = \|W_1 - X_0\|^2$$

$$t_1^2 = \delta^2 - n_1^2$$

$$t_1 = \sqrt{\delta^2 - n_1^2}$$

$$W_1 = X_0 + t_1 * \overline{i_t} + n_1 * \overline{i_n}$$

With this result the control points $X_1$ and $X_2$ are defined by the following equations.

$$X_1 = X_0 + \overline{d_1}$$

$$\overline{d_2} = \frac{W_1 - X_1}{2}$$

$$X_2 = X_1 + \overline{d_2}$$

According to the arc length method, with the arc length equal to the merge tolerance $\delta$ $$r(2\varphi) = \delta$$

$$2(\varphi) = \frac{\delta}{r}$$
$$= \delta * \kappa_s$$

and the results from the circle transition, the weighting point $W_1$ can be calculated.

$$t_1 = r \sin(2\varphi)$$
$$= \frac{1}{\kappa_s} \sin(\delta * \kappa_s)$$

$$n_1 = r(1 - \cos(2\varphi))$$
$$= \frac{1}{\kappa_s}(1 - \cos(\delta * \kappa_s))$$

$$W_1 = X_0 + t_1 * \overline{i_t} + n_1 * \overline{i_n}$$

With this result the control points $X_1$ and $X_2$ are defined by the following equations.

$$\|W_1 - X_0\|^2 = t_1^2 + n_1^2$$
$$= \frac{1}{\kappa_s^2}\sin^2(\delta*\kappa_s) + \frac{1}{\kappa_s^2}(1-\cos(\delta*\kappa_s))^2$$
$$= \frac{1}{\kappa_s^2}(\sin^2(\delta*\kappa_s) + 1 - 2\cos(\delta*\kappa_s) + \cos^2(\delta*\kappa_s))$$
$$= \frac{2}{\kappa_s^2}(1-\cos(\delta*\kappa_s))$$
$$= \frac{4}{\kappa_s^2}\sin^2\left(\frac{\delta*\kappa_s}{2}\right)$$

$$\|W_1 - X_0\| = \sqrt{t_1^2 + n_1^2}$$
$$= \frac{2}{\kappa_s}\sin\left(\frac{\delta*\kappa_s}{2}\right)$$

$$\overline{d_1} = \frac{\|W_1 - X_0\|}{\sqrt{6}}\frac{\overline{v_s}}{\|\overline{v_s}\|}$$
$$= \frac{\sqrt{t_1^2+n_1^2}}{\sqrt{6}}\overline{i_t}$$
$$= \frac{2}{\sqrt{6}\kappa_s}\sin\left(\frac{\delta*\kappa_s}{2}\right)\overline{i_t}$$

$$X_1 = X_0 + \overline{d_1}$$
$$\overline{d_2} = \frac{W_1 - X_1}{2}$$
$$X_2 = X_1 + \overline{d_2}$$

With the results of either the chord or arc length method and $$\overline{e_0} := 3*\overline{d_2}$$

the coefficient vectors are defined by:

$$\overline{c_{0,0}} = X_0$$
$$\overline{c_{1,0}} = 3*\overline{d_1}$$
$$\overline{c_{2,0}} = \overline{e_0} - \overline{c_{1,0}}$$
$$c_{3,0} = X_3 - X_0 - \overline{e_0}$$

Advantageously, this blending technique is independent of the absolute value of the velocity and acceleration at the transition points, only involves the generation of one dynamic profile for the parameters $u_j$, and does not require a dynamic coordinate transformation. However, the relationship between the parameter $u_j$ and time t needs to be defined and the relationship between the parameter $u_j$ and arc length s is non-explicit.

3. Blending Transition

A blending transition is used to blend two motion profiles. Therefore, it is a combination of a transition from the preceding motion profile to a two-segment Bézier spline at the transition point $X_0$ and from the Bézier spline to the subsequent motion profile at the transition point $X_6$. Since the two motion profiles are typically defined through an intersection point, which serves as the end point of the preceding profile and as the start point of the subsequent profile, this intersection point is used as weighting point $W_1$ for the Bézier spline. Based on the equations for transitions with and without curvature, the control points $X_1$, $X_2$, $X_4$, and $X_5$ can be calculated. The remaining control point is defined by the following equation.

$$X_3 = \frac{X_2 + X_4}{2}$$

The above calculations can be simplified by applying a coordinate translation with the weighting point $W_1$ as the new origin to the transition points $X_0$ and $X_6$ before calculating the remaining control points.

$$\overline{X}_k = X_k - W_1$$

Figure 30:
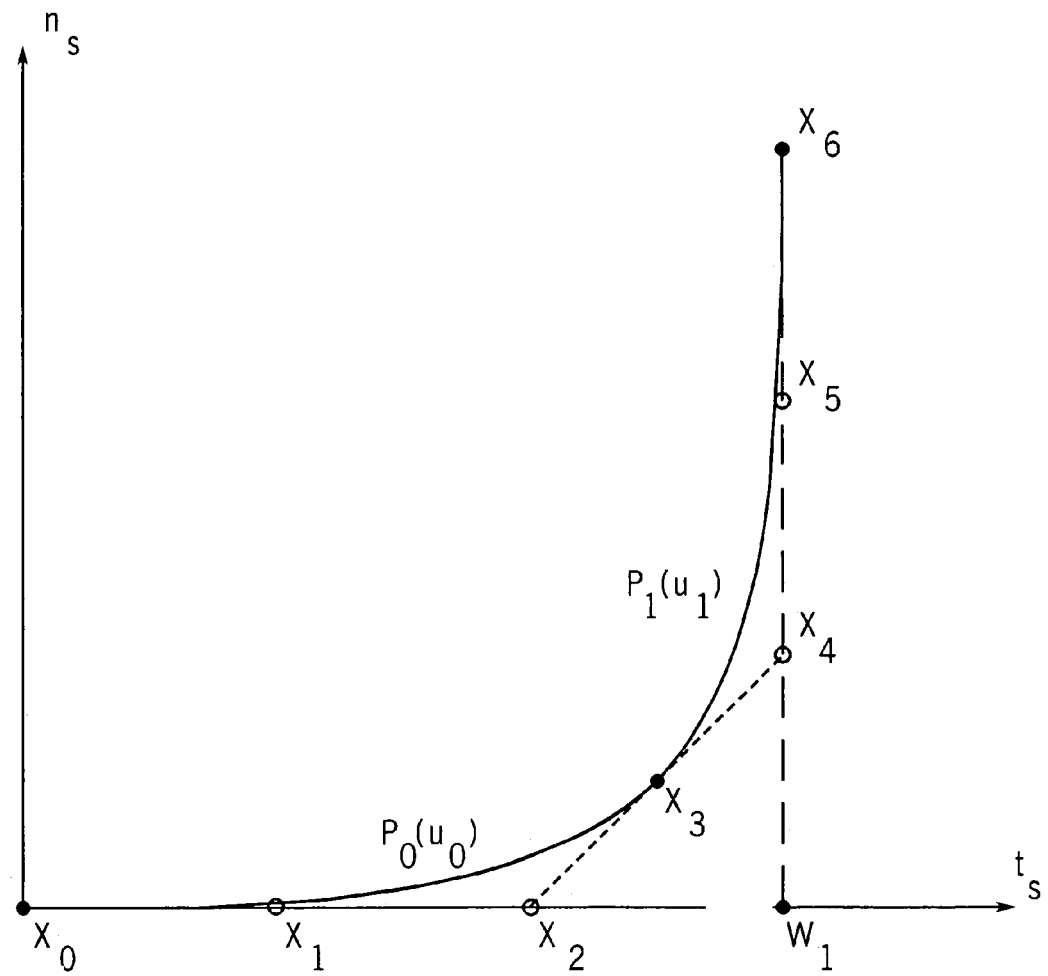
FIG. 30 shows a two-segment Bézier spline that blends from one linear motion profile to another linear motion profile for the embodiment of FIG. 25.

With regard to a line-line transition, an example of a two-segment Bézier spline that blends from one linear motion profile to another linear motion profile with given transition point $X_0$ and $X_6$ and intersection point $W_1$ is shown in FIG. 30. Based on the above results, the control points are given by $$\overline{d_1} = \frac{W_1 - X_0}{3}$$
$$X_1 = X_0 + \overline{d_1}$$
$$X_2 = X_1 + \overline{d_1}$$
$$\overline{d_6} = \frac{X_6 - W_1}{3}$$
$$X_5 = X_6 - \overline{d_6}$$
$$X_4 = X_5 - \overline{d_6}$$
$$X_3 = \frac{X_2 + X_4}{2}$$

Figure 31:
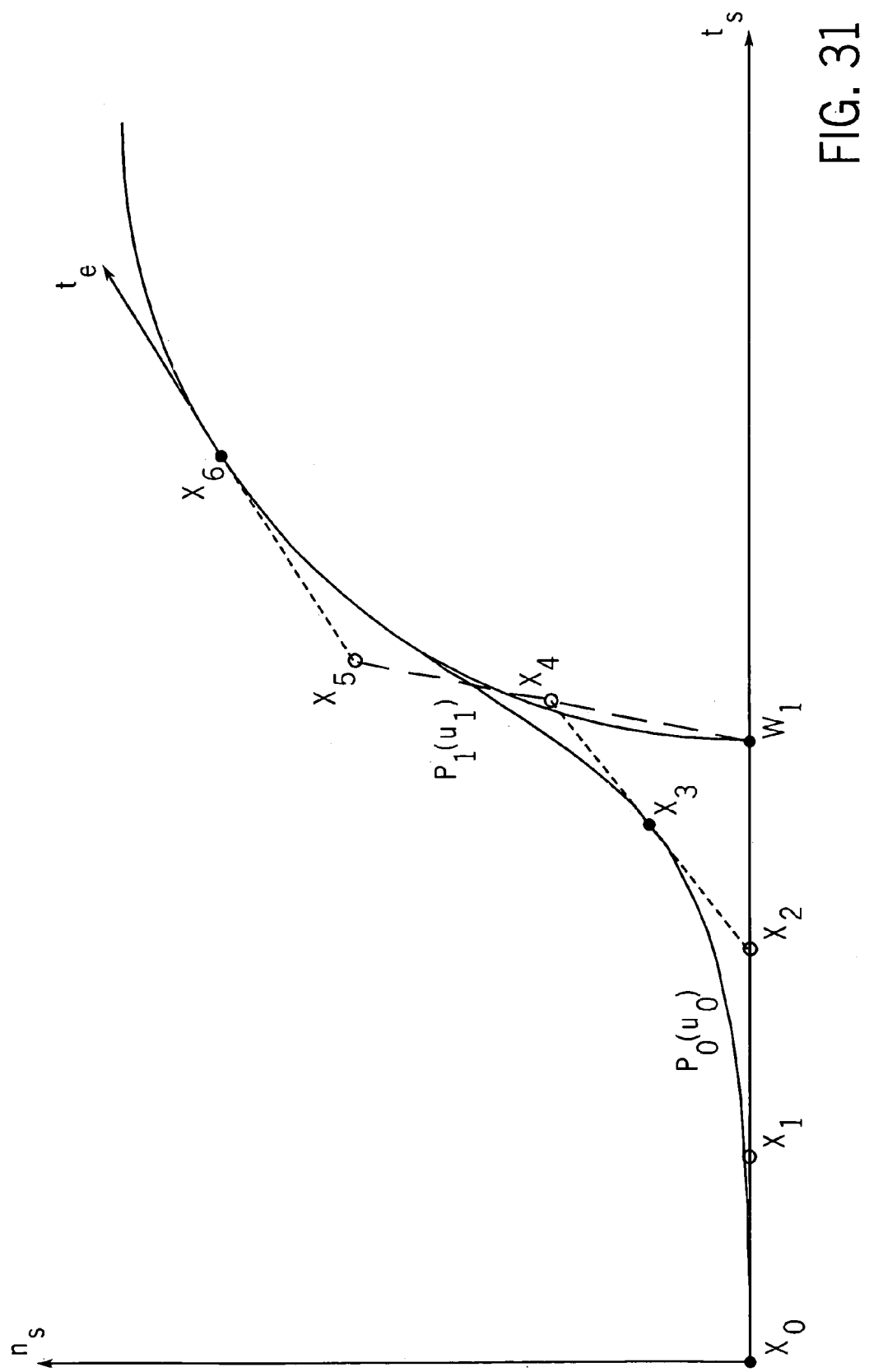
FIG. 31 shows a two-segment Bézier spline that blends from a linear motion profile to a circular motion profile for the embodiment of FIG. 25.

With regard to a line-circle transition, an example for a two-segment Bézier spline that blends from a linear motion profile to a circular motion profile with given transition point $X_0$ and $X_6$ and intersection point $W_1$ is shown in FIG. 31. Based on the above results, the control points are given by $$\overline{d_1} = \frac{W_1 - X_0}{3}$$
$$X_1 = X_0 + \overline{d_1}$$
$$X_2 = X_1 + \overline{d_1}$$
$$\overline{d_6} = \frac{\|X_6 - W_1\|}{\sqrt{6}}\frac{\overline{i_e}}{\|\overline{i_e}\|}$$
$$X_5 = X_6 - \overline{d_6}$$
$$\overline{d_5} = \frac{X_5 - W_1}{2}$$
$$X_4 = X_5 - \overline{d_5}$$
$$X_3 = \frac{X_2 + X_4}{2}$$

D. Bézier Spline Dynamics

As indicated initially, the position $P_j$ of a cubic Bézier spline segment j is described by a cubic polynomial $$P_j(u_j) = \overline{c_{0,j}} + \overline{c_{1,j}}*u_j + \overline{c_{2,j}}*u_j^2 + \overline{c_{3,j}}*u_j^3$$

with the coefficient vectors $\{\overline{c_{0,j}}, \ldots \overline{c_{3,j}}\}$ and the parameter $u_j \in [0,1]$. Above, the equations for the coefficient vectors $\{\overline{c_{0,j}}, \ldots \overline{c_{3,j}}\}$ have been described. However, it is noted that the position $P_j$ of the cubic Bézier spline segment is a function of $u_j$, which is a parameter that is not inherently time-dependent but rather is defined simply as varying between zero and one ($u_j \in [0,1]$). Accordingly, the following two subsections describe two methods for generating $u_j$ as a function of time. This, in turn, allows $P_j$ to be calculated as a function of time.

1. Arc Length Based Dynamics

The arc length based dynamics method uses the knowledge of the arc length $s_j(u_j)$ as a function of the parameter. With this function the overall arc length $l_k$ of a Bézier segment and the overall arc length $l$ of a Bézier spline are defined.

$$l_k = s_j(1)$$

$$l = \sum_{k=0}^{m-1} l_k$$

During the initial phase of the profile instruction, the arc length $l$ is used as distance to go and the starting and ending velocity and acceleration $v_s$, $v_e$, $a_s$, and $a_e$ are used as boundary conditions in order to generate a motion profile $x(t)$ as a function of time. During the dynamic phase of the profile generation, this motion profile is used to calculate a specific distance $x(t_l)$ at a given time. The specific distance $x(t_l)$ is then transformed back to a specific arc length $s_j(x(t_l))$, which in turn is transformed back into a specific parameter $u_j(s_j(x(t_l)))$.

The arc length based dynamics method is advantageous in that it is a simple way of generating constant velocity profiles. However, this approach involves solving the complex relationship between arc length and the parameter $u_j$ and the fact that velocity and acceleration may exceed maximum values at sharp corners.

2. Parameter Based Dynamics

The parameter based dynamics method uses the knowledge of the starting and ending velocity and acceleration $\overline{v_{s,j}}$, $\overline{v_{e,j}}$, $\overline{a_{s,j}}$, and $\overline{a_{e,j}}$ for each Bézier segment j. These values and the following equations $$\overline{v_{s,j}} = \dot{P}_j(u_j(t_s))$$
$$= \frac{dP_j}{du_j}(u_j(t_s)) * \frac{du_j}{dt}(t_s)$$
$$= P'_j(0) * \dot{u}_j(t_s)$$
$$= 3 * \overline{d_{3j+1}} * \dot{u}_{s,j}$$

$$\overline{v_{e,j}} = \dot{P}_j(u_j(t_e))$$
$$= \frac{dP_j}{du_j}(u_j(t_e)) * \frac{du_j}{dt}(t_e)$$
$$= P'_j(1) * \dot{u}_j(t_e)$$
$$= 3 * \overline{d_{3j+3}} * \dot{u}_{e,j}$$

$$\overline{a_{s,j}} = \ddot{P}_j(u_j(t_s))$$
$$= \frac{d^2 P_j}{du_j^2}(u_j(t_s)) * \left(\frac{du_j}{dt}(t_s)\right)^2 + \frac{dP_j}{du_j}(u_j(t_s)) * \frac{d^2 u_j}{dt^2}(t_s)$$
$$= P''_j(0) * \dot{u}_j^2(t_s) + P'_j(0) * \ddot{u}_j(t_s)$$
$$= 6(\overline{d_{3j+2}} - \overline{d_{3j+1}})\dot{u}_{s,j}^2 + 3 * \overline{d_{3j+1}} * \ddot{u}_{s,j}$$

$$\overline{a_{e,j}} = \ddot{P}_j(u_j(t_e))$$
$$= \frac{d^2 P_j}{du_j^2}(u_j(t_e)) * \left(\frac{du_j}{dt}(t_e)\right)^2 + \frac{dP_j}{du_j}(u_j(t_e)) * \frac{d^2 u_j}{dt^2}(t_e)$$
$$= P''_j(1) * \dot{u}_j^2(t_e) + P'_j(1) * \ddot{u}_j(t_e)$$
$$= 6(\overline{d_{3j+3}} - \overline{d_{3j+2}})\dot{u}_{e,j}^2 + 3 * \overline{d_{3j+3}} * \ddot{u}_{e,j}$$

are used to calculate the starting and ending first and second derivatives of the parameter for each Bézier segment j.

$$\dot{u}_{s,j} = \frac{\|\overline{v_{s,j}}\|}{3\|\overline{d_{3j+1}}\|}$$

$$\dot{u}_{e,j} = \frac{\|\overline{v_{e,j}}\|}{3\|\overline{d_{3j+3}}\|}$$

$$\ddot{u}_{s,j} = \frac{\|\overline{a_{s,j}} - 6(\overline{d_{3j+2}} - \overline{d_{3j+1}})\dot{u}_{s,j}^2\|}{3\|\overline{d_{3j+1}}\|}$$

$$\ddot{u}_{e,j} = \frac{\|\overline{a_{e,j}} - 6(\overline{d_{3j+3}} - \overline{d_{3j+2}})\dot{u}_{e,j}^2\|}{3\|\overline{d_{3j+3}}\|}$$

During the initial phase of the profile instruction, the parameter range 1 is used as distance to go and the starting and ending velocity and acceleration $\dot{u}_{s,j}$, $\dot{u}_{e,j}$, $\ddot{u}_{s,j}$, and $\ddot{u}_{e,j}$ are used as boundary conditions in order to generate a motion profile $u_j(t)$ as a function of time. During the dynamic phase of the profile generation, this motion profile is used to calculate a specific parameter $u_j(t_l)$ at a given time.

The parameter based dynamics method of specifying $u_j$ as a function of time is advantageous in that there is no need to solve the complex relationship between the arc length and the parameter $u_j$ and the velocity and acceleration is limited to the maximum values at sharp corners. However, generation of constant velocity profiles is more difficult.

The techniques described herein extend to those embodiments which fall within the scope of the appended claims, regardless of whether they provide any of the above mentioned advantageous features. Many changes and modifications may also be made to the invention without departing from the spirit thereof. The scope of these changes will become apparent from the appended claims.

What is claimed is:

1. A system comprising control logic and a programming interface, the programming interface including a user instruction configured to permit a user to specify one or more weighting points for a transitioning path segment in a multi-dimensional coordinate space, the weighting points and the transitioning path segment extending between first and second additional path segments in the multi-dimensional coordinate space, the control logic being configured to generate the transitioning path segment based on the weighting points, and the control logic including spline computation logic configured to generate a spine curve forming the transitioning path segment, the spline computation logic being configured to generate the spline curve based on boundary conditions relating to the first and second additional path segments and based on a series of control points extending from the first path segment to the second path segment, wherein the spline computation logic is configured to generate the control points based on the weighting points and based on the boundary conditions, wherein the spline curve extends near the weighting points and passes through at least some of the series of control points, and wherein the control logic is configured to generate control signals to control operation of a plurality of motion axes to drive movement of a controlled element along a path defined by the first additional path segment, the transitioning path segment, and the second additional path segment.

2. A system according to claim 1, wherein the spline curve is a Bézier spline curve.

3. A system according to claim 1, wherein the spline curve does not pass through the weighting points.

4. A system according to claim 1,
wherein the spline curve comprises a plurality of spline curve segments;
wherein the control logic determines a starting velocity vector, a starting acceleration vector, an ending velocity vector, and an ending acceleration vector for each of the spline curve segments;
wherein the ending velocity vector and the ending acceleration vector for each of the plurality of spline curve segments are determined so as to be approximately equal to the starting velocity vector and the starting acceleration vector for a next adjacent one of the plurality of spline curve segments.

5. A system according to claim 1, wherein the control signals include position reference values, and wherein the control logic includes an interpolator configured to generate the position reference values substantially simultaneously along a plurality of different motion axes.

6. A system according to claim 5, wherein the interpolator generates the position reference values based on a plurality of coefficient vectors, the coefficient vectors being coefficients of the spline curve and being determined based on the boundary conditions and the weighting points.

7. A system according to claim 1, wherein the first and second additional path segments are non-tangential.

8. A system according to claim 7, wherein the first and second path segments are linear path segments.

9. A system according to claim 7, wherein one of the first and second additional path segments is a linear path segment and the other one of the first and second additional path segments is a curved path segment.

10. A system according to claim 7, wherein the first and second additional path segments are curved path segments.

11. A system according to claim 7, wherein the merging point is derived from the first and second path segment.

12. A system according to claim 7, wherein the spline curve is generated without using characteristics of the first and second additional path segments other than velocity and acceleration vectors for the first and second path segments at the boundary points.

13. A system according to claim 1, wherein the programming interface is an object-oriented programming interface in which displayable objects are used to represent physical hardware and relationships between physical hardware.

14. A system according to claim 1, wherein the system is an industrial control system.

15. A system according to claim 1, wherein the spline curve comprises a plurality of spline path segments, and wherein the spline computation logic is configured to generate the series of control points such that the first and second derivatives of the spline path segments are equal at transition points for adjacent spline path segments.

16. A system comprising control logic and a programming interface, the programming interface being configured to permit a user to specify one or more weighting points in a multi-dimensional coordinate space, and the control logic including spline computation logic configured to generate a spline curve based on boundary conditions, wherein the spline curve extends near the weighting points, and wherein the control logic is configured to generate control signals to control operation of a plurality of motion axes to drive movement of a controlled element along a path defined by the spline curve;
wherein the programming interface includes a jog block which permits the user via a jog instruction to specify a new motion axis velocity, a move block which permits the user via a move instruction to specify a new motion axis position, a time cam block which permits a user via a time cam instruction to specify a motion axis position profile which specifies motion axis position as a function of time, a gear block which permits the user via a gear instruction to specify an electronic gearing relationship between the position of one motion axis and the position of another motion axis, a position cam block which permits the user via a position cam instruction to specify a motion axis position profile which specifies the position of one axis as a function of the position of another motion axis.

17. A control method for controlling movement of a controlled element in a multi-dimensional coordinate system, comprising:
receiving one or more weighting points for a transitioning path segment by way of a user instruction, the transitioning path segment extending between first and second additional path segments;
generating a plurality of control points for a plurality of adjacent spline segments based on boundary conditions and the weighting points, the plurality of adjacent spline segments forming the transitioning path segment;
generating a plurality of coefficient vectors for the plurality of spline segments based on the plurality of control points;
generating a first plurality of position reference values based on the plurality of coefficient vectors and using the first plurality of position reference values to control a first motion axis, the first motion axis operating in a first dimension of the multi-dimensional coordinate system; and
generating a second plurality of position reference values based on the plurality of coefficient vectors and using the second plurality of position reference values to control a second motion axis, the second motion axis operating in a second dimension of the multi-dimensional coordinate system.

18. A method according to claim 17, wherein, during movement along the transitioning path segment, the controlled element transitions from the first additional path segment, to the transitioning path segment, and then to the second additional path segment without discontinuities in velocity and acceleration.

19. A method according to claim 17, wherein the plurality of adjacent spline segments form a Bézier spline curve.

20. A method according to claim 17, wherein the plurality of spline segments do not pass through the weighting points.

21. A method according to claim 17,
wherein each of the plurality of spline curve segments have a starting velocity vector, a starting acceleration vector, an ending velocity vector, and an ending acceleration vector;
wherein the method further comprises determining the ending velocity vector and the ending acceleration vector for each of the plurality of spline curve segments so as to be approximately equal to the starting velocity vector and the starting acceleration vector for a next adjacent one of the plurality of spline curve segments.

22. A method according to claim 17, wherein the user instruction is provided as part of a programming interface, and wherein the programming interface is an object-oriented programming interface in which displayable objects are used to represent physical hardware and relationships between physical hardware.

23. A method according to claim 17, wherein the control points are generated such that the first and second derivatives of the plurality of adjacent spline segments are equal at transition points for adjacent spline path segments.

24. A control method for controlling movement of a controlled element in a multi-dimensional coordinate system, comprising:
  receiving one or more weighting points by way of a user instruction;
  generating a plurality of control points for a plurality of adjacent spline segments based on boundary conditions and the plurality of weighting points;
  generating a plurality of coefficient vectors for the plurality of spline segments based on the plurality of control points;
  generating a first plurality of position reference values based on the plurality of coefficient vectors and using the first plurality of position reference values to control a first motion axis, the first motion axis operating in a first dimension of the multi-dimensional coordinate system; and
  generating a second plurality of position reference values based on the plurality of coefficient vectors and using the second plurality of position reference values to control a second motion axis, the second motion axis operating in a second dimension of the multi-dimensional coordinate system;
  wherein the user instruction is provided as part of a programming interface, and wherein the programming interface includes a jog block which permits the user via a jog instruction to specify a new motion axis velocity, a move block which permits the user via a move instruction to specify a new motion axis position, a time cam block which permits a user via a time cam instruction to specify a motion axis position profile which specifies motion axis position as a function of time, a gear block which permits the user via a gear instruction to specify an electronic gearing relationship between the position of one motion axis and the position of another motion axis, a position cam block which permits the user via a position cam instruction to specify a motion axis position profile which specifies the position of one motion axis as a function of the position of another motion axis.

25. A system for controlling a first motion axis and a second motion axis; the system comprising motion control logic configured to control the first motion axis and the second motion axis in accordance with a user program, wherein the motion control logic provides a plurality of instructions configured for use in the user program, the plurality of instructions including an instruction that permits a move to be specified by specifying one or more weighting points for a transitioning path segment formed of a spline curve to be followed by the controlled element in a multi-dimensional coordinate system that includes the first motion axis and the second motion axis, the transitioning path segment connecting first and second additional path segments in the multi-dimensional coordinate system, wherein the instruction permits the move to be specified by specifying the weighting points for the spline curve without having to specify control points for the spline curved the control points for the spline curve being generated by the motion control logic based on the weighting points, and wherein the spline curve passes through at least some of the control points and not the weighting points.

26. A system according to claim 25, wherein the spline curve comprises a plurality of spline path segments, and wherein the motion control logic is configured to generate the series of control points such that the first and second derivatives of the spline path segments are equal at transition points for adjacent spline path segments.

27. An industrial control system comprising:
  a plurality of input devices;
  a plurality of output devices;
  a communication network;
  a plurality of motion axes;
  a plurality of microprocessor-based controllers, the plurality of controllers being coupled to each other by way of the communication network, the plurality of controllers being coupled to respective ones of the plurality of input devices and the plurality of output devices, the plurality of controllers being configured to control the plurality of output devices based on input status information from the plurality of input devices, the plurality of microprocessor-based controllers including control logic configured to control the plurality of motion axes, and the plurality of controllers being configured to be programmed with a user program; and
  a programming interface, the programming interface being configured to permit a user to generate the user program, the user program including a user instruction which permits the user to specify one or more weighting points for a transitioning path segment in a multi-dimensional coordinate space, the transitioning path segment extending between first and second additional path segments; and
  wherein the control logic includes spline computation logic configured to generate a spline curve which extends near the weighting points, the spline curve forming the transitioning path segment, the spline computation logic being configured to generate control points based on the weighting points, the spline curve being generated based on the control points, and the spline computation logic being configured to generate control signals to control operation of the plurality of motion axes to drive movement of a controlled element along a path defined by the spline curve.

28. A system according to claim 27, wherein the spline curve comprises a plurality of spline path segments, and wherein the spline computation logic is configured to generate the series of control points such that the first and second derivatives of the spline path segments are equal at transition points for adjacent spline path segments.

* * * * *